(12) United States Patent
Musalem et al.

(10) Patent No.: US 7,586,164 B2
(45) Date of Patent: Sep. 8, 2009

(54) MICRO-ELECTRO-MECHANICAL SYSTEM (MEMS) VARIABLE CAPACITOR APPARATUSES, SYSTEMS AND RELATED METHODS

(75) Inventors: Francois-Xavier Musalem, Meylan (FR); Siebe Bouwstra, Schoorl (NL); Arthur S. Morris, Raleigh, NC (US)

(73) Assignee: Wispry, Inc., Irvine, CA (US)

( * ) Notice: Subject to any disclaimer, the term of this patent is extended or adjusted under 35 U.S.C. 154(b) by 0 days.

(21) Appl. No.: 11/313,300

(22) Filed: Dec. 20, 2005

(65) Prior Publication Data

US 2006/0291135 A1    Dec. 28, 2006

Related U.S. Application Data

(62) Division of application No. 10/736,283, filed on Dec. 15, 2003, now Pat. No. 7,180,145.

(60) Provisional application No. 60/433,454, filed on Dec. 13, 2002.

(51) Int. Cl.
*H01G 5/01* (2006.01)
(52) U.S. Cl. .................... 257/415; 310/311
(58) Field of Classification Search ............. 257/316, 257/414, 415, 419, 602; 310/311–320; 333/246; 361/278, 281, 283.2, 283.3
See application file for complete search history.

(56) References Cited

U.S. PATENT DOCUMENTS

| 5,051,643 | A |   | 9/1991  | Dworsky et al. |
| 5,880,921 | A | * | 3/1999  | Tham et al. ............ 361/233 |
| 6,094,102 | A | * | 7/2000  | Chang et al. ............ 331/17 |
| 6,127,908 | A |   | 10/2000 | Bozler et al. |
| 6,143,997 | A |   | 11/2000 | Feng et al. |
| 6,229,684 | B1 |  | 5/2001  | Cowen et al. |
| 6,341,039 | B1 |  | 1/2002  | Flanders et al. |
| 6,377,438 | B1 |  | 4/2002  | Deane et al. |

(Continued)

FOREIGN PATENT DOCUMENTS

EP    0 419 853    4/1991

(Continued)

OTHER PUBLICATIONS

European Patent Office-Office Action dated Nov. 2, 2006.

(Continued)

*Primary Examiner*—Thomas L Dickey
(74) *Attorney, Agent, or Firm*—Jenkins, Wilson, Taylor & Hunt, P.A.

(57) ABSTRACT

Micro-electro-mechanical system (MEMS) variable capacitor apparatuses, system and related methods are provided. According to one embodiment, a method for varying the capacitance of two conductive plates is provided. The method can include providing a micro-electro-mechanical system (MEMS) variable capacitor. The variable capacitor can include first and second actuation electrodes wherein one of the actuation electrodes is movable with respect to the other actuation electrode when a voltage is applied across the first and second actuation electrodes. Further, the variable capacitor can include first and second capacitive electrodes. The method can include applying a voltage to the first and second actuation electrodes for movement of at least one of the capacitive electrodes in a substantially straight direction with respect to the other capacitive electrode upon application of voltage across the first and second actuation electrodes to change the capacitance between the first and second capacitive electrodes.

27 Claims, 60 Drawing Sheets

U.S. PATENT DOCUMENTS

| | | | |
|---|---|---|---|
| 6,426,687 B1 * | 7/2002 | Osborn | 333/262 |
| 6,441,449 B1 | 8/2002 | Xu et al. | |
| 6,496,351 B2 | 12/2002 | Hill et al. | |
| 6,507,475 B1 * | 1/2003 | Sun | 361/281 |
| 6,646,525 B2 | 11/2003 | Bozler et al. | |
| 6,678,943 B1 | 1/2004 | Feng et al. | |
| 6,717,496 B2 | 4/2004 | Feng et al. | |
| 6,798,029 B2 | 9/2004 | Volant et al. | |
| 7,180,145 B2 | 2/2007 | Musalem et al. | |
| 7,361,962 B2 | 4/2008 | Plowman et al. | |
| 7,388,316 B2 | 6/2008 | Musalem et al. | |
| 2001/0002872 A1 | 6/2001 | Dhuler | |
| 2002/0025595 A1 | 2/2002 | Xu et al. | |
| 2003/0201852 A1 | 10/2003 | Eliacin et al. | |
| 2004/0012464 A1 | 1/2004 | Ma et al. | |
| 2004/0036132 A1 | 2/2004 | de los Santos | |

FOREIGN PATENT DOCUMENTS

| | | |
|---|---|---|
| EP | 0 637 042 | 2/1995 |

OTHER PUBLICATIONS

European Search Report for PCT/US0339806 dated Jul. 7, 2006.
International Preliminary Examination Report for PCT/US03/39806 dated Oct. 3, 2005.
European Patent Office-Office Action dated Jul. 30, 2007 for EP Application No. 03 813447.4-1248.
Office Action-non final action dated Sep. 16, 2004 in U.S. Appl. No. 10/736,283.
Office Action-restriction requirement dated Dec. 22, 2004 in U.S. Appl. No. 10/736,283.
Office Action-final action dated Jul. 13, 2005 in U.S. Appl. No. 10/736,283.
Office Action-non final action dated Feb. 10, 2006 in U.S. Appl. No. 10/736,283.
Office Action-final action dated Jun. 30, 2006 in U.S. Appl. No. 10/736,283.
Notice of Allowance dated Oct. 12, 2006 for U.S. Appl. No. 10/736,283.
Office Action-restriction requirement dated Sep. 26, 2006 in U.S. Appl. No. 11/122,379.
Office Action-non final action dated May 25, 2007 in U.S. Appl. No. 11/122,379.
Notice of Allowance dated May 19, 2008 for U.S. Appl. No. 11/122,379.
Office Action-non final action dated May 25, 2007 in U.S. Appl. No. 11/313,238.
Notice of Allowance dated Nov. 30, 2007 in U.S. Appl. No. 11/313,238.
International Search Report for PCT/US03/39806 dated May 27, 2004.
Communication under Rule 71(3) EPC for European Patent Application No. 03813447.4 dated Dec. 19, 2008.

* cited by examiner

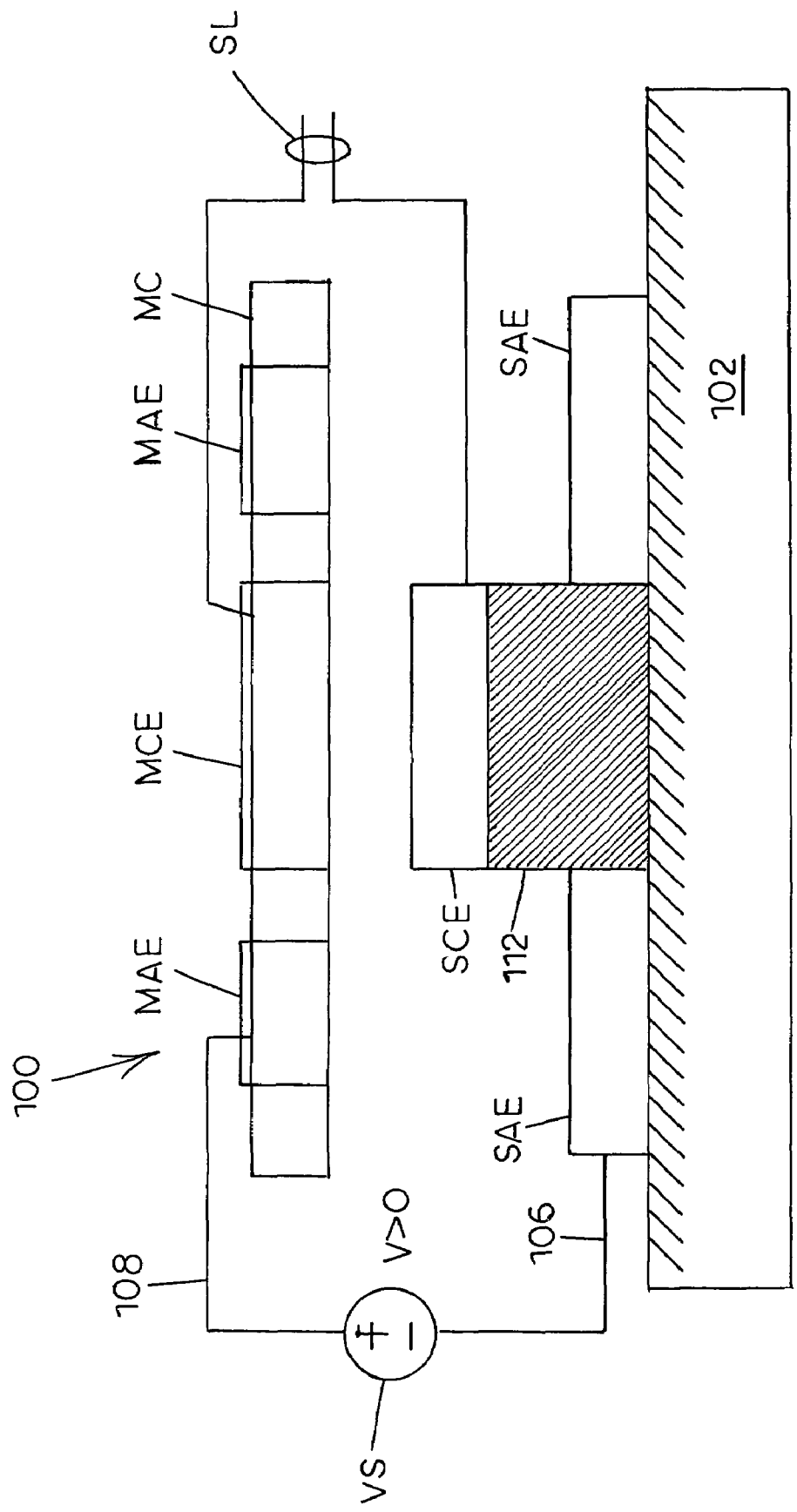

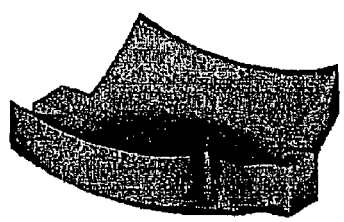 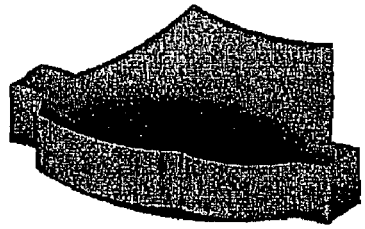 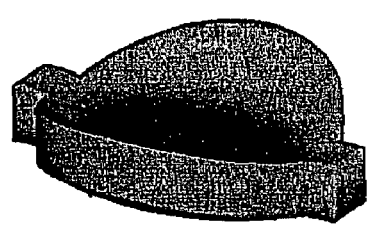
FIG. 15A  FIG. 15B  FIG. 15C
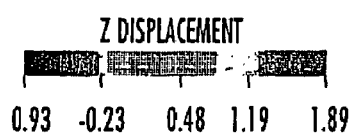 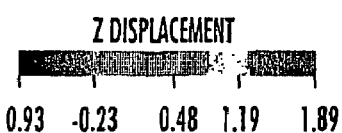 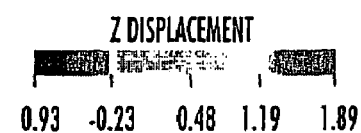

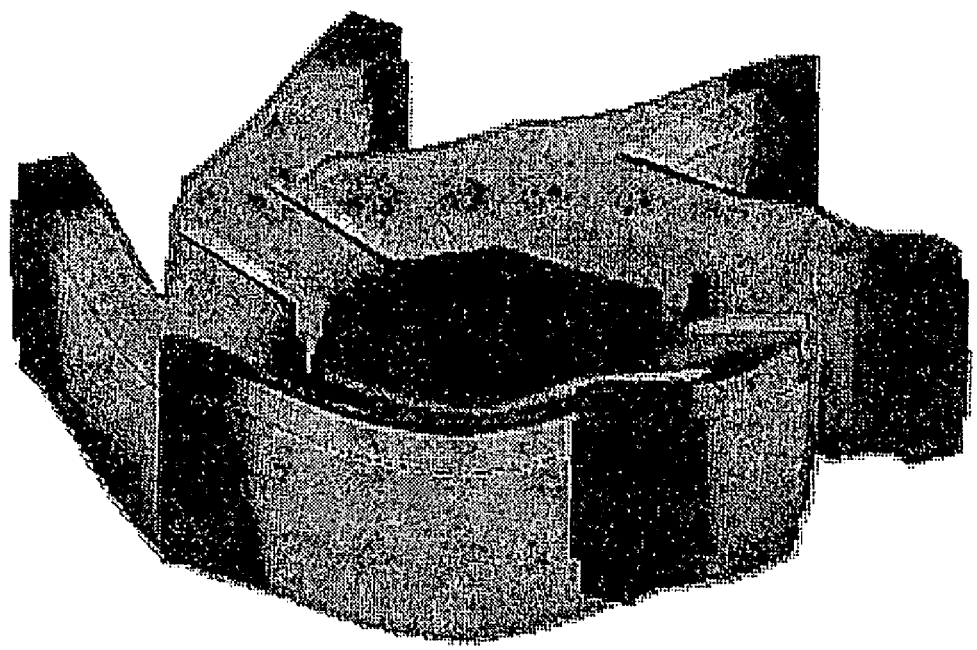
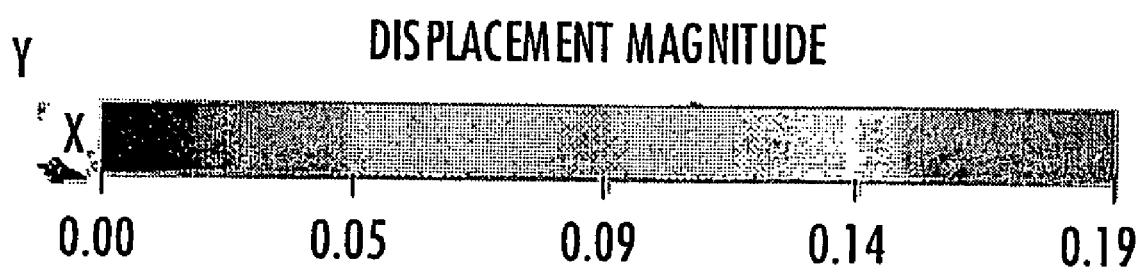
FIG. 21

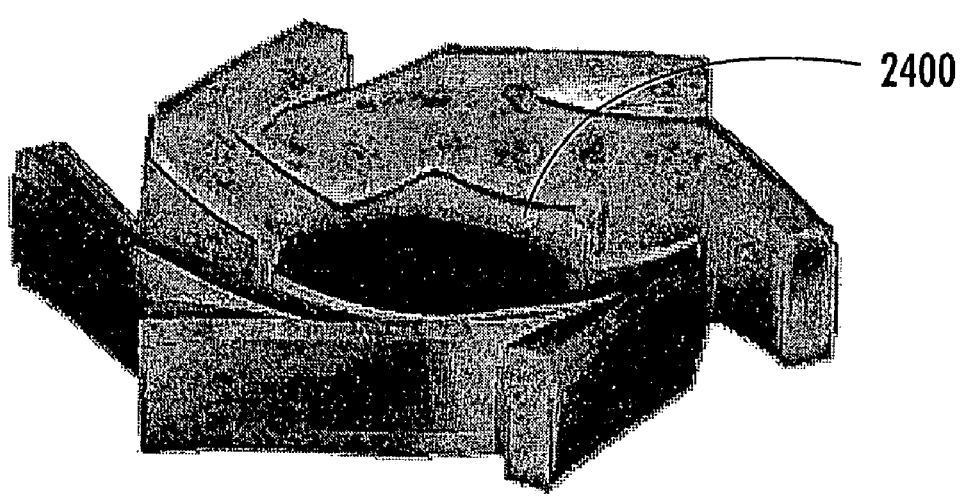
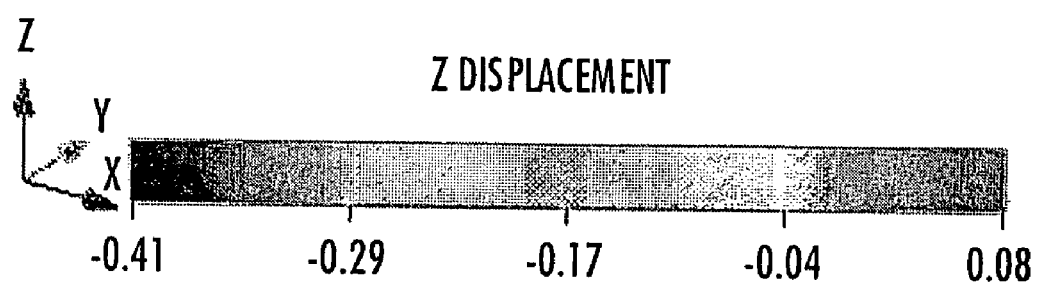
FIG. 24

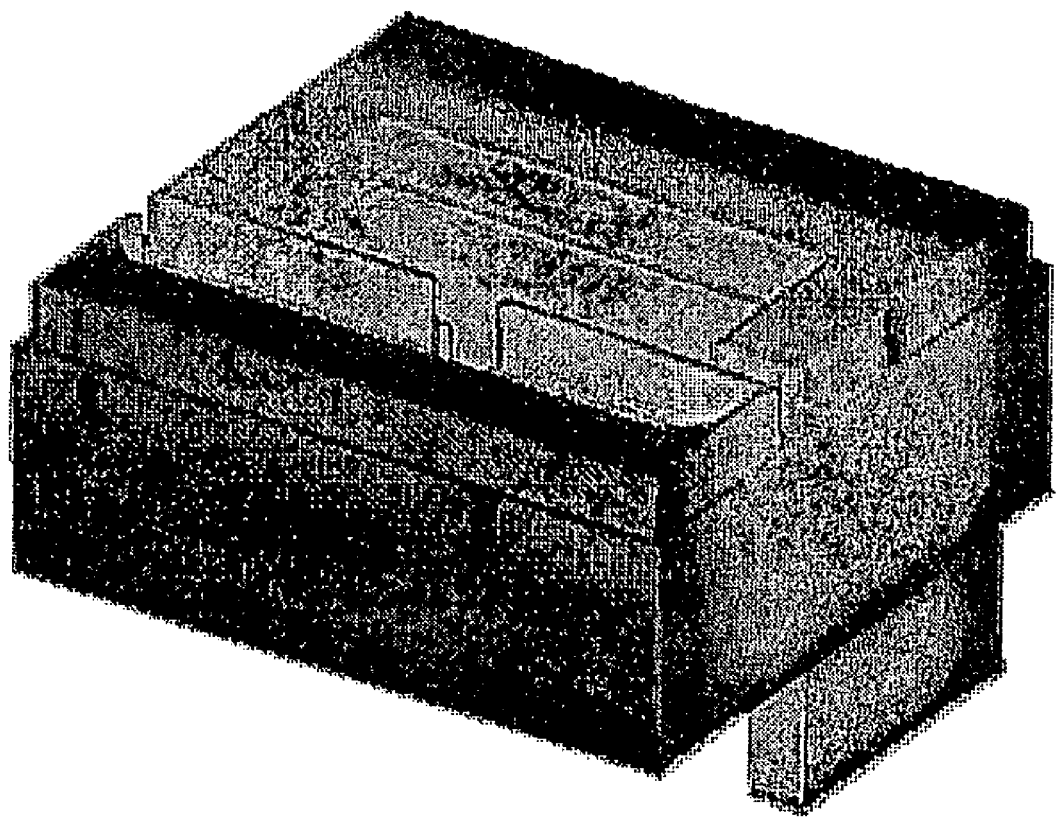
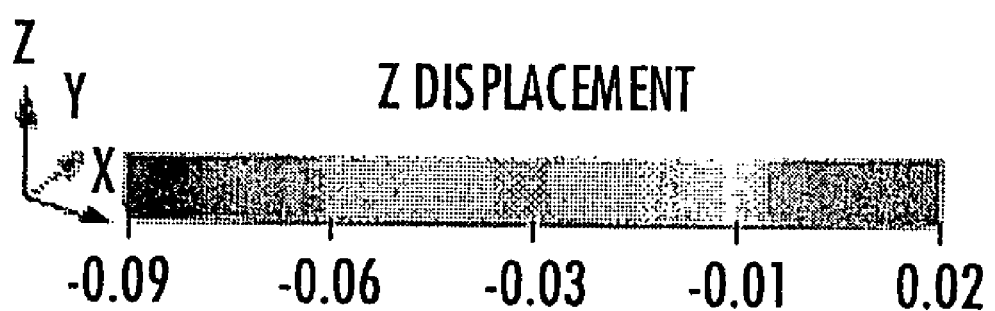
FIG. 52

MICRO-ELECTRO-MECHANICAL SYSTEM (MEMS) VARIABLE CAPACITOR APPARATUSES, SYSTEMS AND RELATED METHODS

RELATED APPLICATION

This application is a divisional patent application from and claims the benefit of U.S. patent application Ser. No. 10/736,283 filed Dec. 15, 2003, now U.S. Pat. No. 7,180,145, entitled "Micro-Electro-Mechanical System (MEMS) Variable Capacitor Apparatuses and Related Methods", which is incorporated herein by reference in its entirety; and U.S. Provisional Patent Application Ser. No. 60/433,454, filed Dec. 13, 2002, also incorporated herein by reference in its entirety.

TECHNICAL FIELD

The present subject matter relates generally to micro-electro-mechanical systems (MEMS) apparatuses and methods. More particularly, the present subject matter relates to variable capacitor apparatuses and related methods utilizing MEMS technology.

BACKGROUND ART

Micro-electro-mechanical systems (MEMS) apparatuses and methods are presently being developed for a wide variety of applications in view of the size, cost and power consumption advantages provided by these devices. Specifically, a variable capacitor, also known as a varactor, can be fabricated utilizing MEMS technology. Typically, a variable capacitor includes an interelectrode spacing (or an electrode overlap area) between a pair of electrodes that can be controllably varied in order to selectively vary the capacitance between the electrodes. In this regard, conventional MEMS variable capacitors include a pair of electrodes, one that is typically disposed upon and fixed to the substrate and the other that is typically carried on a movable actuator or driver. In accordance with MEMS technology, the movable actuator is typically formed by micromachining the substrate such that very small and very precisely defined actuators can be constructed.

As appreciated by persons skilled in the art, many types of MEMS variable capacitors and related devices can be fabricated by either bulk or surface micromachining techniques. Bulk micromachining generally involves sculpting one or more sides of a substrate to form desired three dimensional structures and devices in the same substrate material. The substrate is composed of a material that is readily available in bulk form, and thus ordinarily is silicon or glass. Wet and/or dry etching techniques are employed in association with etch masks and etch stops to form the microstructures. Etching is typically performed through the backside of the substrate. The etching technique can generally be either isotropic or anisotropic in nature. Isotropic etching is insensitive to the crystal orientation of the planes of the material being etched (e.g., the etching of silicon by using a nitric acid as the etchant). Anisotropic etchants, such as potassium hydroxide (KOH), tetramethyl ammonium hydroxide (TMAH), and ethylenediamine pyrochatechol (EDP), selectively attack different crystallographic orientations at different rates, and thus can be used to define relatively accurate sidewalls in the etch pits being created. Etch masks and etch stops are used to prevent predetermined regions of the substrate from being etched.

On the other hand, surface micromachining generally involves forming three-dimensional structures by depositing a number of different thin films on the top of a silicon wafer, but without sculpting the wafer itself. The films usually serve as either structural or sacrificial layers. Structural layers are frequently composed of polysilicon, silicon nitride, silicon dioxide, silicon carbide, or aluminum. Sacrificial layers are frequently composed of polysilicon, photoresist material, polimide, metals, or various types of oxides, such as PSG (phosphosilicate glass) and LTO (low-temperautre oxide). Successive deposition, etching, and patterning procedures are carried out to arrive at the desired microstructure. In a typical surface micromachining process, a silicon substrate is coated with an isolation layer, and a sacrificial layer is deposited on the coated substrate. Windows are opened in the sacrificial layer, and a structural layer is then deposited and etched. The sacrificial layer is then selectively etched to form a free-standing, movable microstructure such as a beam or a cantilever out of the structural layer. The microstructure is ordinarily anchored to the silicon substrate, and can be designed to be movable in response to an input from an appropriate actuating mechanism.

MEMS variable capacitors have been fabricated that include a movable, capacitive plate (or electrode) that is suspended above first and second coplanar electrodes. The variable capacitor operates by applying a voltage across the first electrode and the movable plate so that the plate is deflected towards the first electrode by electrostatic attraction. As the movable plate moves, the spacing between the second electrode and the movable plate changes, thus changing the capacitance value between the second electrode and the plate. A signal line is usually connected to the second electrode and the plate to sense the change in capacitance for use in various Radio Frequency functions. One problem with this configuration is that the voltage supply is electrically connected to the signal line through the plate that can result in undesirable noise/interference or degradation of the signal on the signal line. Thus, this configuration may require additional components to combine/separate the signal and actuation voltage, leading to a more complex and costly implementation. Another problem is that the RF voltage exerts an equivalent force on the movable plate to that exerted by the intended control voltage, leading to control complexity and increased intermodulation.

Other known MEMS variable capacitors provide parallel-plate electrodes that move linearly. The electrodes of these variable capacitors are subject to suddenly "snapping down" towards one another after moving close enough to one another. These types of variable capacitors are also subject to microphonics and stiction problems.

Some MEMS variable capacitors are based upon electro-thermally actuated parallel-plate design. These types of variable capacitors are subject to reduced power handling capability due to gap reduction and the likelihood for breakdown occurrence. These variable capacitors also consume excessive power, especially if the electro-thermal actuation must be applied continuously to maintain the capacitance value.

Other MEMS variable capacitors utilize a massively-parallel, interdigited-comb device for actuation. These variable capacitors are so sensitive to parasitic substrate capacitance that they require either a high-resistivity substrate such as glass or the removal of the substrate beneath the MEMS device. Thus, this type of variable capacitor is not readily integrated into a conventional integrated circuit (IC) process. Additionally, the MEMS device is physically large because the capacitance dependence on the overlap of comb fingers requires large aspect ratios. These devices require excessive space and cause a low resonant frequency resulting in shock and vibration problems.

Therefore, it is desirable to provide novel variable capacitor apparatuses and related methods for MEMS applications that improve upon aforementioned designs.

SUMMARY

It is an object to provide a MEMS variable capacitor for electrically isolating the capacitive and actuation plates. It is also an object to provide a MEMS variable capacitor for reducing electrostatic instability. Further, it is an object to at least partially mechanically decouple the movable capacitive and actuation plates of a MEMS variable capacitor. It is therefore an object to provide novel MEMS variable capacitor apparatuses and related methods.

Some of the objects of the present disclosure having been stated hereinabove, and which are addressed in whole or in part by the present disclosure, other objects will become evident as the description proceeds when taken in connection with the accompanying drawings as best described hereinbelow.

BRIEF DESCRIPTION OF THE DRAWINGS

Exemplary embodiments will now be explained with reference to the accompanying drawings, of which:

FIG. 3 is a cross-sectional side view of the variable capacitor shown in FIG. 2A with the voltage applied to a movable actuation electrode and a stationary actuation electrode set greater than 0 Volts;

FIG. 15A, 15B, and 15C are computer simulation models of deformation of movable component under a stress gradient between +10 and −10 MPa;

FIG. 21 is a computer simulation model of the z-displacement of a variable capacitor having a tether length of 75 micrometers and peripheral portion width of 75 micrometers at an actuation voltage set at 14 Volts;

FIG. 24 is another computer simulation model of the z-displacement of an interior portion of a variable capacitor exposed to a temperature difference;

FIG. 52 is a computer simulation model of the deformation of a movable component in a torsional variable capacitor for an acceleration of 100 g;

DETAILED DESCRIPTION

Figure 1:
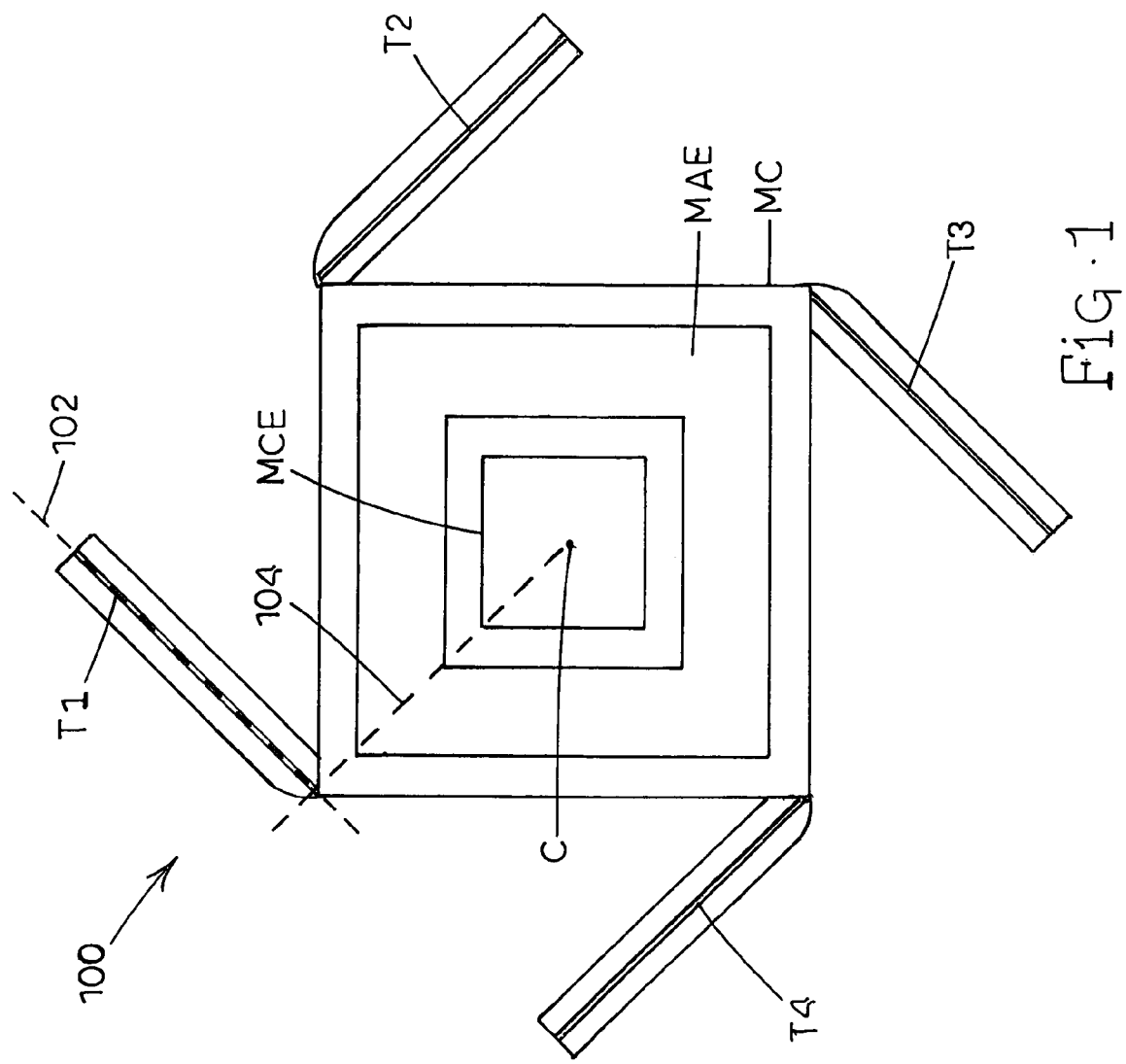
FIG. 1 is a top view of an exemplary MEMS variable capacitor.

It is understood that when a component such as a layer, substrate, contact, interconnect, electrode, capacitive plate, or conductive line is referred to herein as being deposited or formed "on" another component, that component can be directly on the other component or, alternatively, intervening components (for example, one or more buffer or transition layers, interlayers, electrodes or contacts) can also be present. Furthermore, it is understood that the terms "disposed on", "attached to" and "formed on" are used interchangeably to describe how a given component is positioned or situated in relation to another component. Therefore, it will be understood that the terms "disposed on", "attached to" and "formed on" do not introduce any limitations relating to particular methods of material transport, deposition, or fabrication.

Contacts, interconnects, electrodes, capacitive plates, conductive lines, and other various conductive elements of various metals can be formed by sputtering, CVD, or evaporation. If gold, copper, nickel or Permalloy™ ($Ni_xFe_y$) is employed as the metal element, an electroplating process can be carried out to transport the material to a desired surface. The chemical solutions used in the electroplating of various metals are generally known. Some metals, such as gold, might require an appropriate intermediate adhesion layer to prevent peeling. Examples of adhesion material often used include chromium, titanium, or an alloy such as titanium-tungsten (TiW). Some metal combinations can require a diffusion barrier to prevent a chromium adhesion layer from diffusing through gold. Examples of diffusion barriers between gold and chromium would include platinum or nickel.

Conventional lithographic techniques can be employed in accordance with micromachining of the variable capacitors. Accordingly, basic lithographic process steps such as photoresist application, optical exposure, and the use of developers are not described in detail herein.

Similarly, generally known-etching processes can be employed to selectively remove material or regions of material. An imaged photoresist layer is ordinarily used as a masking template. A pattern can be etched directly into the bulk of a substrate, or into a thin film or layer that is then used as a mask for subsequent etching steps.

The type of etching process employed in a particular fabrication step (e.g., wet, dry, isotropic, anisotropic, anisotropic-orientation dependent), the etch rate, and the type of etchant used will depend on the composition of material to be removed, the composition of any masking or etch-stop layer to be used, and the profile of the etched region to be formed. As examples, poly-etch ($HF:HNO_3:CH_3COOH$) can generally be used for isotropic wet etching. Hydroxides of alkali metals (e.g., KOH), simple ammonium hydroxide ($NH_4OH$), quaternary (tetramethl) ammonium hydroxide (($CH_3)_4NOH$, also known commercially as TMAH), and ethylenediamine mixed with pyrochatechol in water (EDP) can be used for anisotropic wet etching to fabricate V-shaped or tapered grooves, trenches or cavities. Silicon nitride is typically used as the masking material against ethcing by KOH, and thus can be used in conjunction with the selective etching of silicon. Silicon dioxide is slowly etched by KOH, and thus can be used as a masking layer if the etch time is short. While KOH will etch undoped silicon, heavily doped (p++) silicon can be used as an etch-stop against KOH as well as the alkaline etchants and EDP. The preferred metal used to form contacts and interconnects is gold, which is resistant to EDP. The adhesion layer applied in connection with forming a gold component (e.g., chromium) is also resistant to EDP.

It will be appreciated that electrochemical etching in hydroxide solution can be performed instead of timed wet etching. For example, if a p-type silicon wafer is used as a substrate, an etch-stop can be created by epitaxially growing an n-type silicon end layer to form a p-n junction diode. A voltage is applied between the n-type layer and an electrode disposed in the solution to reverse-bias the p-n junction. As a result, the bulk p-type silicon is etched through a mask down to the p-n junction, stopping at the n-type layer. Furthermore, photovoltaic and galvanic etch-stop techniques are also suitable.

Dry etching techniques such as plasma-phase etching and reactive ion etching (RIE) can also be used to remove silicon and its oxides and nitrides, as well as various metals. Deep reactive ion etching (DRIE) can be used to anisotropically etch deep, vertical trenches in bulk layers. Silicon dioxide is typically used as an etch-stop against DRIE, and thus structures containing a buried silicon dioxide layer, such as silicon-on-insulator (SOI) wafers, can be used as starting substrates for the fabrication of microstructures.

An alternative patterning process to etching is the lift-off process. In this case, the conventional photolithography techniques are used for the negative image of the desired pattern. This process is typically used to pattern metals, which are deposited as a continuous film or films when adhesion layers and diffusion barriers are needed. The metal is deposited on the regions where it is to be patterned and on top of the photoresist mask (negative image). The photoresist and metal on top are removed to leave behind the desired pattern of metal.

As used herein, the term "device" is interpreted to have a meaning interchangeable with the term "component".

As used herein, the term "conductive" is generally taken to encompass both conducting and semi-conducting materials.

Examples of the methods of the present subject matter will now be described with reference to the accompanying drawings.

Figure 2A:
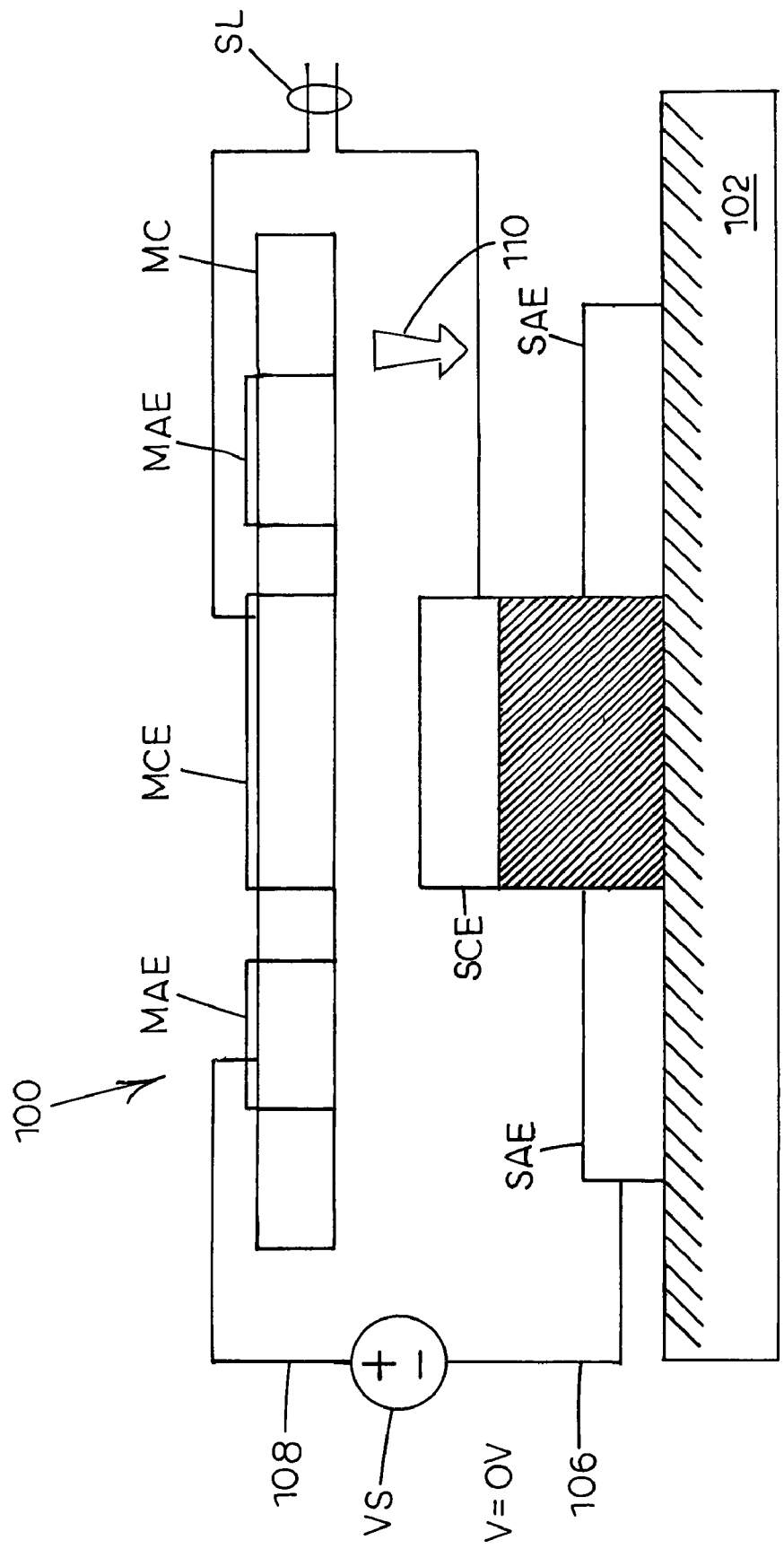
FIG. 2A is a cross-section side view of one embodiment of the variable capacitor shown in FIG. 1.

Referring to FIGS. 1-3, different views of an exemplary MEMS variable capacitor, generally designated 100, are illustrated. FIG. 1 illustrates a top view of variable capacitor 100 including a movable component MC suspended over a substrate (designated 200 in FIG. 2A). Movable component MC can include a movable actuation electrode MAE and a movable capacitive electrode MCE disposed on a top surface thereof. Alternatively, movable actuation electrode MAE and a movable capacitive electrode MCE can be connected to a bottom surface of movable component MC or the top and bottom surfaces can each include a movable actuation electrode and a movable capacitive electrode. Additionally, one of movable actuation electrode MAE and a movable capacitive electrode MCE can be a completely conducting section of movable component MC rather than a layer. Movable component MC can comprise one or more layers of silica, alumina, un-doped semiconductors, polymers, and other non-conductive materials known to those of skill in the art. The material of movable component MC can function to electrically isolate actuation electrode MAE from capacitive electrode MCE and provide flexibility for deflecting.

Movable component MC can include a plurality of tethers T1, T2, T3, and T4 connected to movable component MC for attaching movable component MC to posts (shown in FIG. 2A) or other suitable support structures, which may be the structural layer of movable component MC with a step formed by the edge of the sacrificial layer during fabrication. If the process is planarized, the support can be the whole "field" where the top surface is nearly planar. Posts P1 and P2 can be rigidly attached to a surface S of substrate 200 (shown in FIG. 2A). In this embodiment, tethers T1, T2, T3, and T4 extend along an at least substantially straight line that can be at least substantially perpendicular to a line extending from a center C of movable component MC to the connection of tether T1 to movable component MC. For example, tether T1 extends along broken line 102. Broken line 104 extends from center C to the point of attachment for tether T1 and movable component MC. Broken lines 102 and 104 are at least substantially perpendicular. Alternatively, broken lines 102 and 104 can be at other suitable angles with respect to one another. Tethers T1, T2, T3, and T4 can function as stress decouplers, in order to reduce the effects of in-plane stresses such as residual stress, mounting stress and thermal expansion mismatch stress. Additionally, tethers T1, T2, T3, and T4 can reduce the impact of the gradient of the out-of-plane distribution of these in-plane stresses. Tethers T1, T2, T3, and T4 can also reduce the impact of the average of the out-of-plane distribution. This results in making variable capacitor 100 less sensitive to process tolerances related to stress control. A voltage supply and signal line can be used to connect movable actuation electrode MAE and movable capacitive electrode MCE as shown with reference to subsequent figures.

FIG. 2A illustrates a cross-sectional side view of one embodiment of variable capacitor 100. Variable capacitor 100 can include substrate 200 comprising one or more layers, composites, or other combinations of silicon, alumina, silica, polymers and other suitable substrate materials known to those of ordinary skill in the art. A stationary actuation electrode SAE can be formed on surface 104 of substrate and positioned directly beneath movable actuation electrode MAE. Electrodes SAE and MAE can be connected to a voltage supply VS via conductive lines 106 and 108, respectively. Voltage supply VS can apply a voltage across electrodes SAE and MAE. An equal and opposite electrical charge develops on electrodes SAE and MAE upon the application of a voltage. The equal and opposite electrical charge causes an electrostatic force to pull movable actuation electrode MAE, and movable component MC, towards stationary actuation electrode SAE in a direction indicated by direction arrow 110. Tethers T1, T2, T3, and T4 can produce a biasing force to oppose movement of movable component MC in direction indicated by arrow 110. Movable component MC can move towards substrate 200 only when the voltage applied across electrodes SAE and MAE is great enough to overcome the resistive force of tethers T1, T2, T3, and T4. The voltage applied across electrodes SAE and MAE can be increased to deflect electrode MAE closer to electrode SAE than another position. Thus, the gap distance between electrodes SAE and MAE can be adjusted by controlling the voltage output by voltage supply VS. The voltage applied by voltage supply VS can be varied directly by an operator or other suitable electrical circuitry known to those of skill in the art for controlling the voltage output by a voltage supply. Movable component MC is shown in position when the voltage applied by voltage supply VS is 0 volts.

Variable capacitor 100 can also include a stationary capacitive electrode SCE attached to a base portion 112 disposed on substrate 200. Stationary capacitive electrode SCE can be positioned closer to movable component MC than stationary actuation electrode SAE, spaced apart vertically from stationary actuation electrode SAE, and immediately above base portion 112. Electrode SCE can be positioned directly below electrode MCE. Electrodes SCE and MCE can be electrically connected to a signal line SL for supplying a signal, typically AC, to variable capacitor VC from other electrical circuitry (not shown). Signal line SL can comprise of a highly-conductive metal such as gold, aluminum, silver, copper, or the like. Signal line SL can be connected to a high-frequency distribution network with minimum fixed capacitance. Typically, the electrical circuitry connected to signal line SL is sensitive to capacitance of variable capacitor 100. Capacitive electrodes MCE and SCE can be moved to different positions with respect to one another when voltage is applied to actuation electrodes MAE and SAE for moving movable component MC. Capacitive electrodes SCE and MCE and actuation electrodes SAE and MAE can comprise any suitable type of metal, semi-metal, or doped semiconductor. Capacitive electrodes SCE and MCE can comprise a highly conductive metal, such as copper, gold, silver, aluminum, or the like.

Figure 2B:
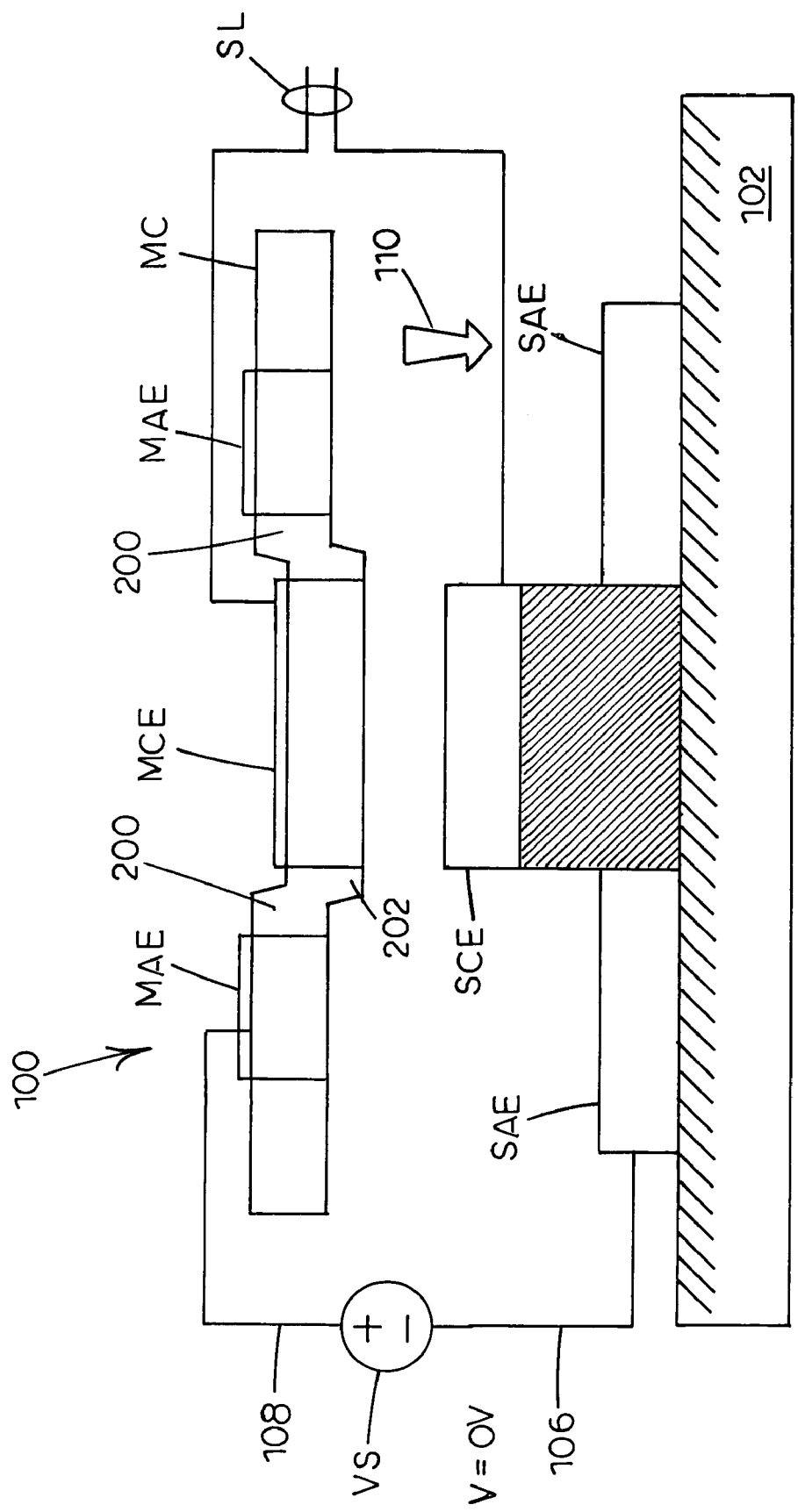
FIG. 2B is a cross-section side view of an alternative embodiment of the variable capacitor shown in FIG. 1.

FIG. 2B illustrates a cross-sectional side view of an alternative embodiment of variable capacitor 100. In this embodiment, movable component MC comprises a first portion 200 and a second portion 202, wherein second portion 202 is positioned closer to substrate 102 than first portion 200. Therefore, movable actuation electrode MAE and stationary actuation electrode SAE can be positioned further apart than the distance between movable capacitance electrode MCE and stationary capacitance electrode SCE to its attachment to first portion 200 because movable actuation electrode MAE is positioned on raised first portion 200. The dual gap can be formed by two different thicknesses of sacrificial layer.

Figure 2C:
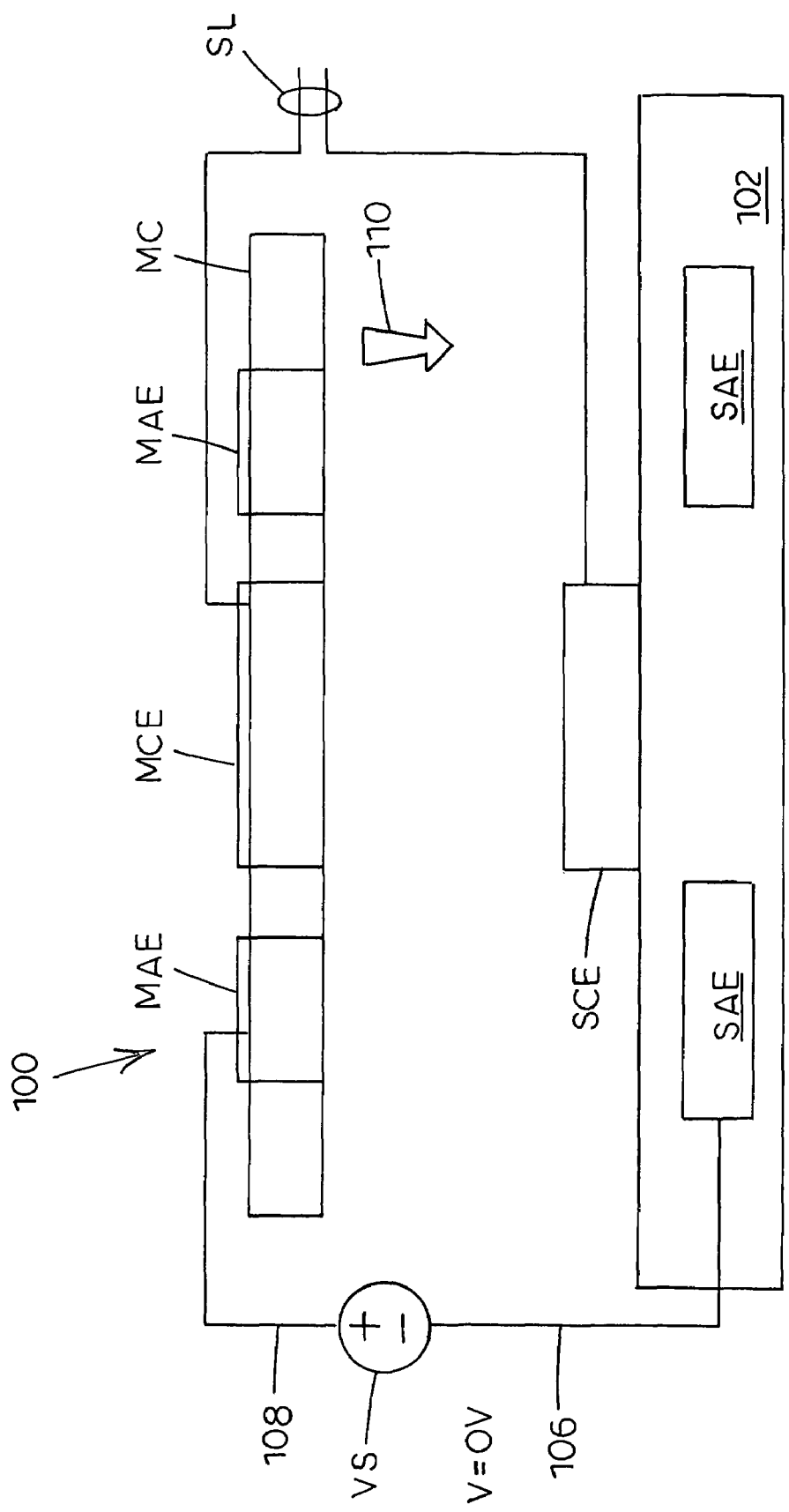
FIG. 2C is a cross-section side view of another alternative embodiment of the variable capacitor shown in FIG. 1.

FIG. 2C illustrates a cross-sectional side view of another alternative embodiment of variable capacitor 100. In this embodiment, stationary actuation electrode SAE is buried in substrate 102. Therefore, movable actuation electrode MAE and stationary actuation electrode SAE can be positioned further apart than the distance between movable capacitance electrode MCE and stationary capacitance electrode SCE to its attachment to first portion 200 because stationary actuation electrode SCE is buried in substrate 102. The dual gap can be formed by two different thicknesses of sacrificial layer.

Additionally, in another alternative of FIG. 2B, stationary capacitive electrode SCE can be positioned parallel with stationary actuation electrode SAE on substrate 102 such that electrode SCE and SAE are not in electrical communication. In this embodiment, the distance between capacitive electrodes MCE and SCE can be about 0.5 micrometers. Additionally, the distance between actuation electrodes MAE and SAE can be about 2.0 micrometers.

Referring to FIG. 2C illustrates a cross-sectional side view of another alternative embodiment of variable capacitor 100. In this embodiment, stationary actuation electrode SAE is attached directly onto the top surface of substrate 102. Stationary actuation electrode SAE can be buried in substrate 102. This positioning can increase the distance between stationary actuation electrode SAE and movable actuation electrode MAE without adding the complexity of additional sacrificial layers. Substrate 102 can comprise a dielectric or other suitable substrate material.

FIG. 3 illustrates a cross-sectional side view of the embodiment of variable capacitor 100 shown in FIG. 2A with the voltage applied to electrodes MAE and SAE set greater than 0 Volts. With the applied voltage set greater than 0 Volts, movable component MC can be positioned closer to substrate 200 than when the applied voltage is set to 0 (as shown in FIG. 2).

Figure 4:
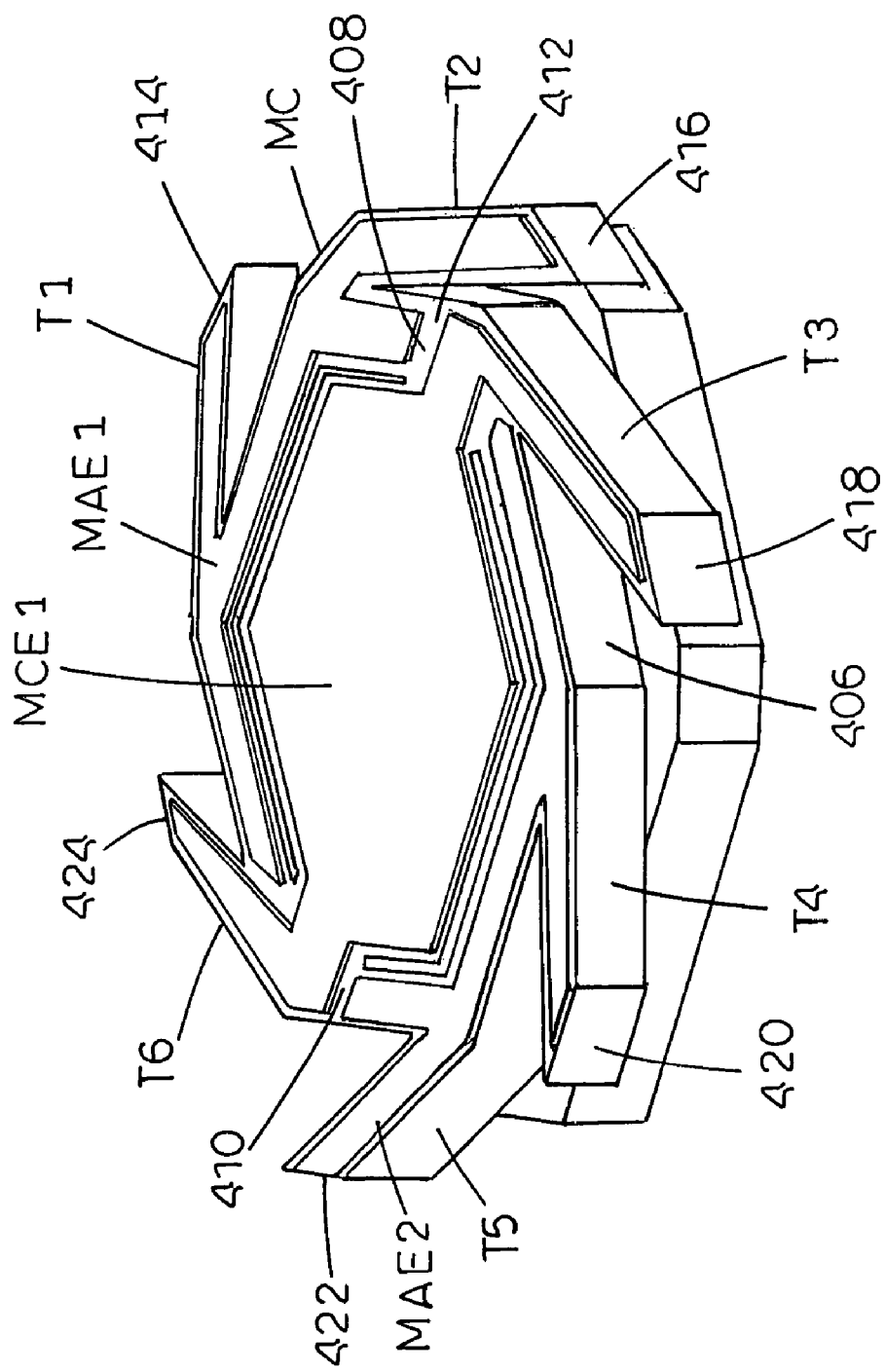
FIG. 4 is a top perspective view of a variable capacitor including a movable component suspended above a substrate.

Referring to FIGS. 4-8, different views of an exemplary hexagonal-shaped implementation of a variable capacitor, generally designated 400, are illustrated. FIG. 4 illustrates a top perspective view of variable capacitor 400 including a movable component MC suspended above a substrate 402. Movable component MC can include movable actuation electrodes MAE1 and MAE2 and a movable capacitive electrode MCE1 attached to a top surface 404 of movable component MC.

Referring to FIG. 4, movable component MC can include a peripheral portion 406 and an interior portion 408. In this embodiment, peripheral portion 406 is hexagonal in shape with a hollow interior for enclosing interior portion 408. Interior portion 408 can be attached to peripheral portion 406 with connectors 410 and 412. There should be at least two connectors according to this embodiment. The exact number of connectors in alternative embodiments can depend on the geometry and design rules of a specific design and process. Peripheral portion 406 can be attached to substrate 402 via a plurality of tethers T1, T2, T3, T4, T5, and T6. Tethers T1, T2, T3, T4, T5, and T6 can include ends 414, 416, 418, 420, 422, and 424, respectively, attached to posts (shown in FIG. 5). The posts or other support structures can be rigidly attached to substrate 402.

Figure 5:
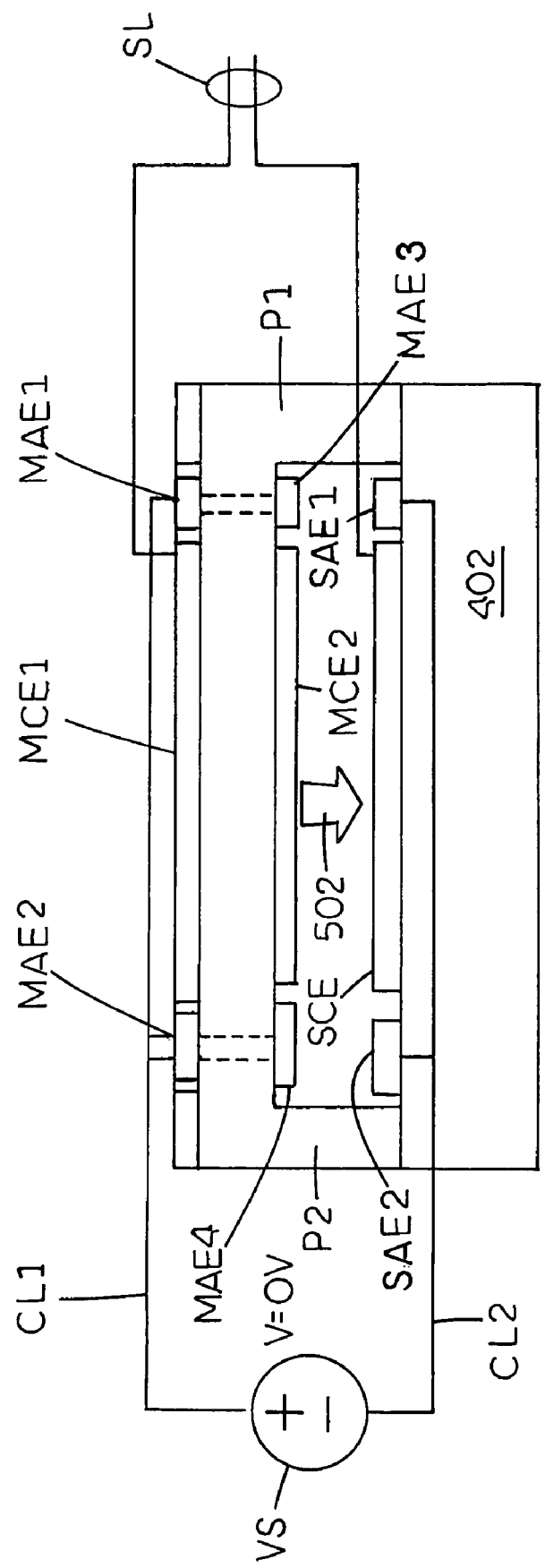
FIG. 5 is a cross-sectional side view of the variable capacitor shown in FIG. 4.

FIG. 5 illustrates a cross-sectional side view of variable capacitor 400. Variable capacitor 400 can include posts P1 and P2 or other suitable support structures for attachment to tethers T3 and T6, respectively. Tethers T1, T2, T4, and T5 (shown in FIG. 4) can also be attached to posts (not shown) such as posts P1 and P2 for attachment to substrate 402. Movable component MC can also include movable actuation electrodes MAE3 and MAE4 attached to bottom surface 500 and opposing electrodes MAE1 and MAE2, respectively. Movable component MC can also include a movable capacitive electrode MCE2 attached to bottom surface 500 and opposing electrode MCE1. Additionally, a movable actuation electrode (such as movable actuation electrode MAE3) can be positioned on movable component MC directly opposing movable capacitive electrode MCE1. Electrodes MAE1 and MAE3 can be in electrical communication via a conductive interconnect CI1 extending through movable component MC. Electrodes MAE2 and MAE4 can be in electrical communication via a conductive interconnect CI2 extending through movable component MC. Electrodes MCE1 and MCE2 can be in electrical communication via a conductive interconnect CI3 extending through movable component MC. Electrodes MAE1, MAE2, MAE3, MAE4, MCE1, MCE2 can comprise the same conductive material and be matched in shape and dimension to its opposing counterpart on movable component MC for mechanical stress matching of interior portion 408 (FIG. 4) of movable component MC. Alternatively, electrodes MAE1, MAE2, MAE3, MAE4, MCE1, MCE2 can have different suitable shapes and comprise different materials for providing desired stress matching.

Variable capacitor 400 can also include stationary actuation electrodes SAE1 and SAE2 positioned on the top surface of substrate 402 and beneath movable actuation electrodes MAE1 and MAE2, respectively. Alternatively, movable actuation electrodes MAE1 and MAE2 can comprise a single actuation electrode as can be appreciated by one of skill in the art. Variable capacitor 400 can also include a stationary capacitive electrode SCE positioned on the top surface of substrate 402 and beneath movable capacitive electrode MCE2. Movable actuation electrodes MAE1, MAE2, MAE3, and MAE4 can be connected to a voltage supply VS via conductive line CL1. Stationary actuation electrodes SAE1 and SAE2 can be connected to voltage supply VS via conductive line CL2. Voltage supply VS can apply one voltage potential at movable actuation electrodes MAE1 and MAE2 and a different voltage potential at stationary actuation electrodes SAE1 and SAE2. The equal and opposite electrical charge causes an electrostatic force to pull movable actuation electrodes MAE1, MAE2, MAE3, and MAE4, and movable component MC, towards stationary actuation electrodes SAE1 and SAE2 in a direction indicated by direction arrow 502. Tethers T1, T2, T3, T4, T5, and T6 can produce a biasing force to oppose movement of movable component MC in direction indicated by arrow 502. Movable component MC can move towards substrate 402 only when the voltage applied across the stationary actuation electrodes (SAE1 and SAE2) and the movable actuation electrodes (MAE1, MAE2, MAE3, and MAE4) is great enough to overcome the resistive force of tethers T1, T2, T3, T4, T5, and T6. Movable component MC is shown in position when the voltage applied by voltage supply VS is 0 Volts. In this embodiment, when voltage supply VS is 0 Volts, movable capacitive electrode MCE2 is separated from stationary capacitive electrode by about 0.5 micrometers. Additionally, in this embodiment, when voltage supply VS is 0 Volts, movable actuation electrodes MAE3 and MAE4 can be separated from SAE2 and SAE1, respectively, by about between 1.5 and 2.0 micrometers.

Variable capacitor 400 can also include a stationary capacitive electrode SCE attached to the top surface of substrate 402 and beneath movable capacitive electrode MCE1 and MCE2.

Electrodes SCE, MCE1, and MCE2 can be electrically connected to a signal line SL for supplying a signal, typically AC, to variable capacitor 400 from other electrical circuitry (not shown). Movable capacitive electrodes MCE1 and MCE2 can be moved to different positions with respect to stationary capacitive electrode SCE when voltage is applied to movable actuation electrodes (MAE1, MAE2, MAE3, and MAE4) and stationary actuation electrodes (SAE1 and SAE2) for moving movable component MC such that capacitance is changed between movable capacitive electrodes MCE1 and MCE2 and stationary capacitive electrode SCE.

Figure 6:
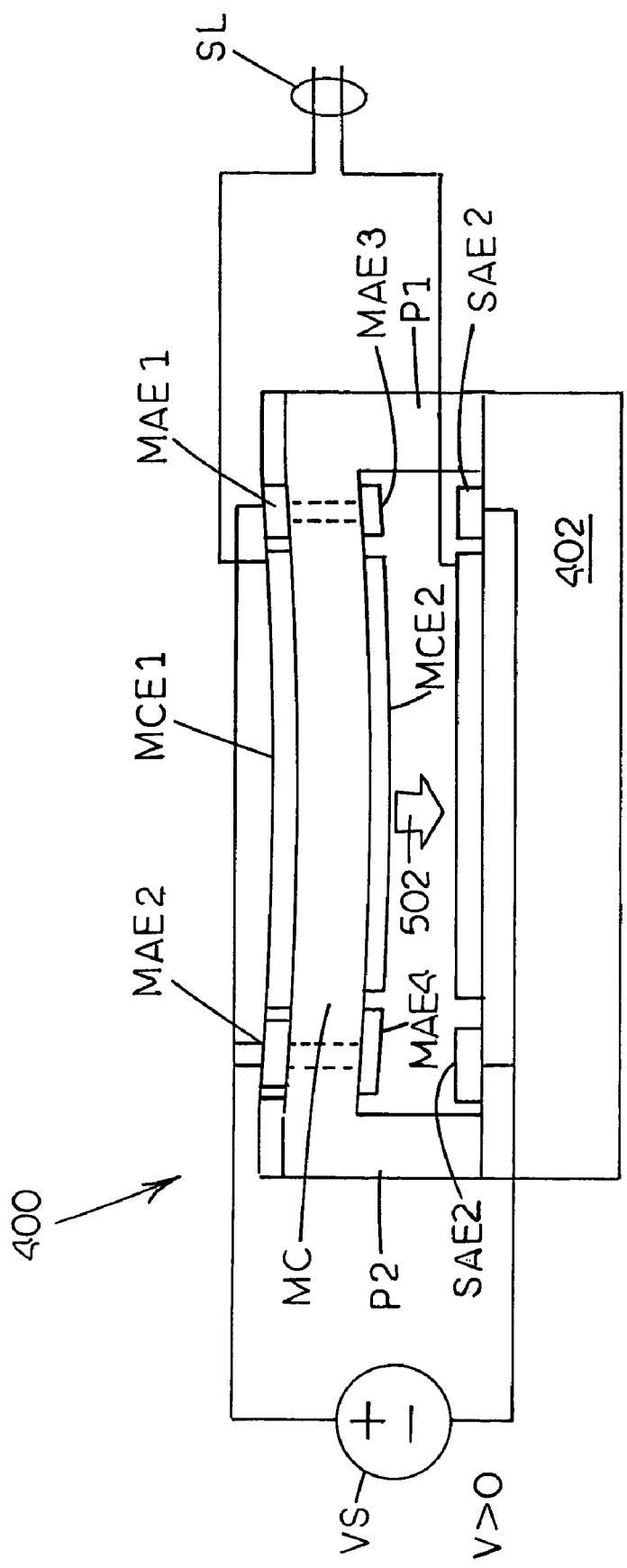
FIG. 6 is another cross-sectional side view of the variable capacitor shown in FIG. 4.

Referring to FIG. 6, another cross-sectional side view of variable capacitor 400 is illustrated. The voltage applied across movable actuation electrodes (MAE1, MAE2, MAE3, and MAE4) and stationary actuation electrodes (SAE1 and SAE2) is greater than a 0 Volts for overcoming the resistive force of tethers T1, T2, T3, T4, T5, and T6. With the applied voltage set greater than 0 Volts, peripheral portion 406 can be positioned closer to substrate 402 than when the applied voltage is set to 0 (as shown in FIG. 2). Interior portion 408 can also move closer to substrate 402 when peripheral portion 406 is moved towards substrate 402 due to the attachment of interior portion 408 to peripheral portion 406 with connectors 410 and 412.

Interior portion 408 can be substantially, mechanically isolated from peripheral portion 406 because interior portion 408 is only attached to peripheral portion 406 via connectors 410 and 412. Therefore, the deformation of interior portion 408 is substantially limited when its peripheral portion 406 moves towards substrate 402. If only two connectors are used as in this exemplary embodiment, connectors 410 and 412 can include a cross-sectional area large enough to suppress torsional motion. According to one embodiment connectors 410 and 412 are substantially wider than the thickness of movable component MC and substantially shorter than they are wide. Connectors 410 and 412 can range in width between 0.5 micrometers and 100 micrometers. The thickness of movable component MC can be between about 0.5 and 20 microns. The width of connectors 410 and 412 can be greater than 5 times the thickness. The length of connectors 410 and 412 can be about 5 micrometers. This is advantageous because interior portion 408 and its attached movable capacitive electrode MCE can remain substantially planar when moved towards substrate 402.

Figure 7:
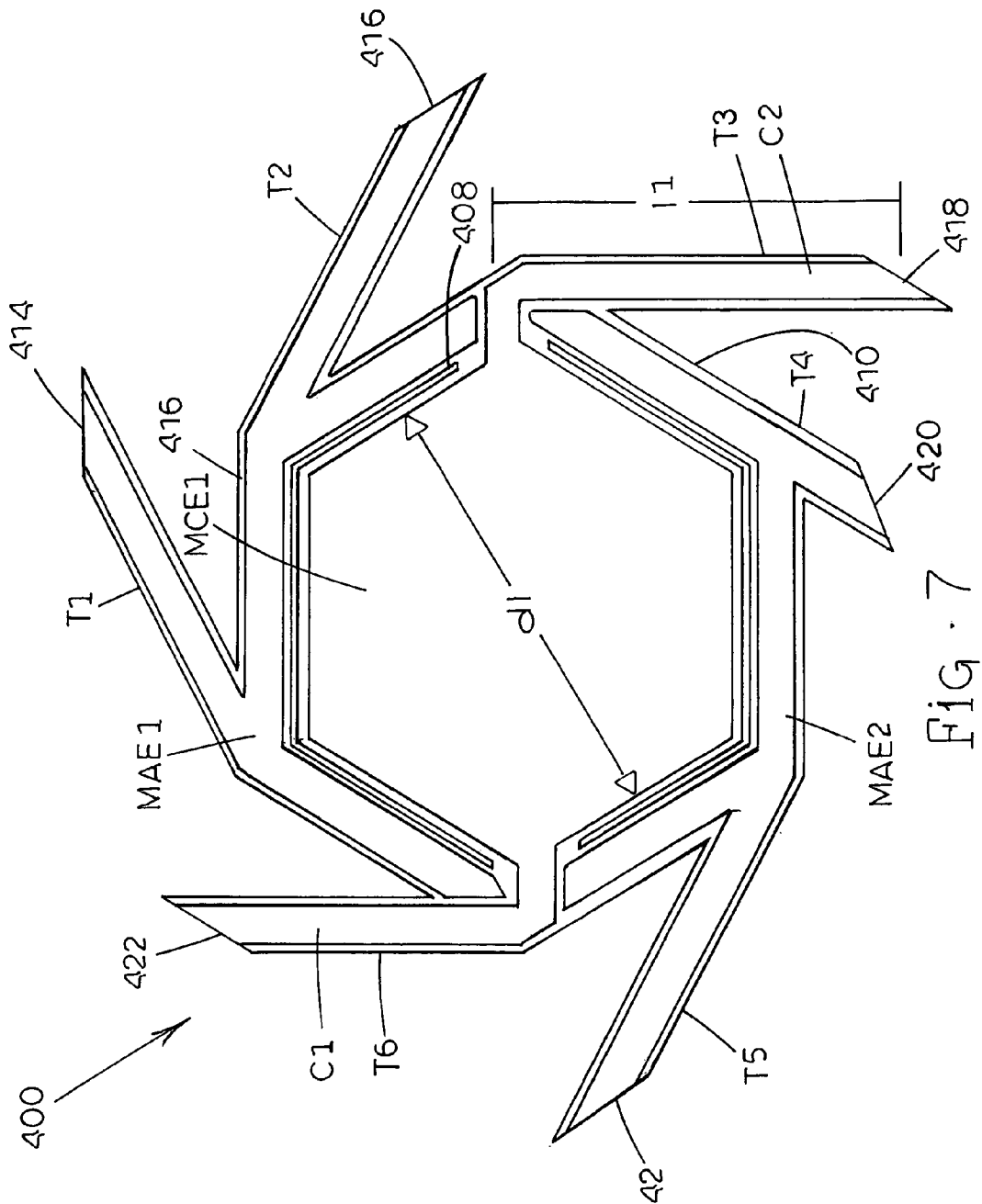
FIG. 7 is a top view of variable capacitor shown in FIG. 4.

Referring to FIG. 7, a top view of variable capacitor 400 is illustrated. Movable capacitive electrode MCE1 can be connected to signal line SL via conduits C1 and C2 disposed on top of movable component MC. Conduits C1 and C2 can extend from movable capacitive electrode MCE along tethers T6 and T3, respectively, for connection to signal line SL.

Referring to FIG. 7, movable capacitive electrode MCE1 can have a hexagonal shape with a diameter d1 of between about 25 micrometers and 2 millimeters. In one embodiment, peripheral component 406 has a width of about 45 micrometers. Alternatively, peripheral component 406 can range between 25 micrometers and 1 millimeter. Tethers T1, T2, T3, T4, T5, and T6 can have a length between about 100 and 250 micrometers.

Figure 8:
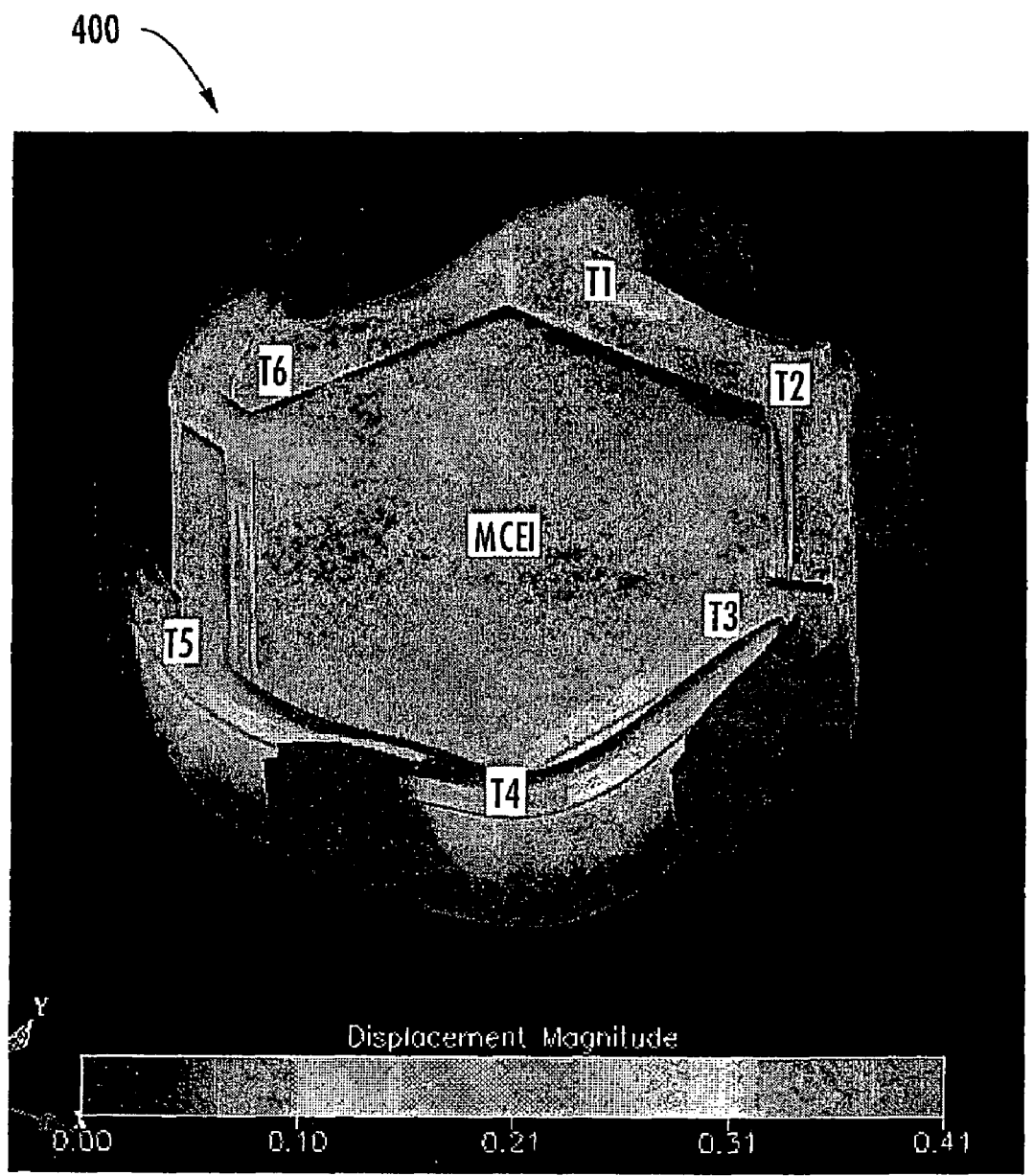
FIG. 8 is a top perspective view of the variable capacitor shown in FIG. 4 with the voltage applied to the actuation electrodes set to a voltage greater than 0 Volts for overcoming the resistive force of tethers.

FIG. 8 illustrates a top perspective view of variable capacitor 400 with the voltage applied to electrodes MAE1, MAE2, MAE3, and MAE4 and SAE is set to a voltage greater than 0 Volts for overcoming the resistive force of tethers T1, T2, T3, T4, T5, and T6. With the applied voltage set to a voltage greater than 0 Volts, movable component MC can be positioned closer to substrate 200 than when the applied voltage is set to 0 (as shown in FIG. 2).

Simulations have demonstrated that the embodiment shown in FIGS. 4-7 can achieve a high impedance control input (with minimum leakage up to about 100 Volts), an operating frequency of between 0 and 10 GHz, a series resistance of less than 0.5 ohms and typically less than 0.2 ohms, a vibration sensitivity of less than 0.5% capacitance variation for 0.3 g@1 kHz, and a control input cut-off frequency of greater and 20 kHz.

One important consideration concerns the harmonic behavior of the variable capacitor. The variable capacitor is typically operated in normal air conditions with a very small air gap (between about 0.5 and 0.01 micrometers). When the movable component acts as a piston, the air in the air gap between the movable component and the substrate can act as a squeeze-film and its effects can be strongly dependent on the frequency of the motion. Apertures can be formed in a movable component to reduce the effects of the air in the air gap between the movable component and the substrate.

The quality of resonance (Q) can also be measured for the embodiment shown in FIGS. 4-7. Generally, Q refers to power dissipation/(energy stored*radian frequency). There are two resonance qualities of interest with regard to this embodiment. One resonance quality of interest is the mechanical quality of resonance of movable component MC. This can typically be low due to air damping. However, if it is too low, it will slow down the response of variable capacitor 400. A mechanical quality Q on the order of unity is desirable. This can be designed through the gap selected between movable component MC and substrate 402 and spacing in movable component MC and size/quantities of apertures (described below).

Another resonance quality Q is the electrical resonance quality of variable capacitor 400. To first order, this resonance quality Q is provided by the following equation:

$$\left(\text{radian frequency} \frac{1}{*\text{capacitance}*} \text{ series resistance}\right)$$

This quality of resonance Q should be as high as possible, such as greater than 100. This can be achieved with a low resistance conduit.

Another key parameter is the tuning ratio which is the ratio between the maximum and minimum capacitances achievable by the variable capacitor. This should be as high as possible with a value greater than 4 being useful and a value greater than 8 considered very desirable. This is achieved by enabling the gap between movable capacitive electrode MCE and station capacitive electrode SCE to be varied stably over a wide range and by low parasitics such as fixed capacitances at the edges and at the conduits.

A mechanical resonance frequency calculation can be performed for a small-signal excitation at an "undeformed" state of variable capacitor with voltage set to 0. Damping effects can be considered. Additionally, experiments demonstrate that the variable capacitor embodiment shown in FIG. 4-7 can have a resonance frequency above 20 kHz. The first resonance mode occurs at 21.6 kHz. The displacement of movable component MC with respect to substrate 402 (z-displacement) for this mode is a "flapping" mode.

Figure 9:
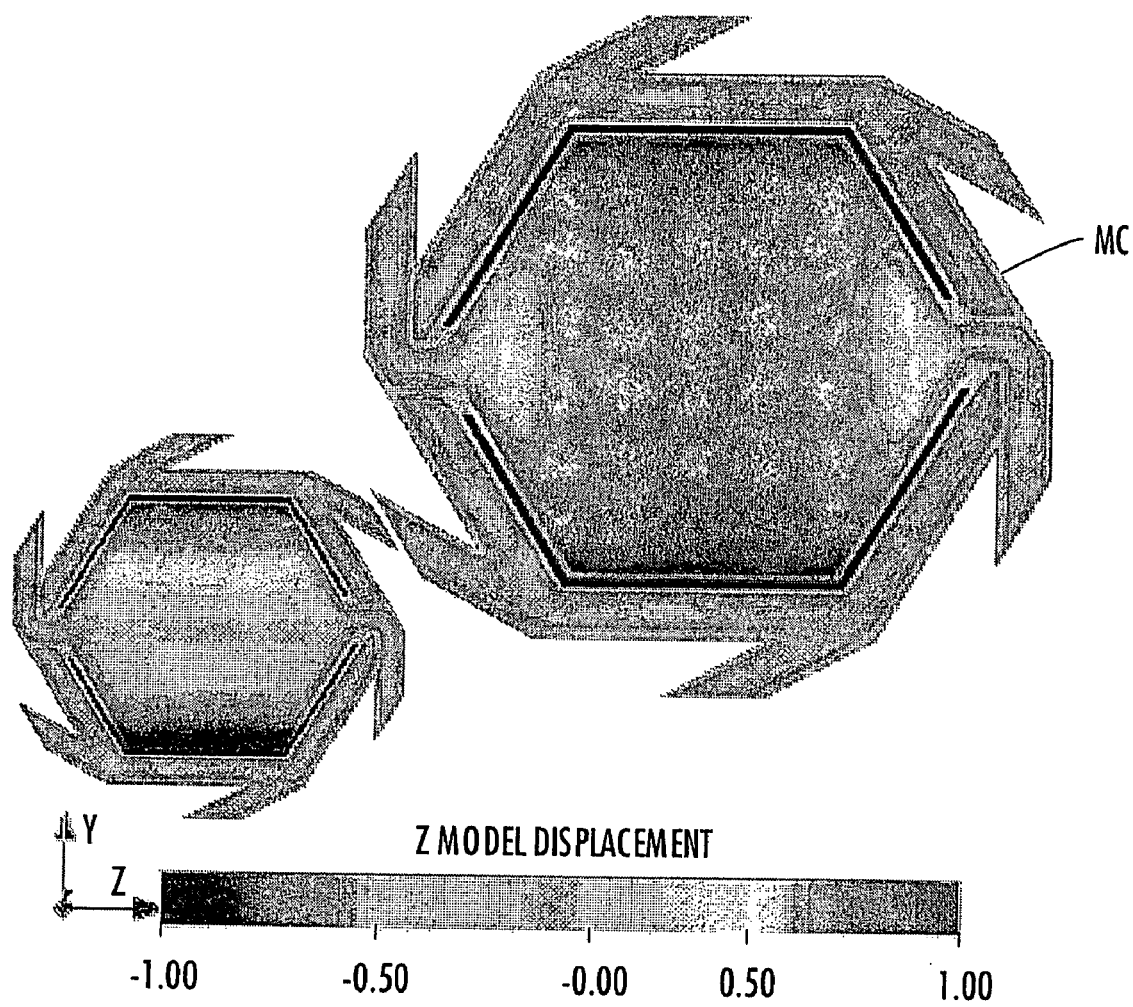
FIG. 9 is a computer simulation model of the z-displacement of a movable component at its first resonance mode.

FIG. 9 illustrates a computer simulation model of the z-displacement of movable component MC at the first resonance mode of 21.6 kHz. The edges of movable component MC exhibit the largest displacement. The edges are in phase, meaning that the two edges are moving in the same direction.

A second resonance mode occurs at 23.4 kHz. The second resonance mode is a "torsional" mode, where the edges move out-of-phase (one edge goes up while the other edge goes down).

Figure 10:
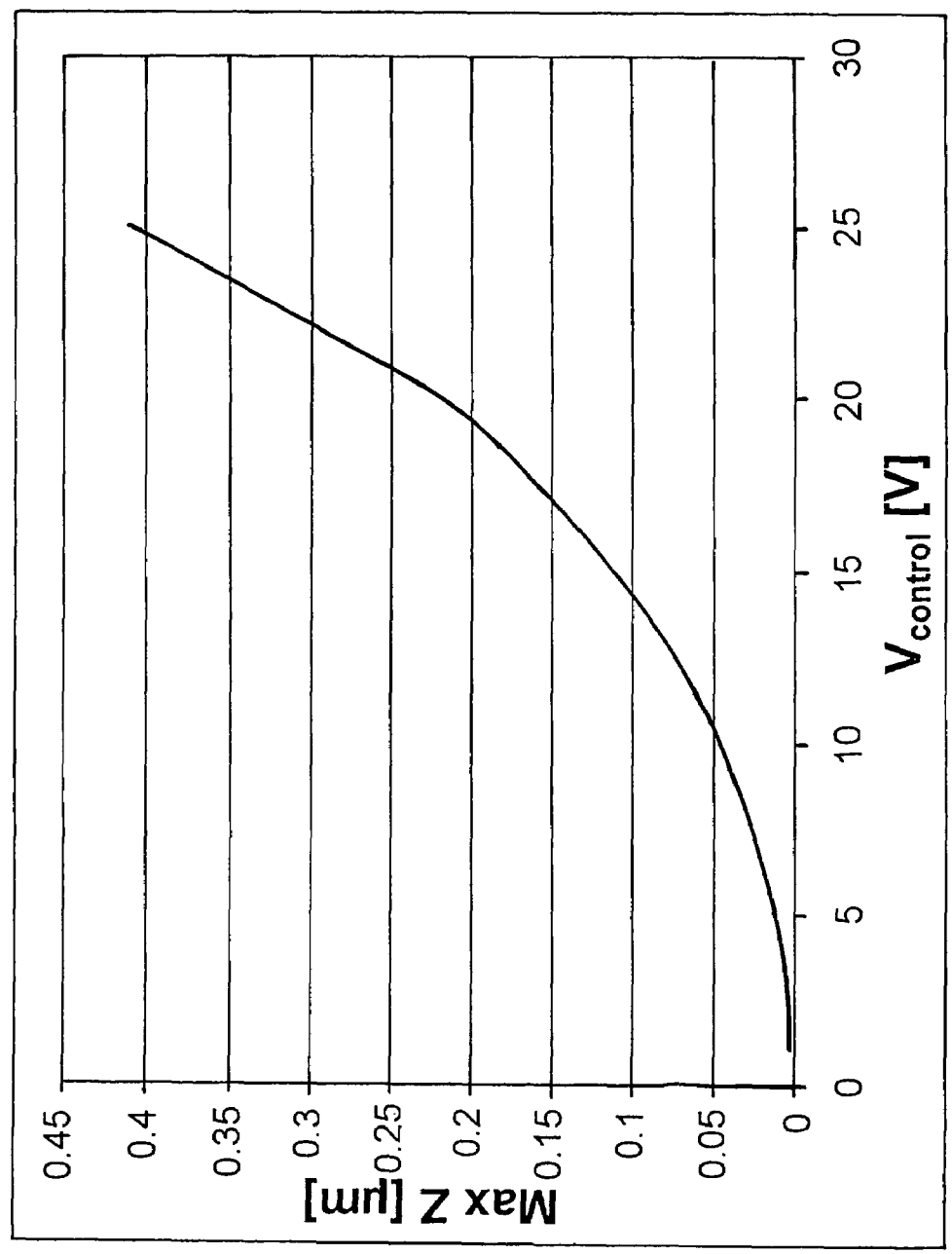
FIG. 10 is a computer simulation model of the z-displacement of a movable component versus actuation voltage.
Figure 11:
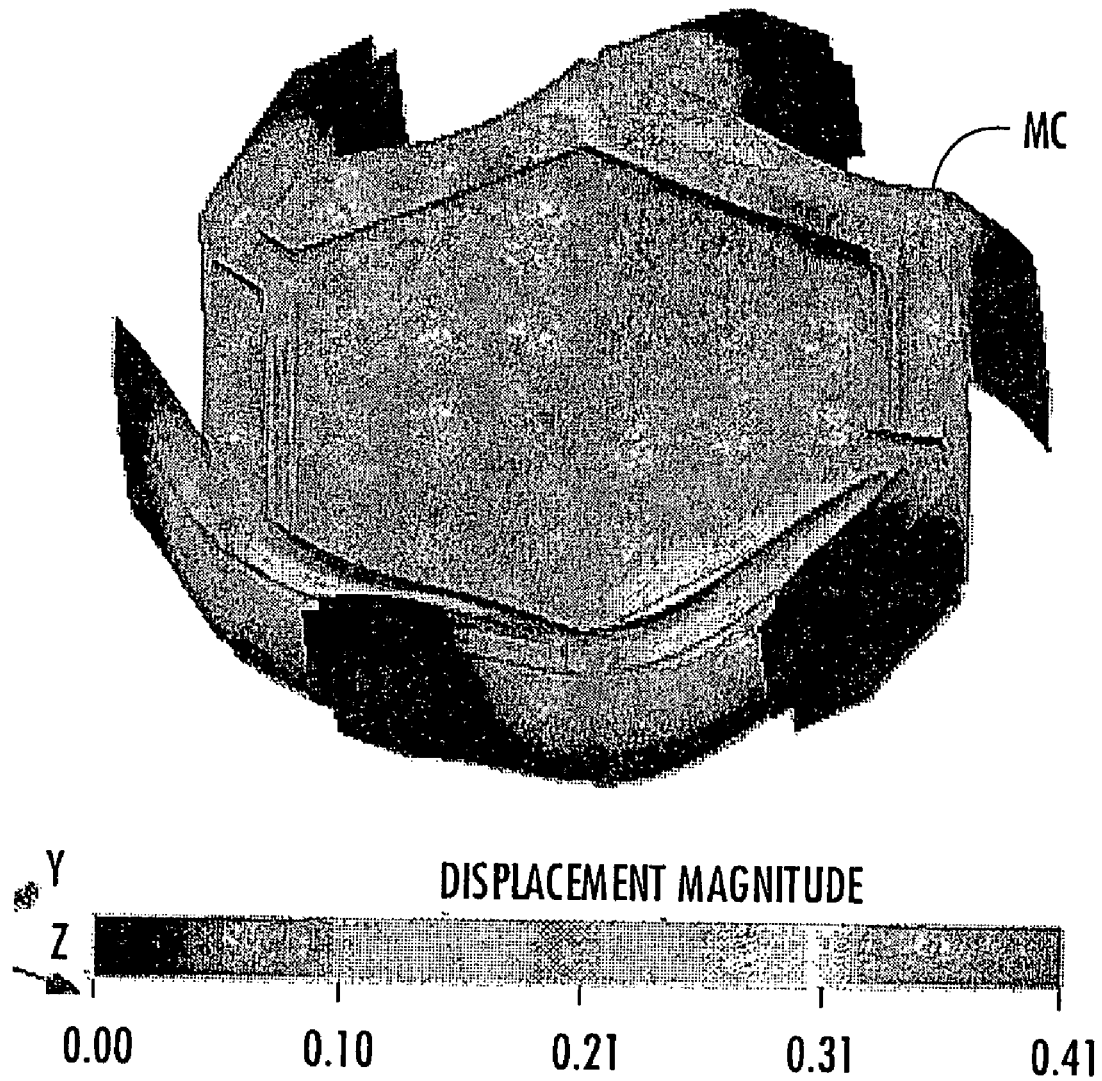
FIG. 11 is a computer simulation model of the z-displacement of movable component for an actuation voltage of about 25 Volts.

FIG. 10 illustrates a graph showing displacement of center C (μm) of movable component MC versus voltage applied to electrodes MAE and SAE. FIG. 11 illustrates a computer simulation model of the z-displacement of movable component MC for an actuation voltage of about 25 Volts. Although a gap ratio of 3 is nominally stable for parallel plate actuation, the deformation of the plates during actuation creates non-planarity and thus introduces instability. This is solved by increasing the gap ratio to grater than 3 to provide margin. However, increasing the gap ratio also increases the control voltage for a given capacitor gap so it should not be increased more than necessary. Typical embodiments have gap ratios of about 4. Deformation is not due to the electrostatic force acting on interior portion 408 (shown in FIG. 4), but due to the tilt of peripheral portion 406 (shown in FIG. 4) at points where interior portion 408 is attached to peripheral portion 406 (i.e., where connectors 410 and 412 shown in FIG. 4 contact interior portion 408). Bending of moving capacitive electrodes MCE1 and MCE2 can have an adverse effect on the capacitance value.

Referring to again FIG. 5, any radio frequency (RF) signals on signal line SL can generate an electrical force on movable component MC due to the electrical charge generated on stationary capacitive electrode SCE and movable capacitive electrodes MCE1 and MCE2. Because the electrical force is related to the square of the voltage and the area of actuation, the AC voltage can introduce a net DC force between stationary capacitive electrode SCE and movable capacitive electrodes MCE1 and MCE2. For example, when an RF-signal of 0.5 $V_{pp}$ is applied, the equivalent of a 0.18 DC Volts is applied between stationary capacitive electrode SCE and movable capacitive electrodes MCE1 and MCE2. For example, when 15 Volts is applied over an air-gap of 1.5 micrometers, an equivalent pressure of about 885 Pa is generated. In contrast, for example, when 0.18 Volts is applied over an air-gap of 0.5 micrometers, an equivalent pressure of about 1.15 Pa is generated. Even for a displacement as high as 0.4 micrometers, the equivalent pressure of actuation electrodes MAE1, MAE2, MAE3, MAE4, SAE1, and SAE2 is about 1645 Pa. In contrast, the equivalent pressure from 0.18 Volts applied over the remaining 0.1 micrometers is 29 Pa. Therefore, movable component MC position is primarily determined by actuation voltage until the RF gap is very small as long as the areas of the actuation electrodes are on the order of or significantly larger than the area of the capacitance electrodes.

Figure 12:
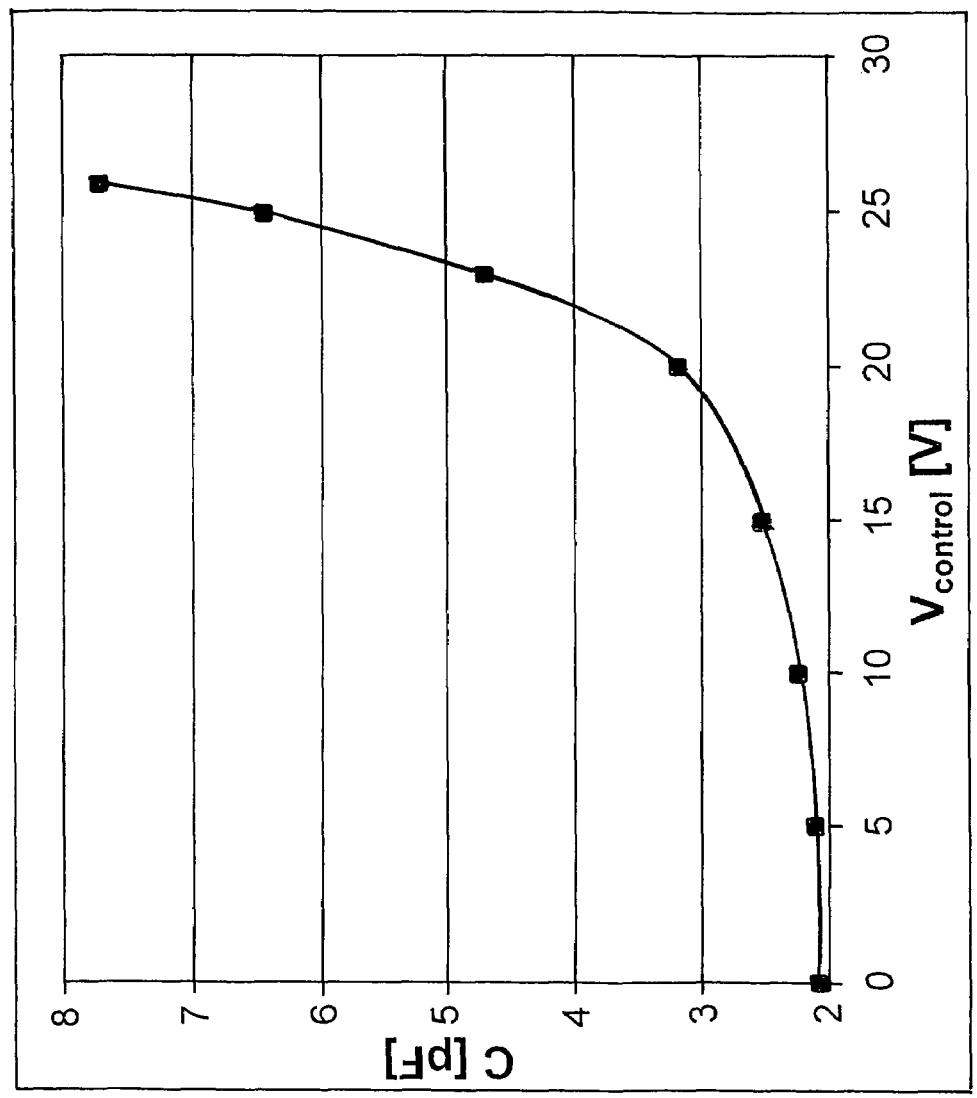
FIG. 12 is a graph showing capacitance (pF) between stationary capacitive electrode and movable capacitive electrodes versus voltage applied to electrodes shown in FIG. 5.

FIG. 12 illustrates a graph showing capacitance (pF) between stationary capacitive electrode SCE and movable capacitive electrodes MCE1 and MCE2 versus voltage applied to electrodes SAE1, SAE2, MAE1, MAE2, MAE3, and MAE4 shown in FIG. 5. The minimum capacitance in this embodiment with actuation voltage set at 0 Volts is about 2.1 pF. The capacitance ratio is about 1:3.6.

Figure 13A:
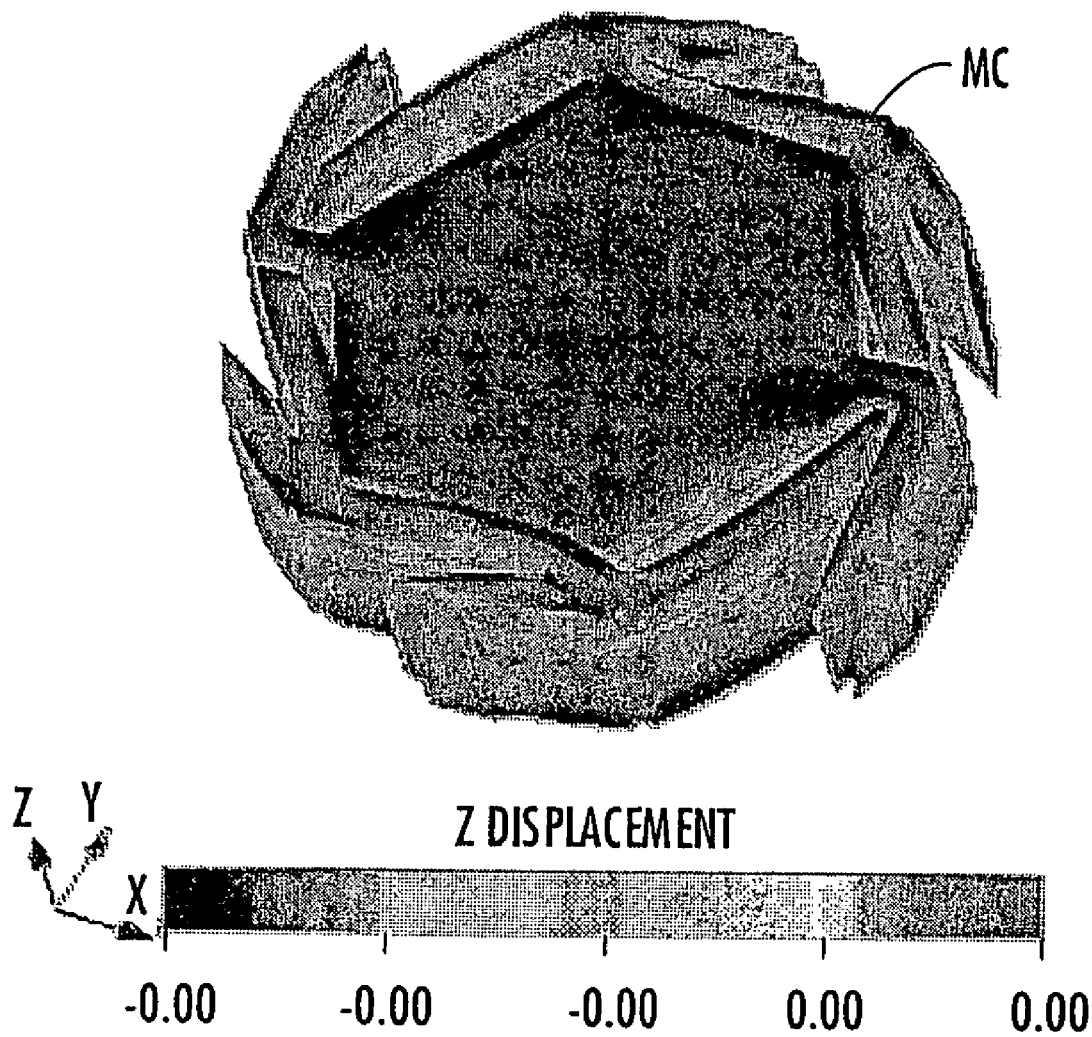
FIG. 13A is a computer simulation model of the deformation of movable component for a residual stress value of 120 MPa.
Figure 13B:
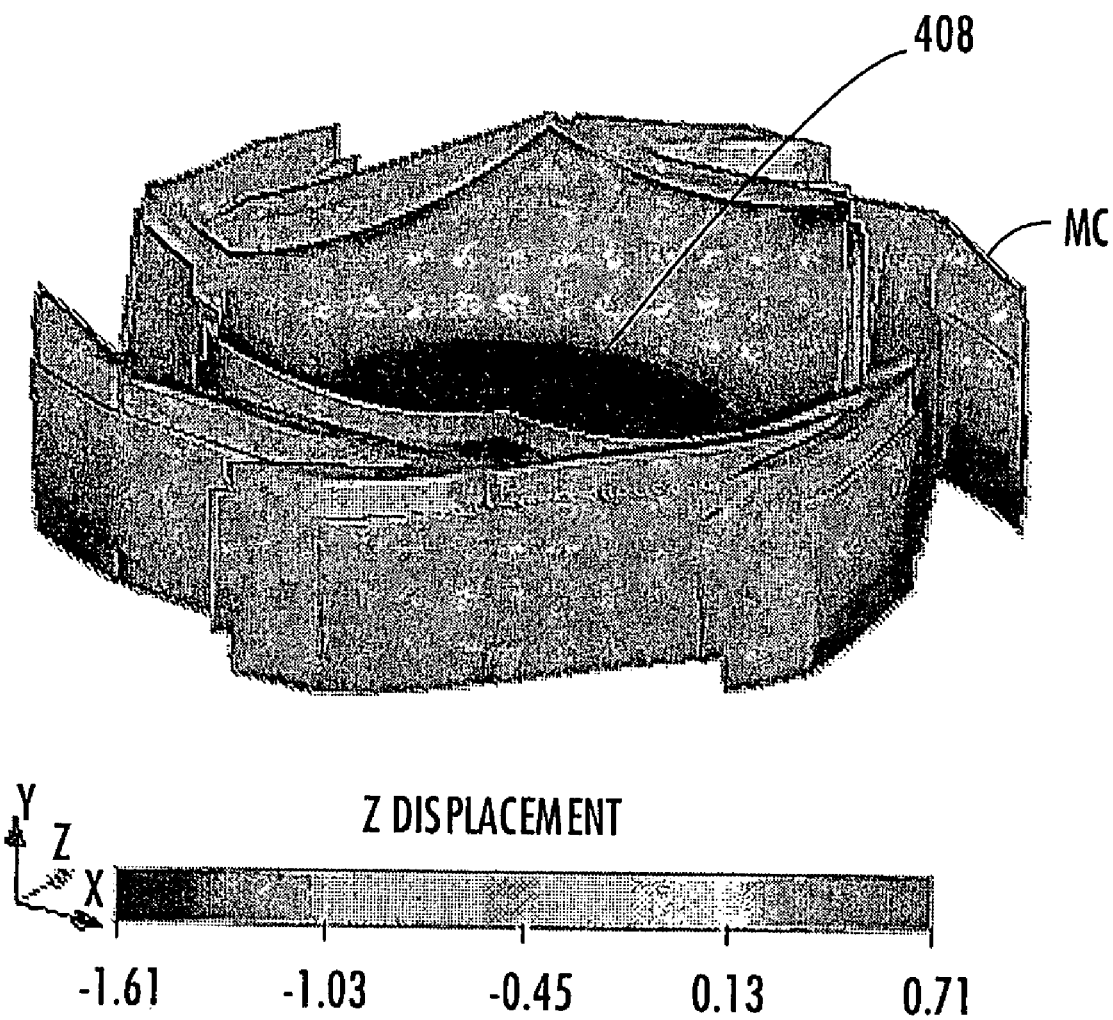
FIG. 13B is a computer simulation model of deformation of a movable component under a stress gradient between +10 and −10 MPa.

The robustness of variable capacitor 400 (shown in FIG. 4) against residual stress deformations can be a good indicator of the robustness of variable capacitor 400 against temperature changes. Allowing movable component MC to rotate to a certain degree generates most of the residual stress effects only in the XY plane. FIGS. 13A and 13B illustrate different computer simulation models of the deformation of movable component MC. FIG. 13A illustrates a computer simulation model of the deformation of movable component MC for a residual stress value of 120 MPa (uniform stress across movable component MC). The displacement in the x and y directions in this example are smaller than 0.5 micrometers while displacement in the z direction is as small as 0.001 micrometers. Thus, the capacitance in this example is not adversely affected by either the residual stress or the difference in thermal expansion between the movable component MC and substrate 402 (shown in FIG. 4).

The robustness of movable component MC (shown in FIG. 4) against stress gradients is also important. As referred to herein, the stress gradient means the varying of the residual and thermal stress levels across the thickness of movable component MC. Stress gradients can typically range between 1 and 10 MPa. FIG. 13B illustrates a computer simulation model of deformation of movable component MC under a stress gradient between +10 and −10 MPa. The warping of interior portion 408 can have a great impact on the capacitance and capacitance ratio of variable capacitor 400 (shown in FIG. 4).

Figure 14:
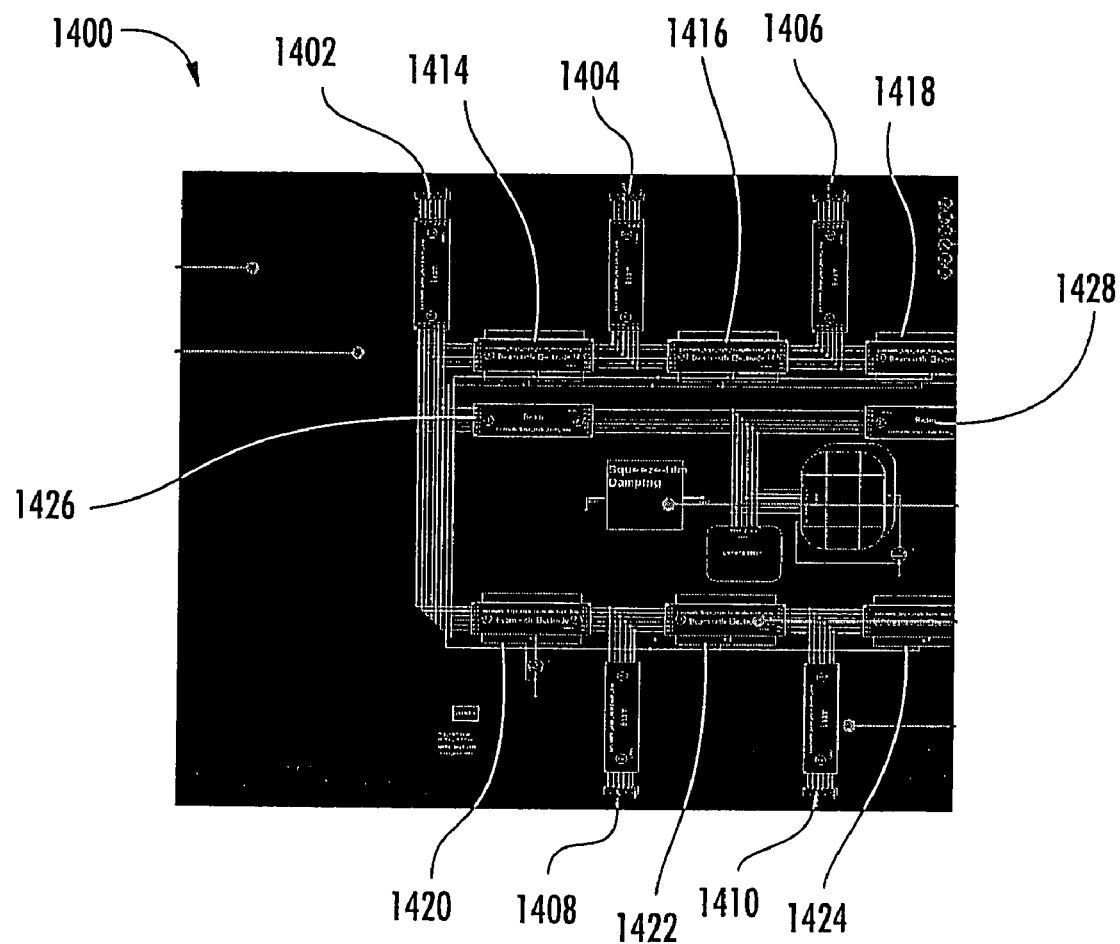
FIG. 14 is a computer simulation model of an equivalent circuit of the variable capacitor shown in FIG. 4.

FIG. 14 illustrates a computer simulation model, generally designated 1400, of an equivalent circuit of variable capacitor 400 shown in FIG. 4. In this example, the SABER™ simulator (available from Analogy, Inc. of Beaverton, Oreg.) can be used for modeling variable capacitor 400. Simulation model 1400 can include six beams for the tethers 1402, 1404, 1406, 1408, 1410, and 1412 and associated beams with electrodes 1414, 1416, 1418, 1420, 1422, and 1424, respectively. Simulation model 1400 can also include a connector models 1426 and 1428, and a capacitive electrode model CEM.

FIGS. 15A, 15B, and 15C illustrate computer simulation models of the deformation of different interior portions (such as interior portion 408 shown in FIG. 4) under a stress gradient between + and −MPa. FIG. 15A illustrates a square-shaped interior portion 1500 under the stress gradient. FIG. 15B illustrates a hexagonal-shaped interior portion 1502 under the stress gradient. FIG. 15C illustrates a circular-shaped interior portion 1504 under the stress gradient. Table 1 below indicates the maximum and minimum z-displacements for each of the three interior portion shapes.

TABLE 1

Maximum and minimum z-displacements for three interior portion shapes

| | Maximum Z | Minimum Z | Delta Z |
|---|---|---|---|
| square | 1.893 μm | −0.804 μm | 2.697 μm |
| hexagon | 1.420 μm | −0.933 μm | 2.353 μm |
| circle | 1.256 μm | −0.930 μm | 2.186 μm |

Based on the simulation results, square-shaped interior portion 1500 provides the largest maximum displacement, which is located at the corners. The center of square-shaped interior portion 1500 provides the smallest displacement of the three interior portion shapes. This result is explained by the fact that the axis of square-shaped interior portion 1500, with the same total area, is shorter than for the other two shapes. The average displacement is an indication of the sensitivity of the capacitance to stress gradients. For the maximum displacement, the most robust shape against stress gradient is the circular plate with the hexagonal design of FIG. 4 being nearly as good.

Figure 16:
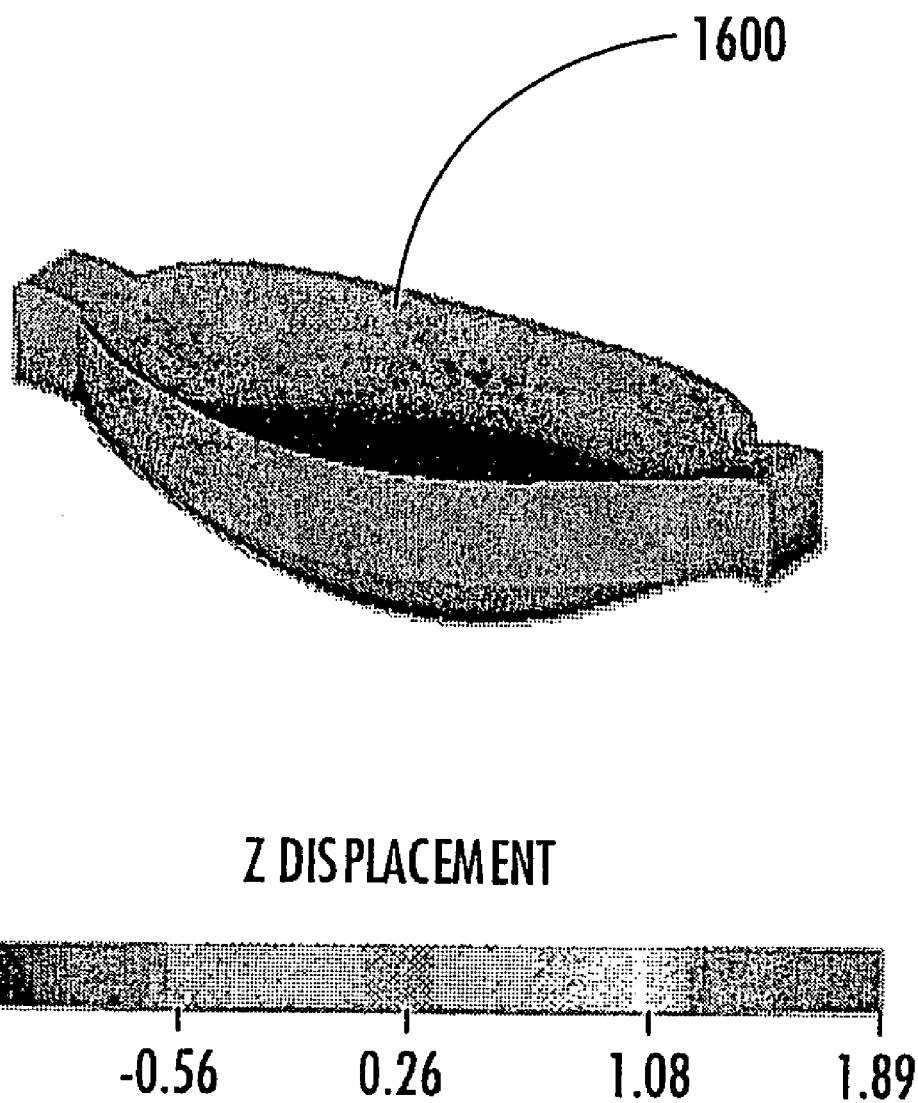
FIG. 16 is a computer simulation model of an exemplary elliptically-shaped interior portion with the same area under the same stress gradients.

An interesting observation is that the iso-displacement curves are elliptical. FIG. 16 illustrates a computer simulation model of an exemplary elliptically-shaped interior portion 1600 with the same area under the same stress gradients. In this example, the edges of the ellipse do not move upwards or downwards: the bending of the axis and the bending perpendicular to the axis compensate each other along the elliptical contour. The center of elliptically-shaped interior portion 1700 is almost 1.4 μm below the zero displacement point. The capacitance change is higher in elliptically-shaped interior portion 1700 than in circular-shaped interior portion 1504 (shown in FIG. 15C).

Figure 17:
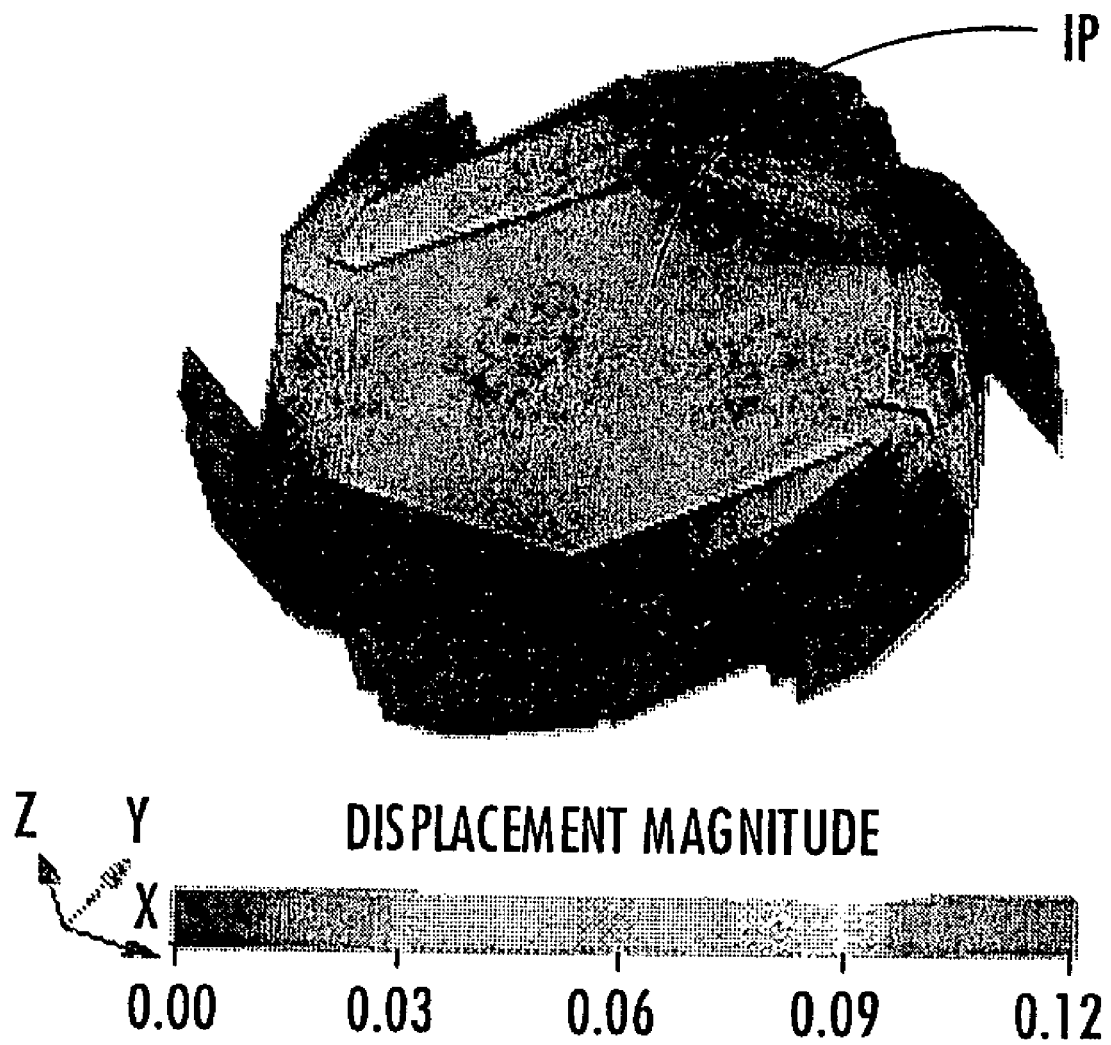
FIG. 17 is a computer simulation model of the deformation of an interior portion for an acceleration of 100 g.

A low sensitivity to acceleration is an important requirement for varactor capacitor. In particular, the change of the capacitance due to vibration or acceleration is expected to be an important source of noise for the variable capacitor. For computer simulations, a constant acceleration was applied to an undeformed interior portion (such as interior portion 408 shown in FIG. 4). Several values can be considered, showing a linear behavior of the displacement even for relatively high values of acceleration. FIG. 17 illustrates a computer simulation model of the deformation of an interior portion 1700 for an acceleration of 100 g. The center displacement of interior portion 1700 is about 0.12 μm. Therefore, the acceleration sensitivity is about 1.2 [nm/g]. For a constant acceleration of 0.3 g, such as the value expected for the vibration, the maximum displacement is only 3.6 Å. The capacitance change under these conditions is lower than 0.5%. From the mechanical perspective, the cut-off frequency for the mechanical Low-Pass-Filter can be targeted to be higher than 20 kHz. Therefore, the response of interior portion 1700 to the acceleration will be fairly independent of the frequency, up to 20 kHz. In other words, a vibration of 0.3 g at 1 kHz will provide a capacitance change up to 0.5% of the capacitance.

Table 2 below indicates a summary of specifications for one embodiment of a variable capacitor such as variable capacitor 400 shown in FIG. 4.

TABLE 2

Summary of Specifications

| Parameter | Value |
| --- | --- |
| $V_{control}$ | 27 V |
| Resonance frequency | 21.6 kHz |
| $C_{min}$ | 2.2 pF (dc) |
| Capacitance ratio | maximum 1:3.6 |
| Vibration sensitivity | <0.5%/0.3 g |

Figure 18:
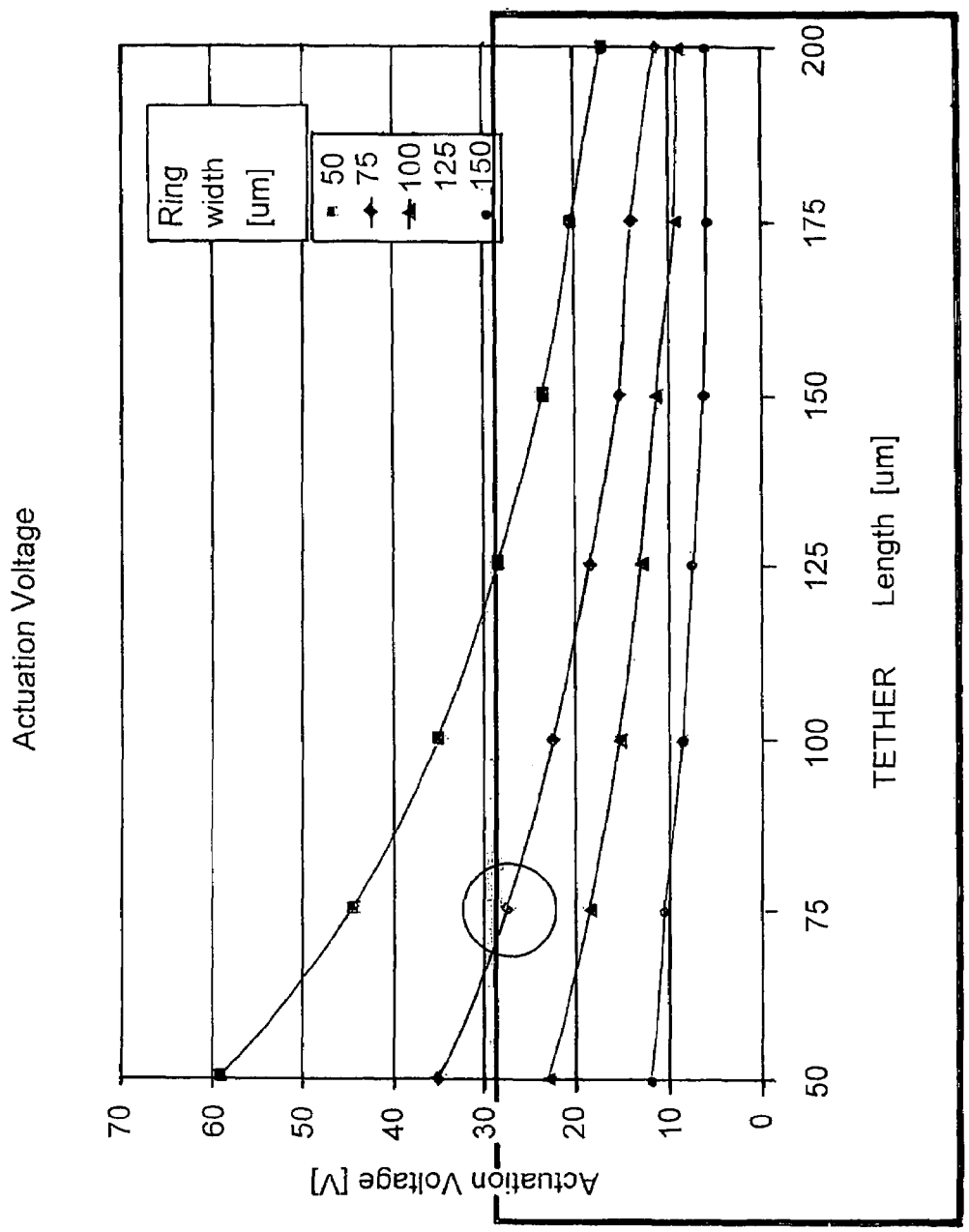
FIG. 18 is a graph showing different tether lengths and peripheral portion widths versus actuation voltage for a variable capacitor.
Figure 19:
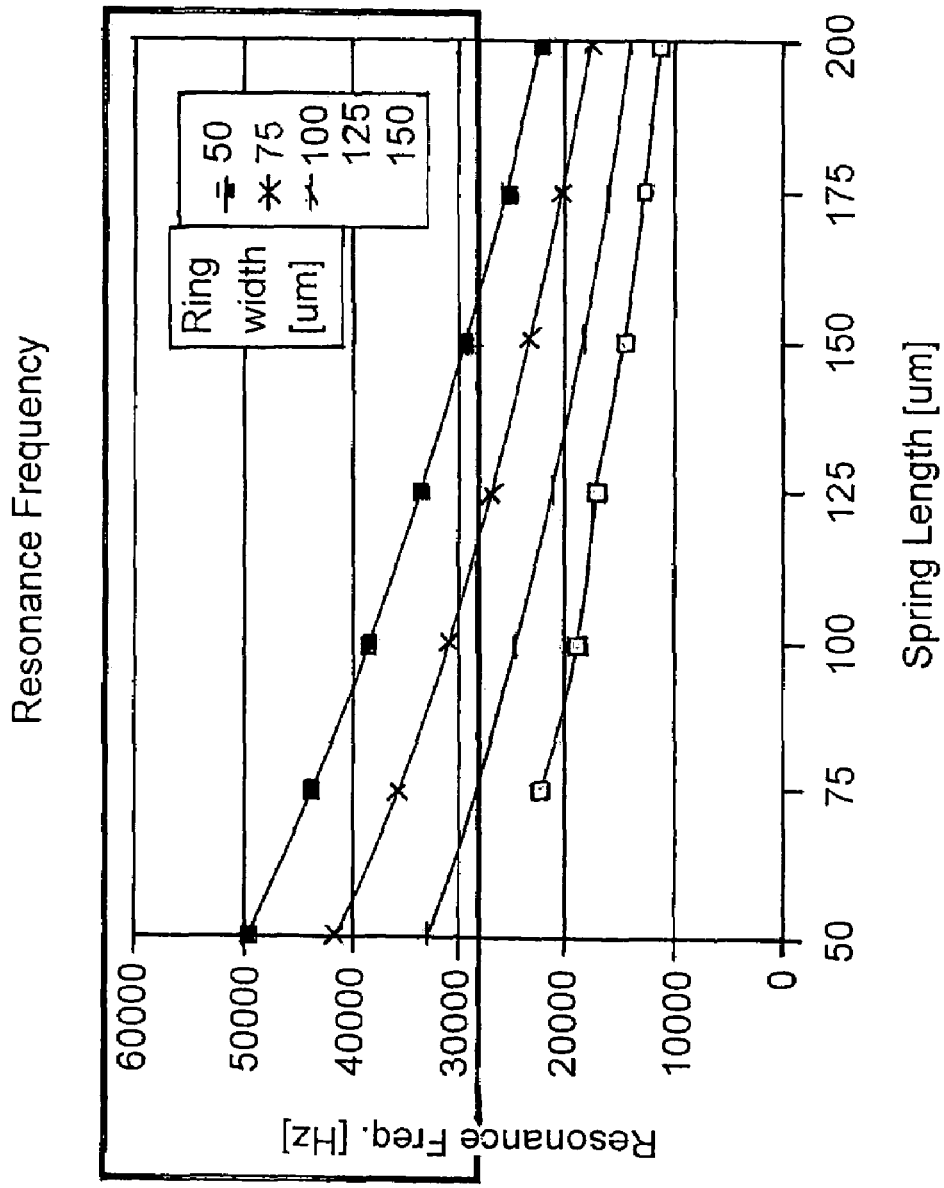
FIG. 19 is a graph showing different tether lengths and peripheral portion widths versus resonance frequency for a variable capacitor.

The actuation voltage and resonance frequency of a variable capacitor such as variable capacitor 400 (shown in FIG. 4) can be dependent upon the width of a peripheral portion (such as peripheral portion 406 shown in FIG. 4) and the length of the tethers (such as tethers T1, T2, T3, T4, T5, and T6 shown in FIG. 4). FIG. 18 illustrates a graph showing different tether lengths and peripheral portion widths versus actuation voltage for a variable capacitor (such as variable capacitor 400 shown in FIG. 4). FIG. 19 illustrates a graph showing different tether lengths and peripheral portion widths versus resonance frequency for a variable capacitor (such as variable capacitor 400 shown in FIG. 4). As shown, a variable capacitor having a tether length of 75 micrometers and peripheral portion width of 75 micrometers can achieve a resonance frequency of 35.9 kHz.

Figure 20:
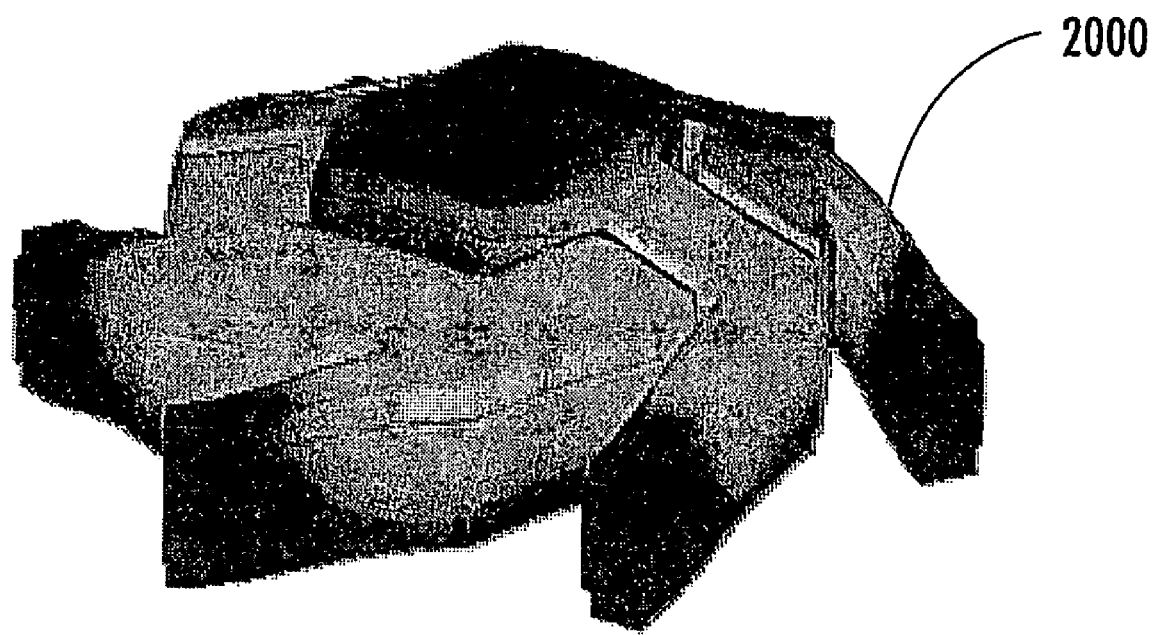
FIG. 20 is a computer simulation model of the z-displacement of the first resonance mode of a variable capacitor having a tether length of 75 micrometers and peripheral portion width of 75 micrometers.

FIG. 20 illustrates a computer simulation model of the z-displacement of the first resonance mode of a variable capacitor 2000 having a tether length of 75 micrometers and peripheral portion width of 75 micrometers. The resonance frequency of the first resonance mode is about 33.9 kHz. The resonance frequency of the second resonance mode is about 59.9 kHz. As shown in FIG. 20, interior portion 2002 remains relatively rigid and most of the deformation occurs at tethers T1, T2, T3, T4, T5, and T6, along with a tilt in peripheral portion 2004.

FIG. 21 illustrates a computer simulation model of the z-displacement of a variable capacitor 2000 having a tether length of 75 micrometers and peripheral portion width of 75 micrometers at an actuation voltage set at 14 Volts.

Figure 22:
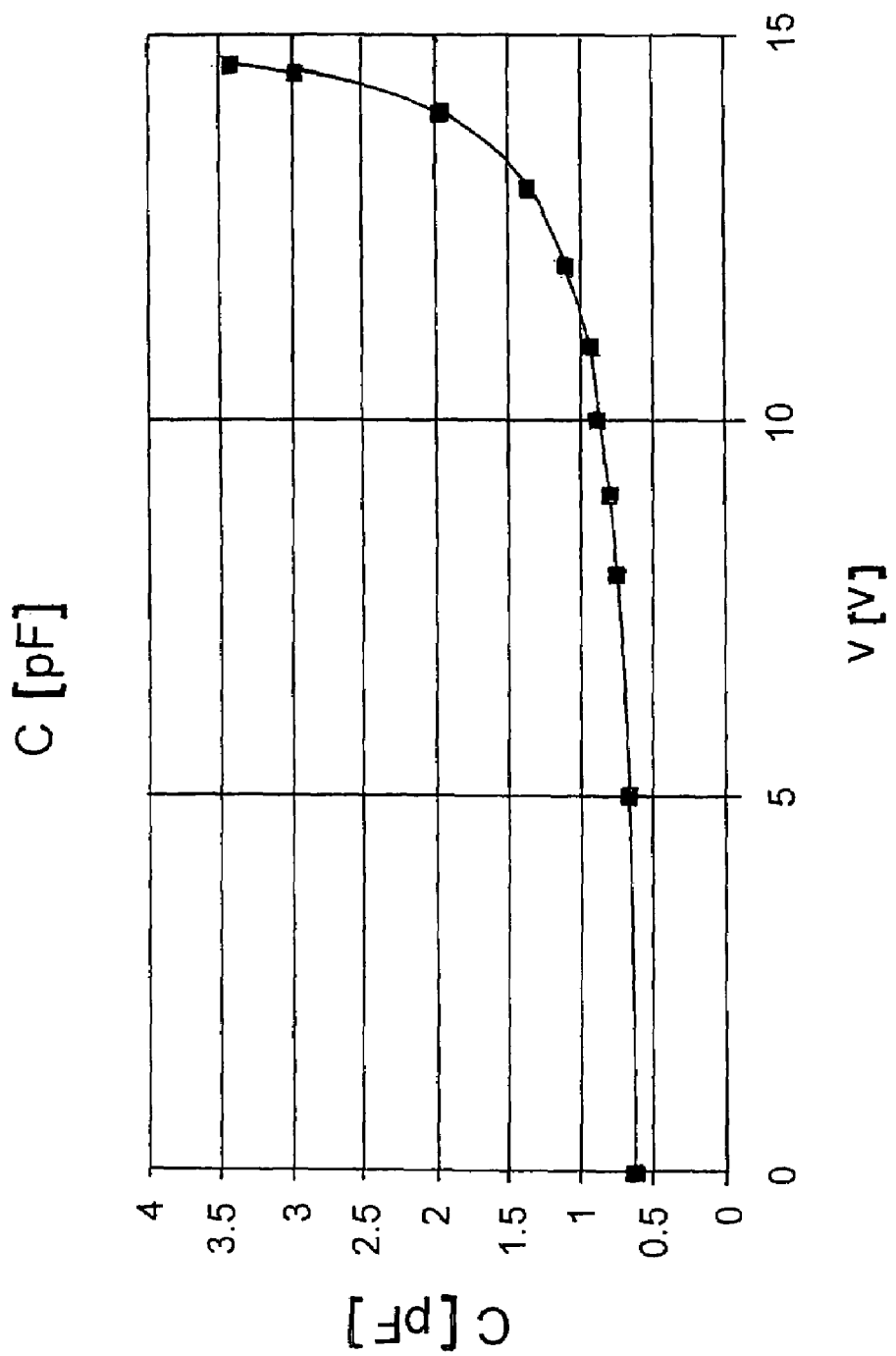
FIG. 22 is a graph showing displacement of the center of a variable capacitor having a tether length of 75 micrometers and peripheral portion width of 75 micrometers versus voltage applied to the actuation electrodes.

FIG. 22 illustrates a graph showing displacement of the center of a variable capacitor 2000 having a tether length of 75 micrometers and peripheral portion width of 75 micrometers versus voltage applied to the actuation electrodes.

Figure 23:
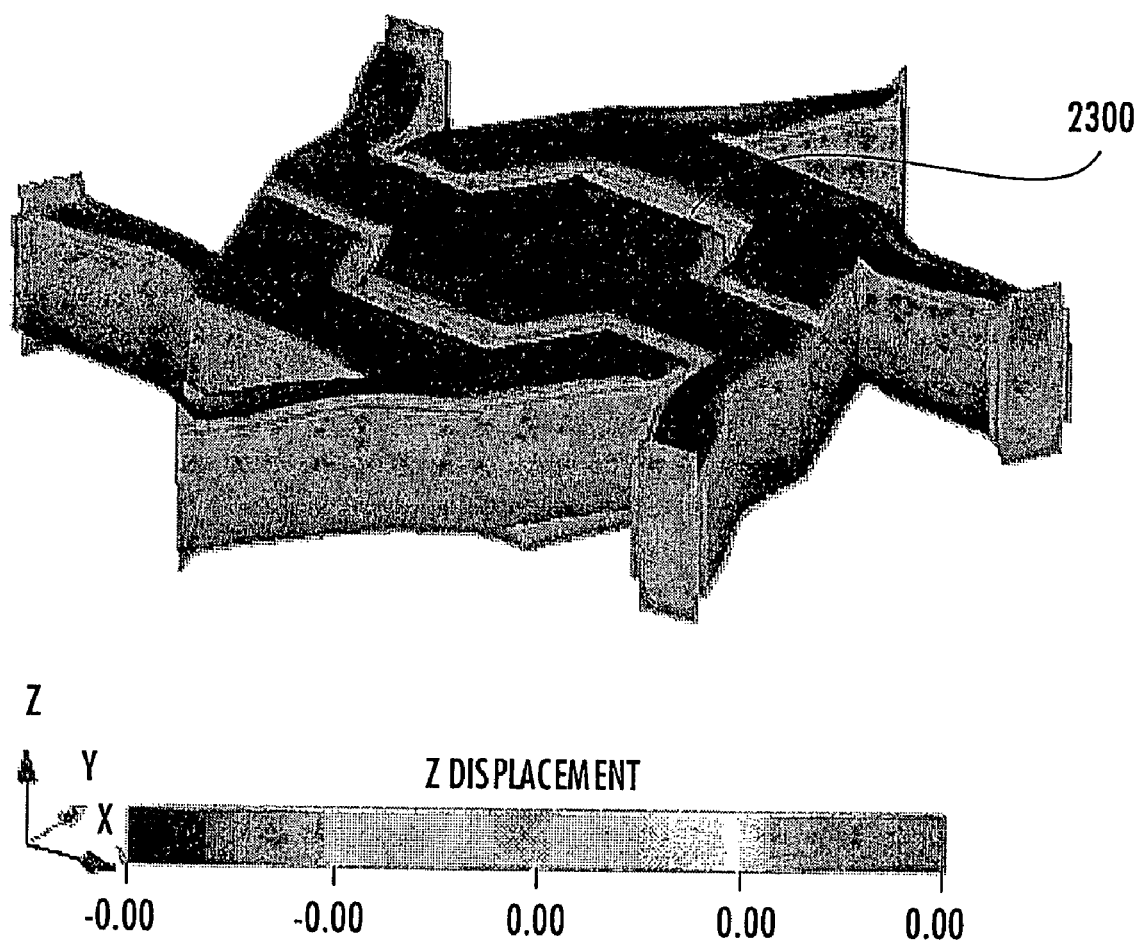
FIG. 23 is a computer simulation model of the z-displacement of an interior portion of a variable capacitor exposed to a temperature difference.

FIG. 23 illustrates a computer simulation model of the z-displacement of an interior portion 2300 of a variable capacitor 2302 exposed to a temperature difference of 100° Celsius. In this example, the z-displacement of interior portion 2300 is about 0.002 micrometers. Therefore, temperature has little effect on the capacitance values in this embodiment.

FIG. 24 illustrates a computer simulation model of deformation of an interior component 2400 having a tether length of 75 micrometers and peripheral portion width of 75 micrometers under a stress gradient between +10 and −10 MPa.

Figure 25:
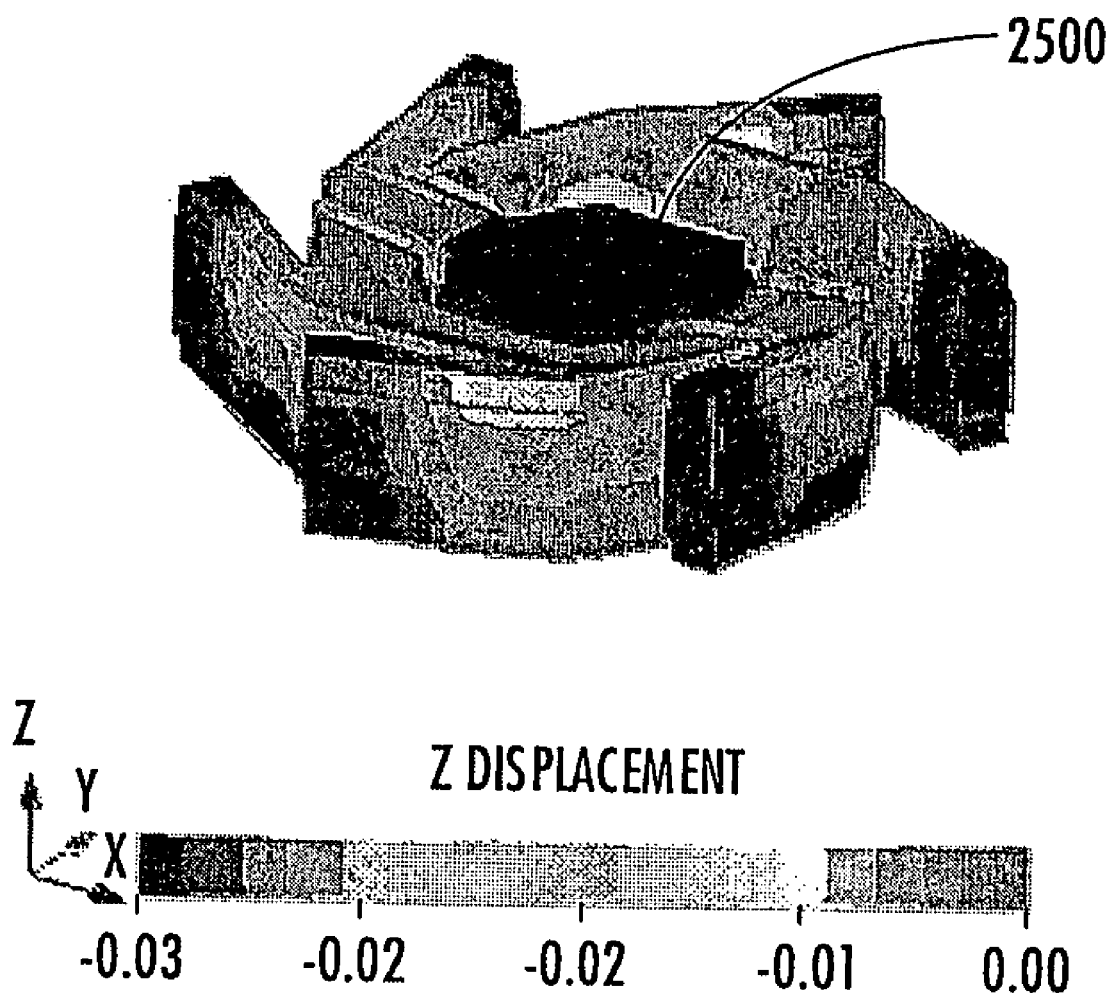
FIG. 25 is a computer simulation model of the deformation of an interior component having a tether length of 75 micrometers and peripheral portion width of 75 micrometers for an acceleration of 100 g.

FIG. 25 illustrates a computer simulation model of the deformation of an interior component 2500 having a tether length of 75 micrometers and peripheral portion width of 75 micrometers for an acceleration of 100 g. The z-displacement is less than about 0.03 micrometers for 100 g acceleration (i.e., 0.1 nm for an 0.3 g acceleration). Therefore, the capacitance can be modified by a factor of about 0.04% with an air gap of 0.26 micrometers.

Figure 26:
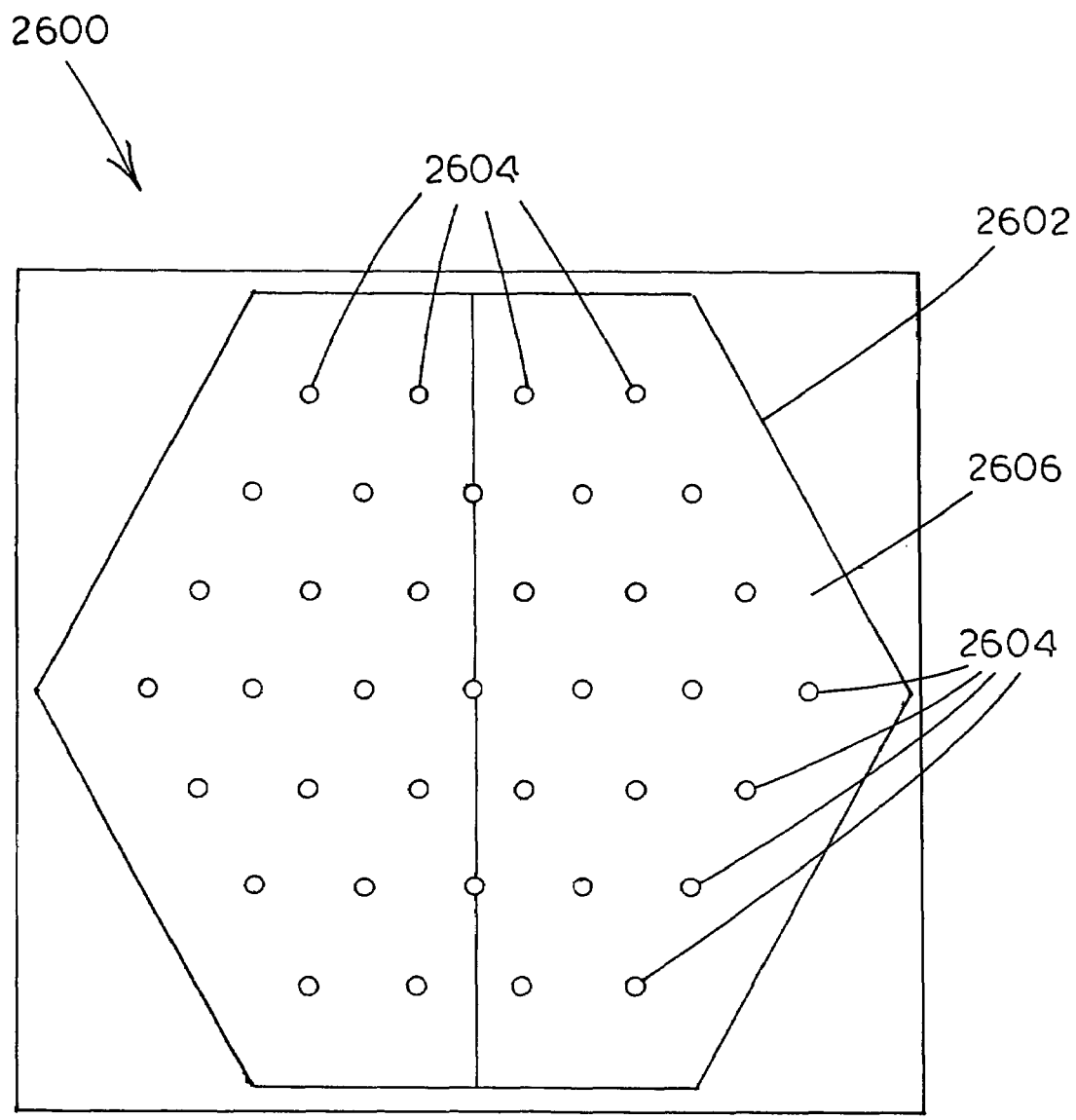
FIG. 26 is a top perspective view of another exemplary variable capacitor.

Referring to FIG. 26, a top perspective view of another exemplary variable capacitor, generally designated 2600, is illustrated. Variable capacitor 2600 can include an interior portion 2602 having a plurality of apertures 2604 extending from a top surface 2606 to an opposing bottom surface (not shown). Apertures 2604 can also extend through a movable capacitive electrode MCE1 attached to top surface 2606 and a movable capacitive electrode (not shown), if any, attached to the opposing bottom surface (not shown). Apertures 2604 can function to ventilate variable capacitor 2600. In this embodiment, interior portion 2602 includes thirty-seven apertures that are evenly distributed on surface 2606. Alternatively, interior portion 2602 can include 7, 27, 169, 721, or any suitable number of apertures.

Figure 27A:
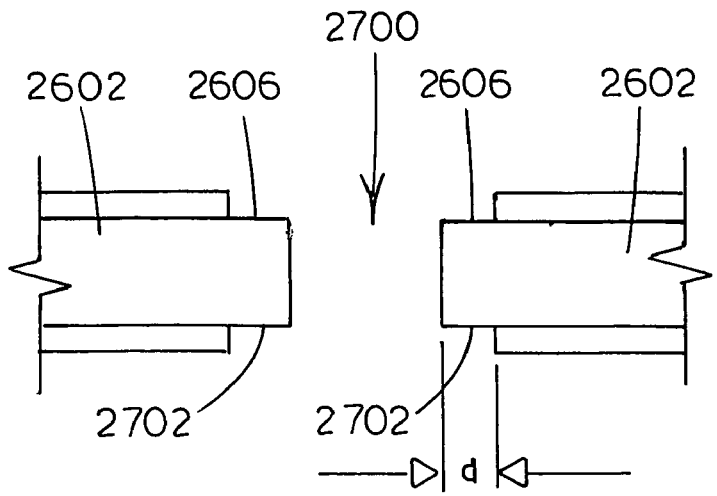
FIG. 27A is a cross-sectional side view of one aperture.

Referring to FIG. 27A, a cross-sectional side view of one aperture, generally designated 2700, of interior portion 2602 is illustrated. In this embodiment, interior portion 2602 includes movable capacitive electrodes MCE1 and MCE2 attached to top surface 2604 and a bottom surface 2702, respectively. In this embodiment, aperture 2700 is cylindrically-shaped with a diameter of about 5 micrometers. Additionally, in this embodiment, distance d between the edges of interior portion 2602 and movable capacitive electrode (MCE1 or MCE2) is between about 0 and 8 micrometers.

Figure 27B:
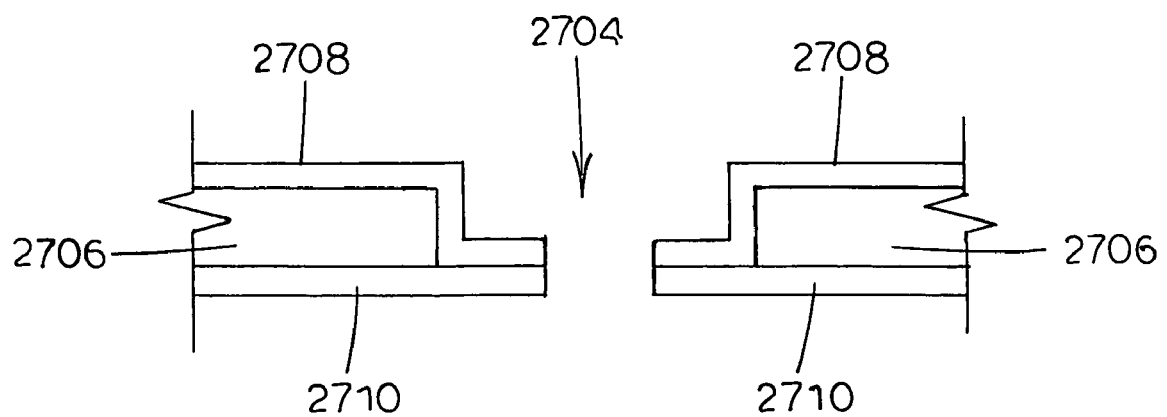
FIG. 27B is a cross-sectional side view of another aperture.

Referring to FIG. 27B, a cross-sectional side view of another aperture, generally designated 2704, of interior portion 2706 is illustrated. In this embodiment, a movable capacitive electrode 2708 can extend inside aperture 2704. Movable capacitive electrode 2708 can conform to and contact movable capacitive electrode 2710. This embodiment can be advantageous because the area of the capacitive electrode is not reduced as much for a given aperture size.

Figure 28:
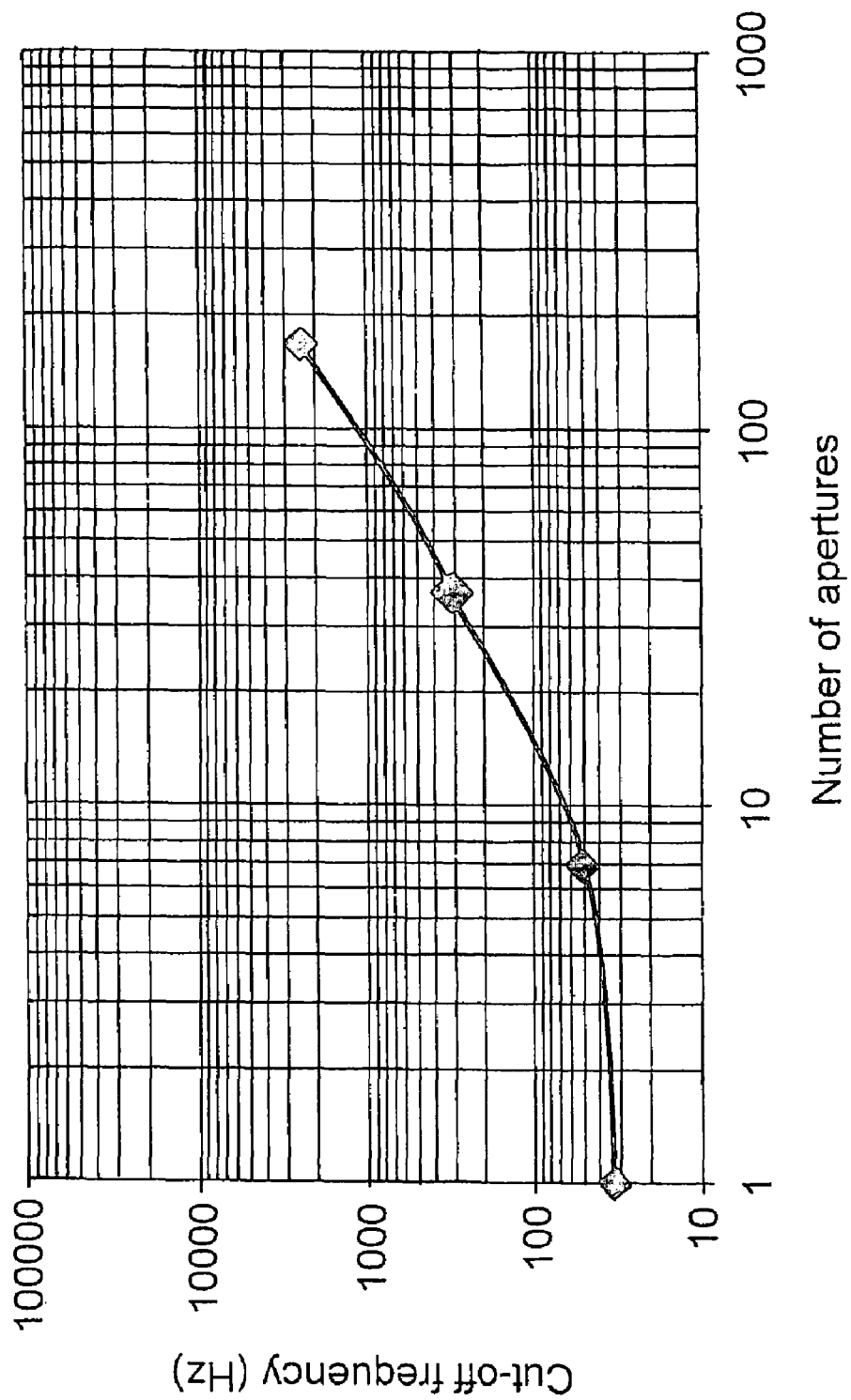
FIG. 28 is a graph showing the cut-off frequency of a variable capacitor versus the number of apertures in an interior portion of the variable capacitor.

FIG. 28 illustrates a graph showing the cut-off frequency of a variable capacitor versus the number of apertures in an interior portion of the variable capacitor. Extrapolating from the graph, the cut-off frequency is about 20 kHz for 721 apertures.

The number of holes can be selected in order to half the distance between the outer row of holes and the edges of the hexagonally-shaped interior portion at every increment. This leads to a series of the number of holes as follows: 0, 1, 7, 37, 169, 721, etc. At 169 holes, the pitch is 27 micrometers in one embodiment.

Figure 29:
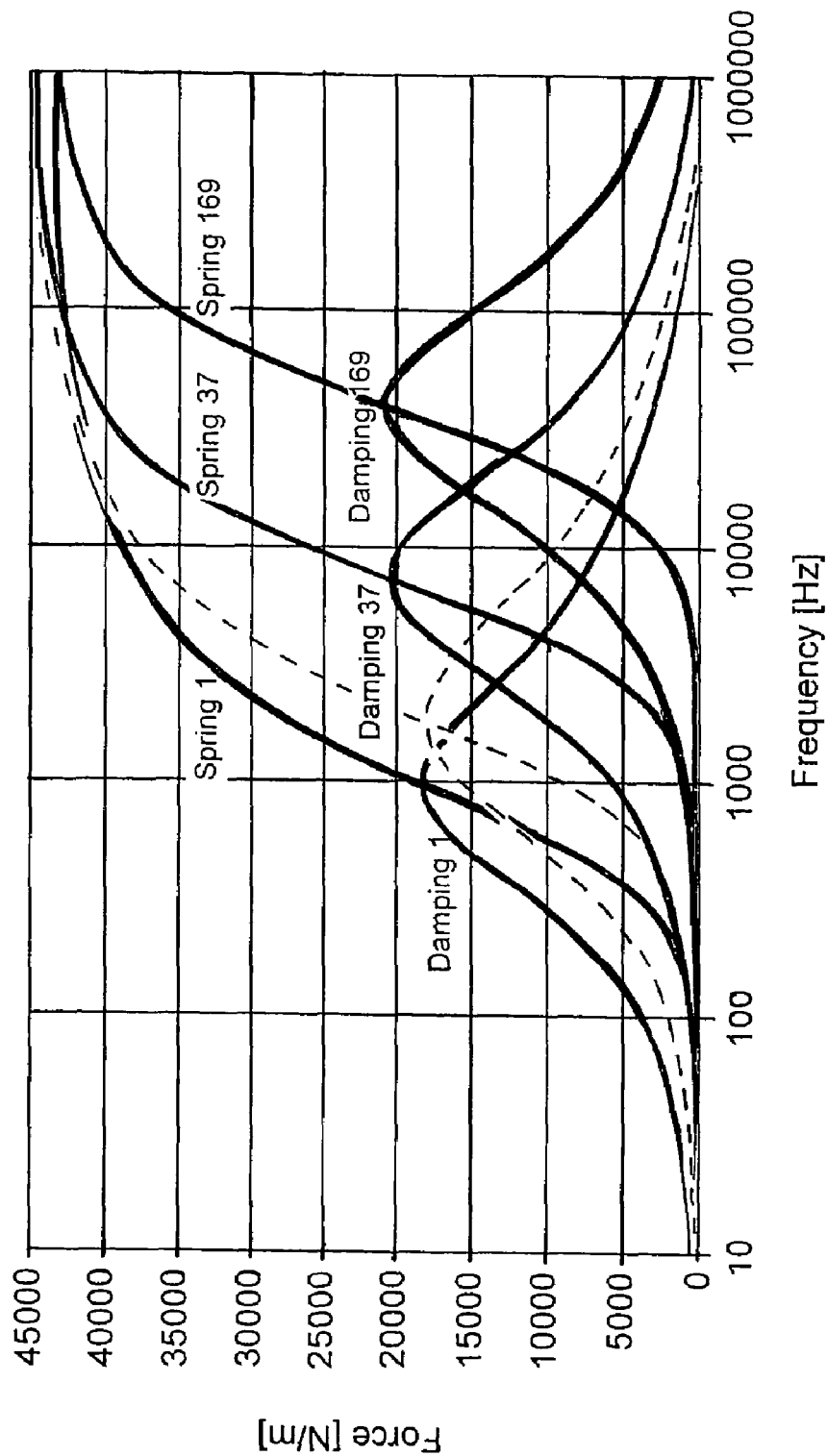
FIG. 29 is a graph showing the damping and tether forces versus frequency for different number of apertures.

Referring to FIG. 29, a graph showing the damping and tether forces versus frequency for different number of apertures is illustrated. In the low-frequency regime, the air acts as a damper. In the high-frequency regime, the air acts as a spring.

Figure 30:
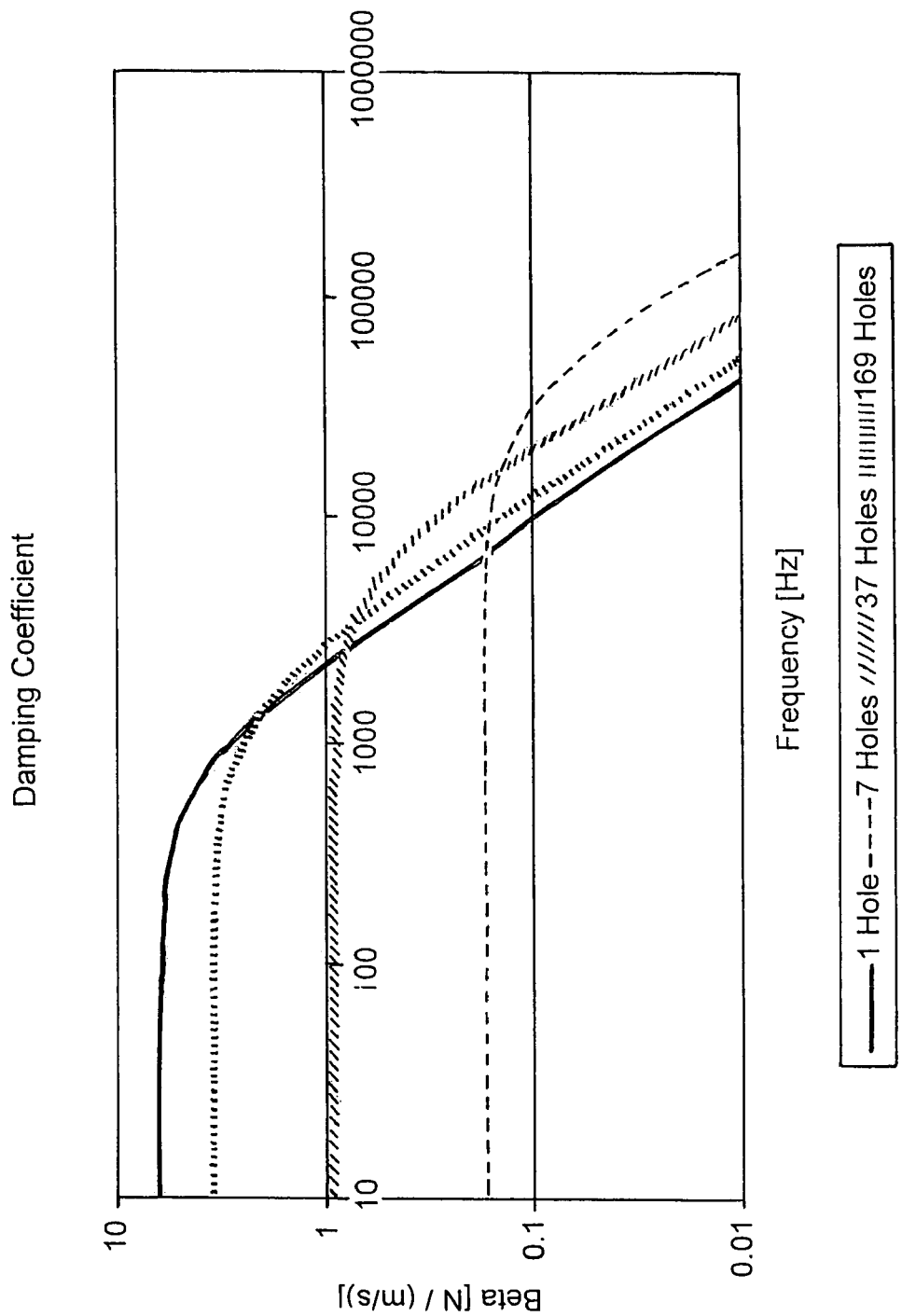
FIG. 30 is a graph showing the damping coefficient as a function of the frequency for different numbers of apertures.

FIG. 30 illustrates a graph showing the damping coefficient as a function of the frequency for different numbers of apertures. The force at high frequency is relatively independent of the number of apertures because the volume of air being squeezed remains relatively constant.

Figure 31:
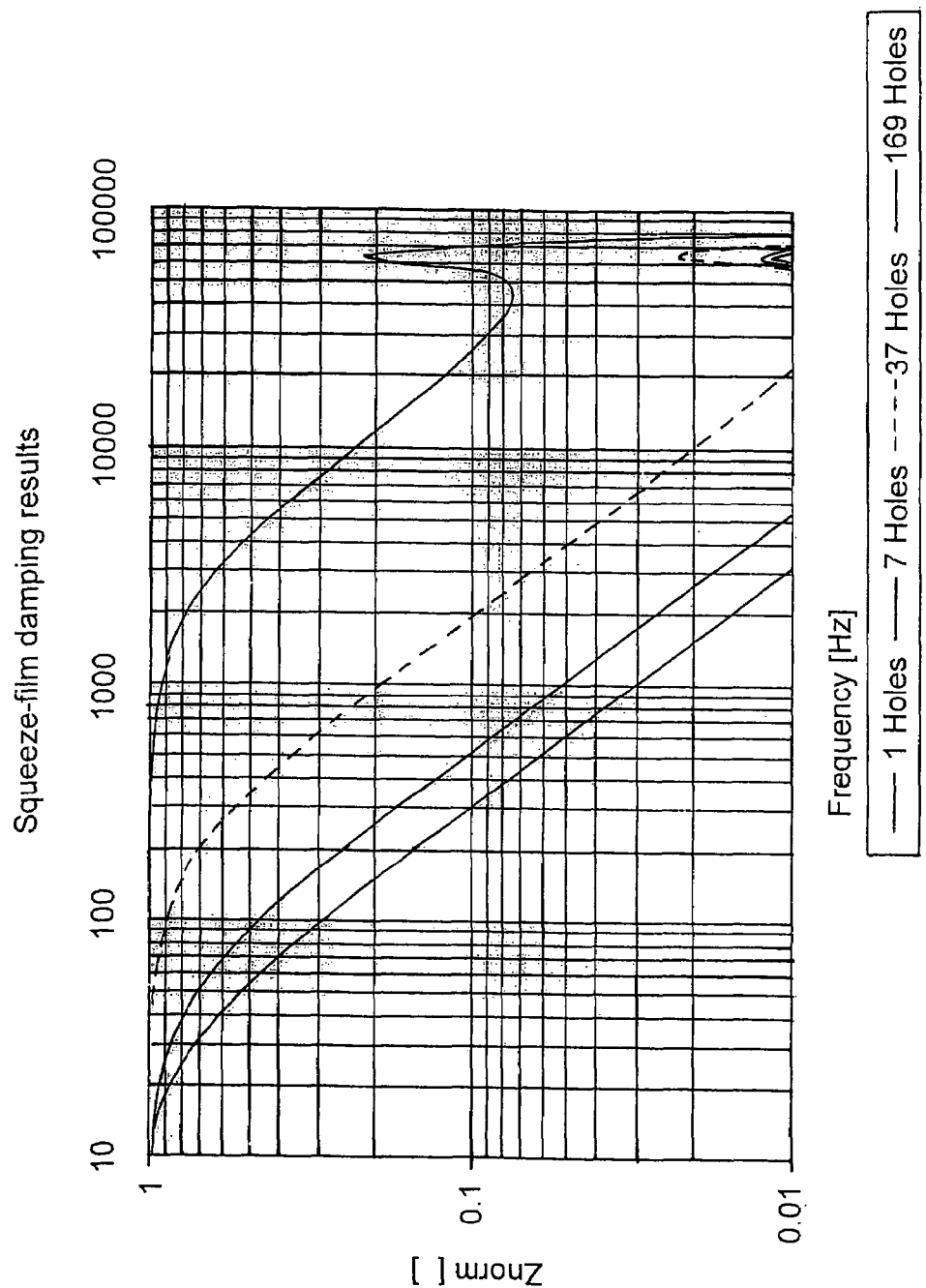
FIG. 31 is a graph showing harmonic analysis of a variable capacitor having an interior portion with 37 apertures.

FIG. 31 illustrates a graph showing harmonic analysis of a variable capacitor having an interior portion with 37 apertures. In the low-frequency regime, the variable capacitor is overdamped exhibiting thus a low-pass filter characteristic. At 62 kHz all curves show resonance peaks. The resonance frequencies are determined by the mass of the structures and the combined stiffness of squeezed film and of the solid structure itself. At this pressure (1 bar) and this air gap (0.25 micron) the stiffness of the air is approx. twice the stiffness of the structure itself.

Figure 32:
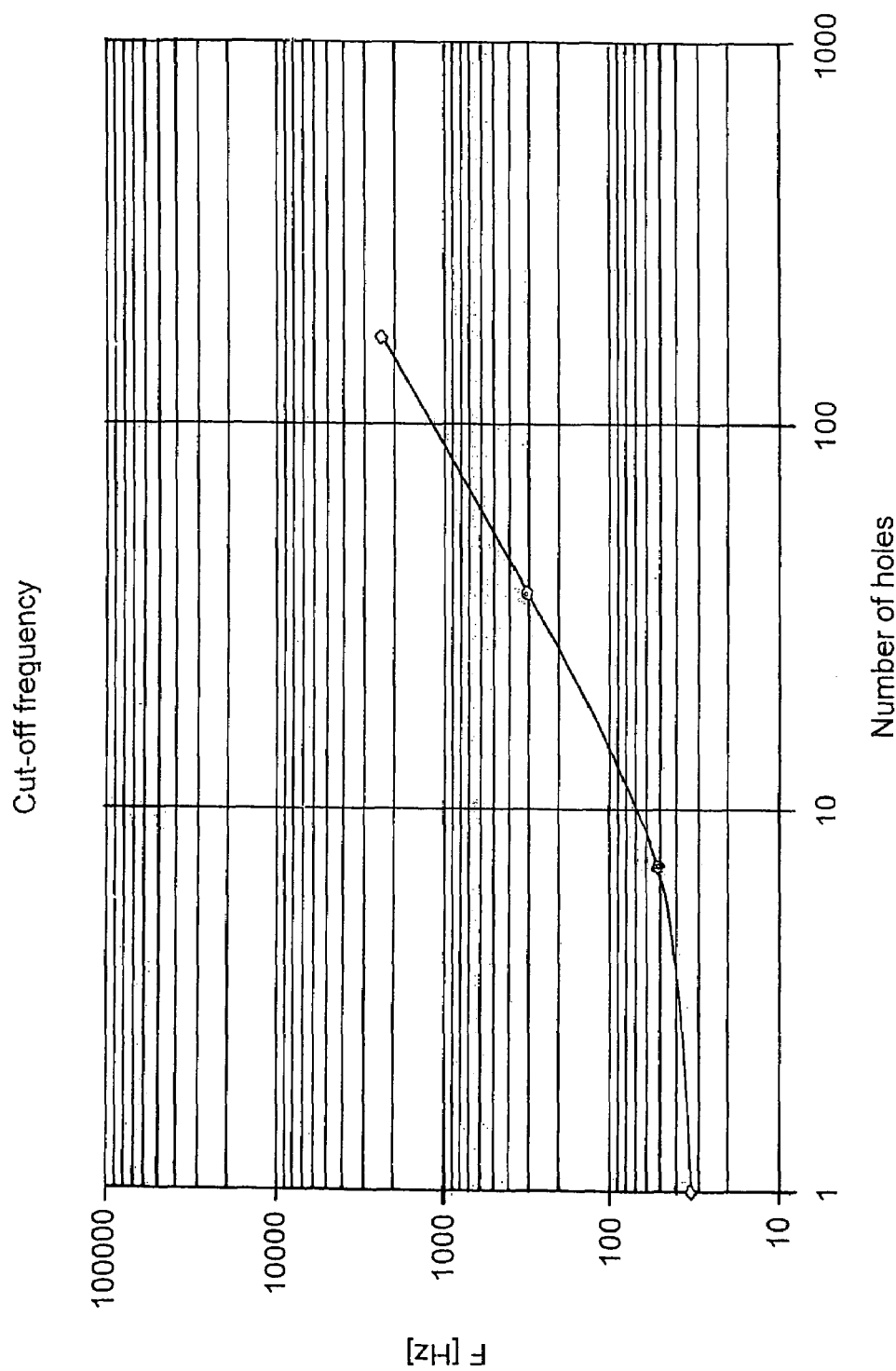
FIG. 32 is a graph showing the cut-off frequency for different aperture numbers.

FIG. 32 illustrates a graph showing the cut-off frequency for different aperture numbers. Table 3 below indicates the cut-off frequency for different aperture numbers.

TABLE 3

Apertures numbers and Cut-off Frequency

| Number of Apertures | Cut-off frequency [Hz] |
|---|---|
| 1 | 33 |
| 7 | 51 |
| 37 | 312 |
| 169 | 2420 |

From extrapolation, 17 kHz can be expected as a cut-off frequency for 721 apertures. In one embodiment, a distance of 6 micrometers is provided between a capacitive electrode and edge of the interior portion at the aperture. In the configuration of this embodiment, each 5 micrometer diameter hole in the interior portion can have a capacitive electrode opening of 17 micrometers in diameter. Thus, resulting in an effective loss for the capacitance area.

Figure 33:
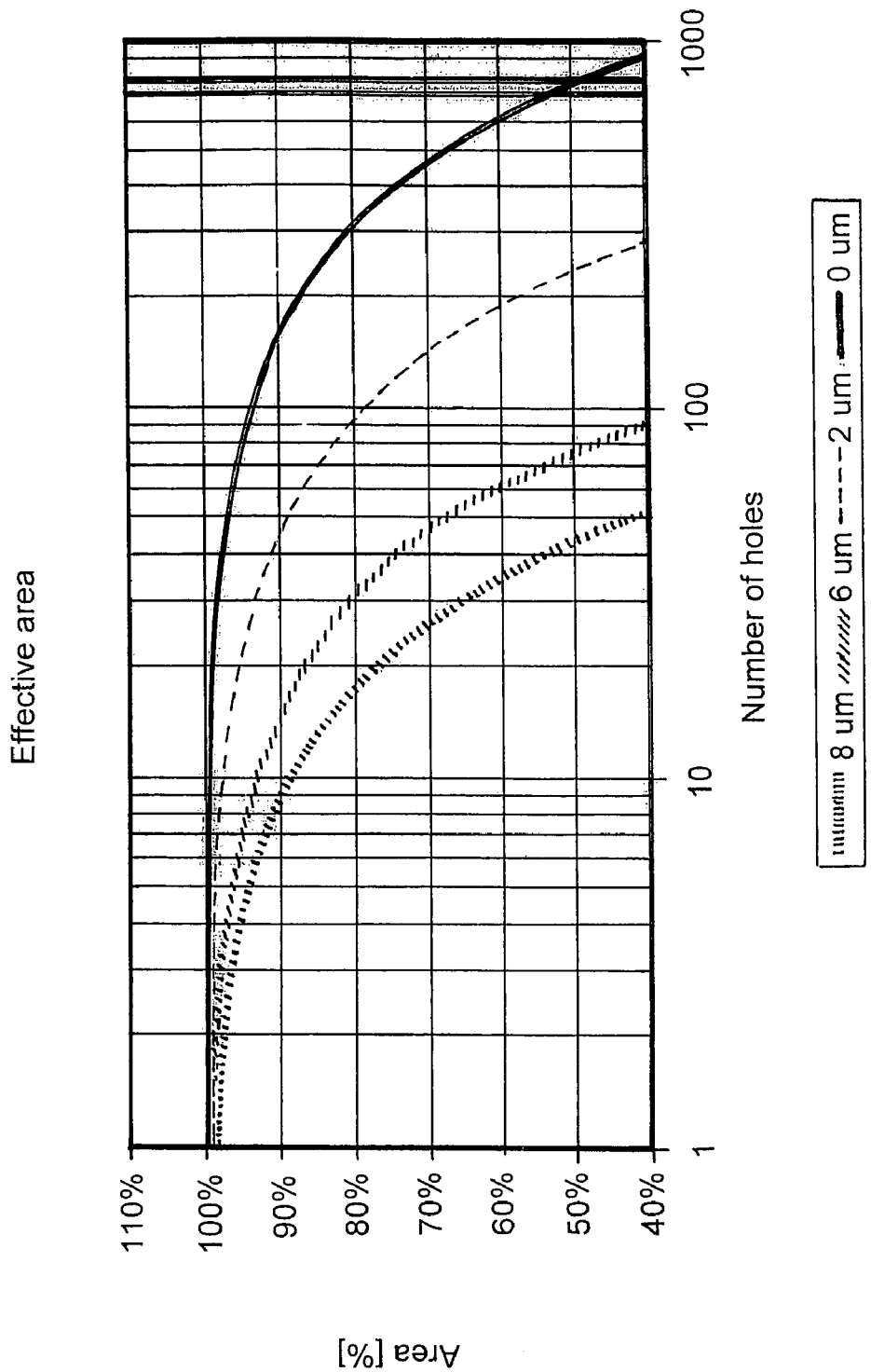
FIG. 33 is a graph showing the effective area of the capacitive electrode as a function of the number of apertures for four different cases according to the minimum distance between the gold layer and the opening of an interior portion.

FIG. 33 illustrates a graph showing the effective area of the capacitive electrode as a function of the number of apertures for four different cases according to the minimum distance between the gold layer and the opening of the interior portion (8 μm, 6 μm, 2 μm and 0 μm). Regarding 8 μm, the capacitance is reduced by 70% for 25 apertures. Regarding 2 μm, the capacitance is reduced by 40% for 169 apertures. In the embodiment shown in FIG. 27B where the aperture is defined by the metal rather than the hole in the structural layer of movable component MC, the capacitance can be reduced by less than 15%.

Figure 34:
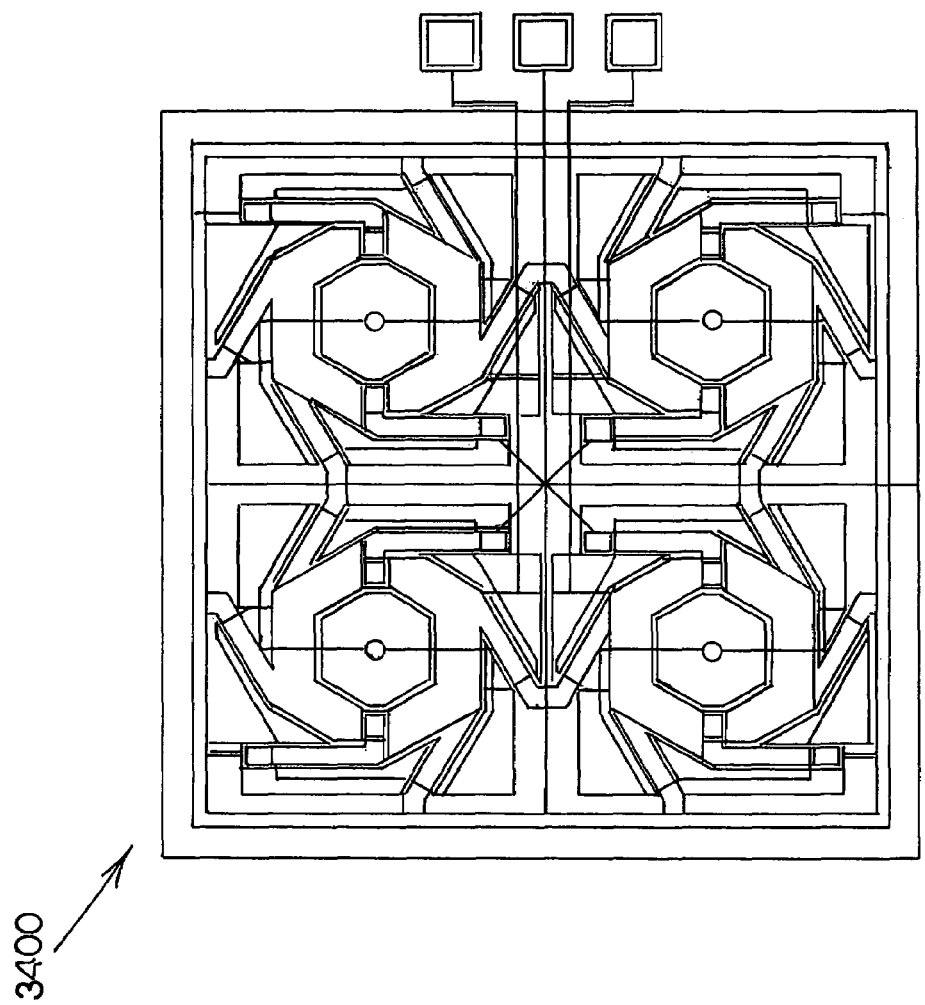
FIG. 34 is a top view of exemplary cascade arrangement of a plurality of variable capacitors.
Figure 35:
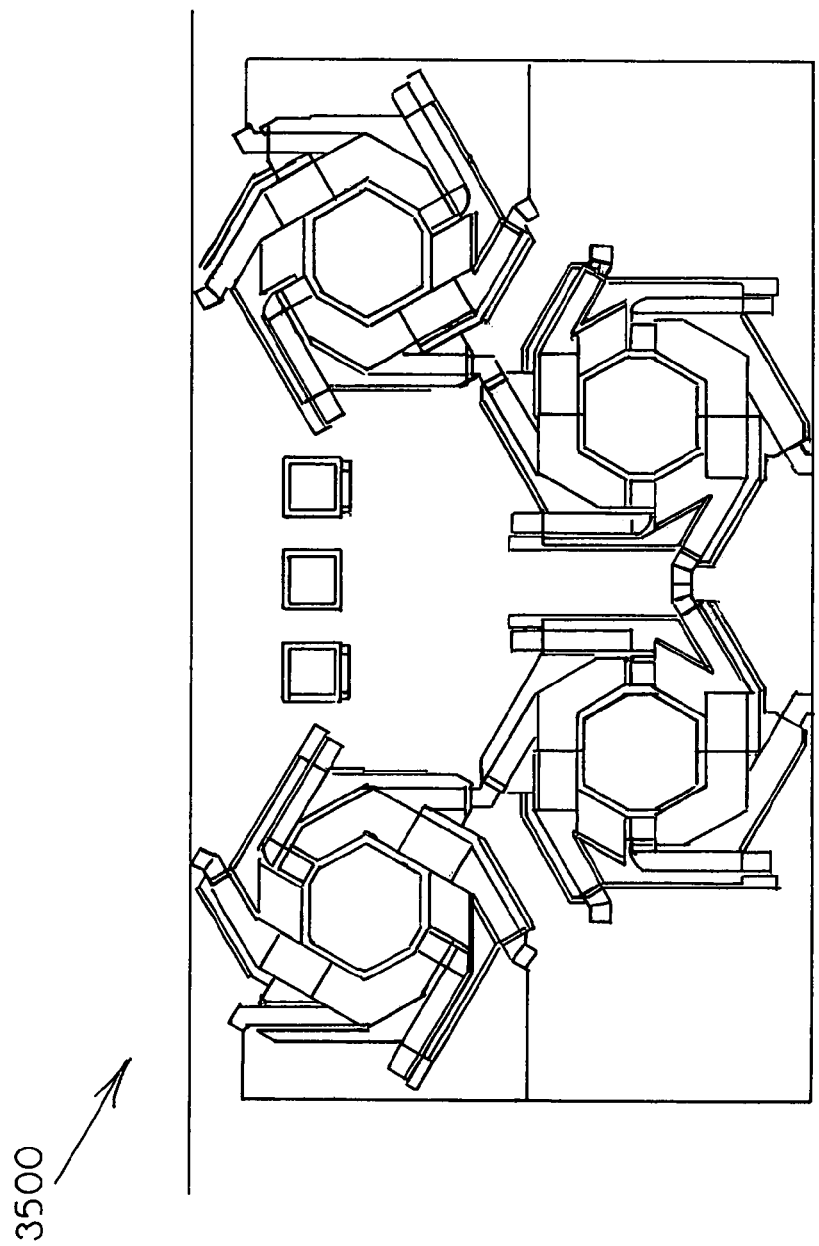
FIG. 35 is a top view of exemplary cascade of plurality of variable capacitors in a fanned-shape arrangement.

In order to achieve larger capacitance values, the variable capacitor can be made large or two or more variable capacitors can be connected in parallel. The maximum size of the capacitor is constrained by mechanical considerations (including release time, mechanical resonance frequency, damping and stress deformation), and thus the parallel connection of smaller capacitors can be advantageous. Referring to FIGS. 34 and 35, different top views of exemplary cascade arrangements of a plurality of variable capacitors are illustrated. Referring specifically to FIG. 34, variable capacitors 3400 are arranged in a rectangular shape. Referring to FIG. 35, variable capacitors 3500 are arranged in a fanned-shape. A signal line (not shown) having a total length of about 600 micrometers and a width of about 5 micrometers (impedance matched to 50 ohms). The inductance inserted by this long signal line can result in a self-resonance frequency in the order of 10 GHz, showing a degradation of the quality factor even at frequencies such as 4 GHz. These interconnects should be kept short as possible. Thus, a center feed to the array is desirable to minimize parasitics and maximize self-resonance frequency.

The variable capacitor arrangements shown in FIGS. 34 and 35 can have the specifications shown in Table 4 below.

TABLE 4

Summary of Specifications

| Parameter | Simulated |
|---|---|
| $V_{control}$ | 14.6 V |
| Resonance frequency | 33.9 kHz |
| $C_{min}$ | 2.6 pF (neglecting area loss due to apertures) |
| Capacitance ratio | maximum 1:4 |
| Q | Greater than 35 @ 4.5 GHz |
| Cut-off frequency of the LPF | 2.4 kHz (with 169 apertures) |

Figure 36A:
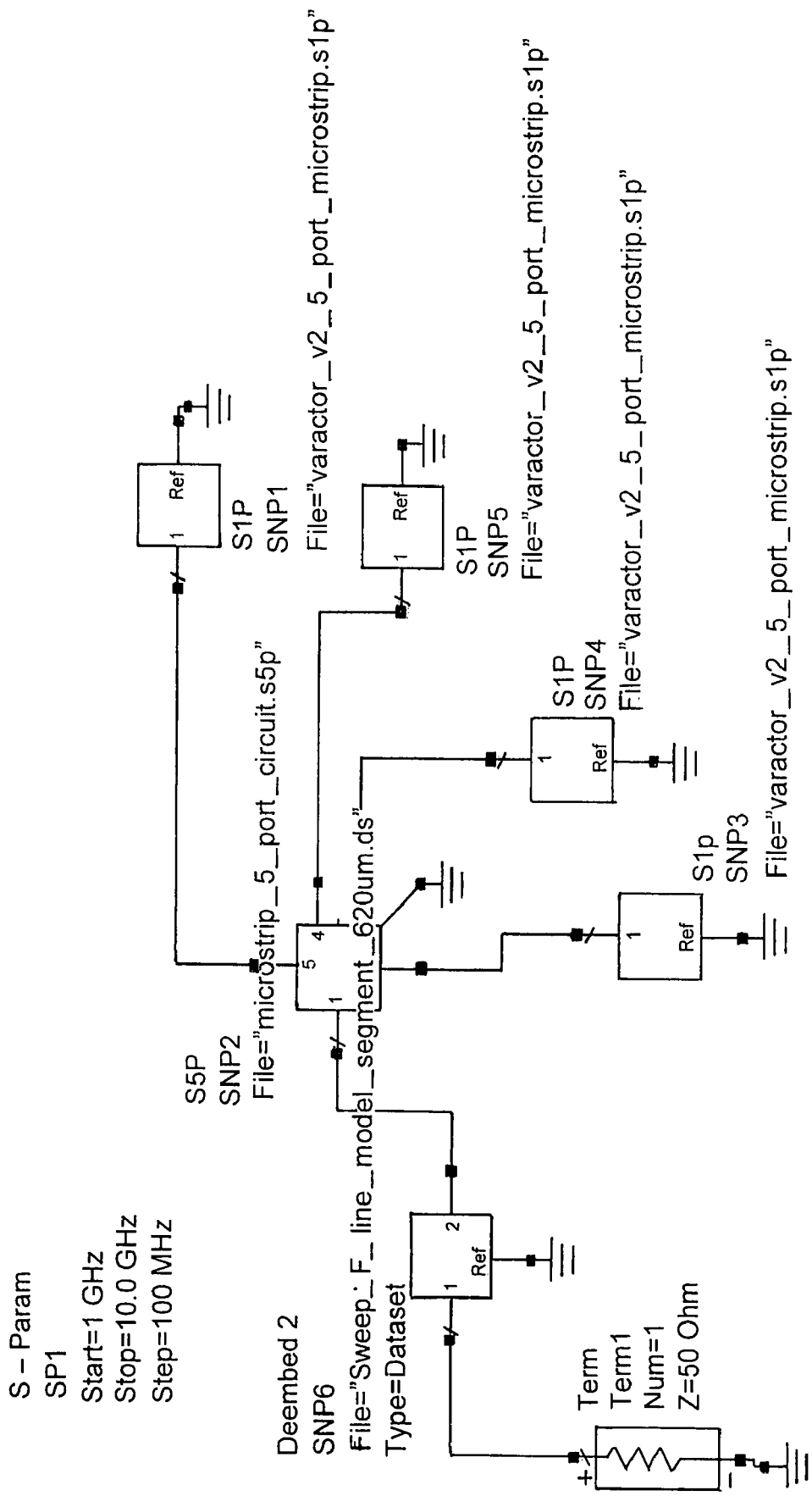
FIG. 36A is a computer simulation model for an equivalent circuit of four variable capacitors arranged in parallel.
Figure 36B:
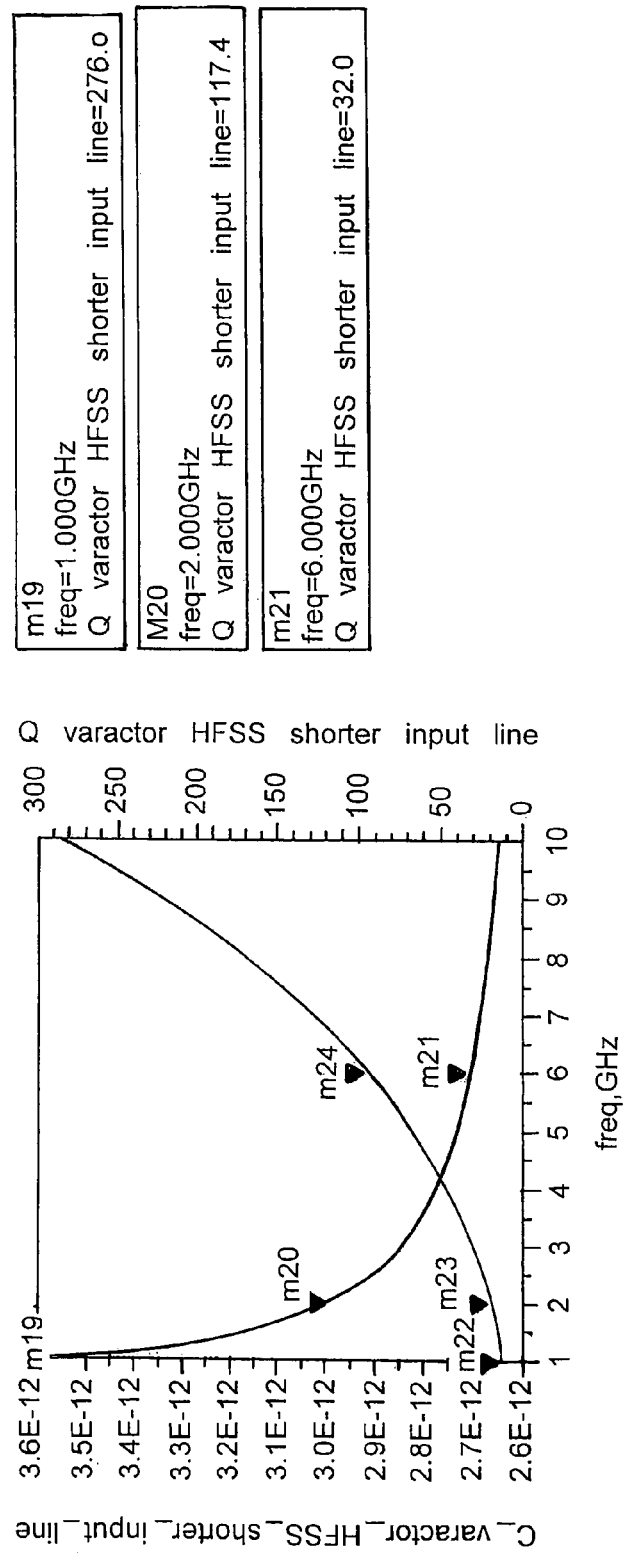
FIG. 36B is the RF results of the computer simulation shown in FIG. 36B.

FIGS. 36A and 36B illustrate a computer simulation model, generally designated 3600, and RF results of computer simulation model 3600, for an equivalent circuit of four variable capacitors (such as variable capacitor 400 shown in FIG. 4) arranged in parallel. Referring to FIG. 36A, the HFSS electromagnetic, full-wave simulator (available from Ansoft Corporation of Pittsburgh, Pa.) can be used for modeling four variable capacitors 3602, 3604, 3606, and 3608. Model 3600 can include a connection block 3610 representing the connection of variable capacitors 3602, 3604, 3606, and 3608. Additionally, model 3600 can include a block 3612 representing a line out of the measurement pads.

Referring to FIG. 36B, line 3614 shows that the capacitance does vary some with frequency due to the interconnecting scheme. Line 3616 shows the electrical resonance quality Q falling with frequency. In this example, resonance quality Q includes the degrading effects of the interconnects. A Smith chart, generally designated 3618, shows that the circuit behaves as a capacitor over the whole frequency range.

Figure 37A:
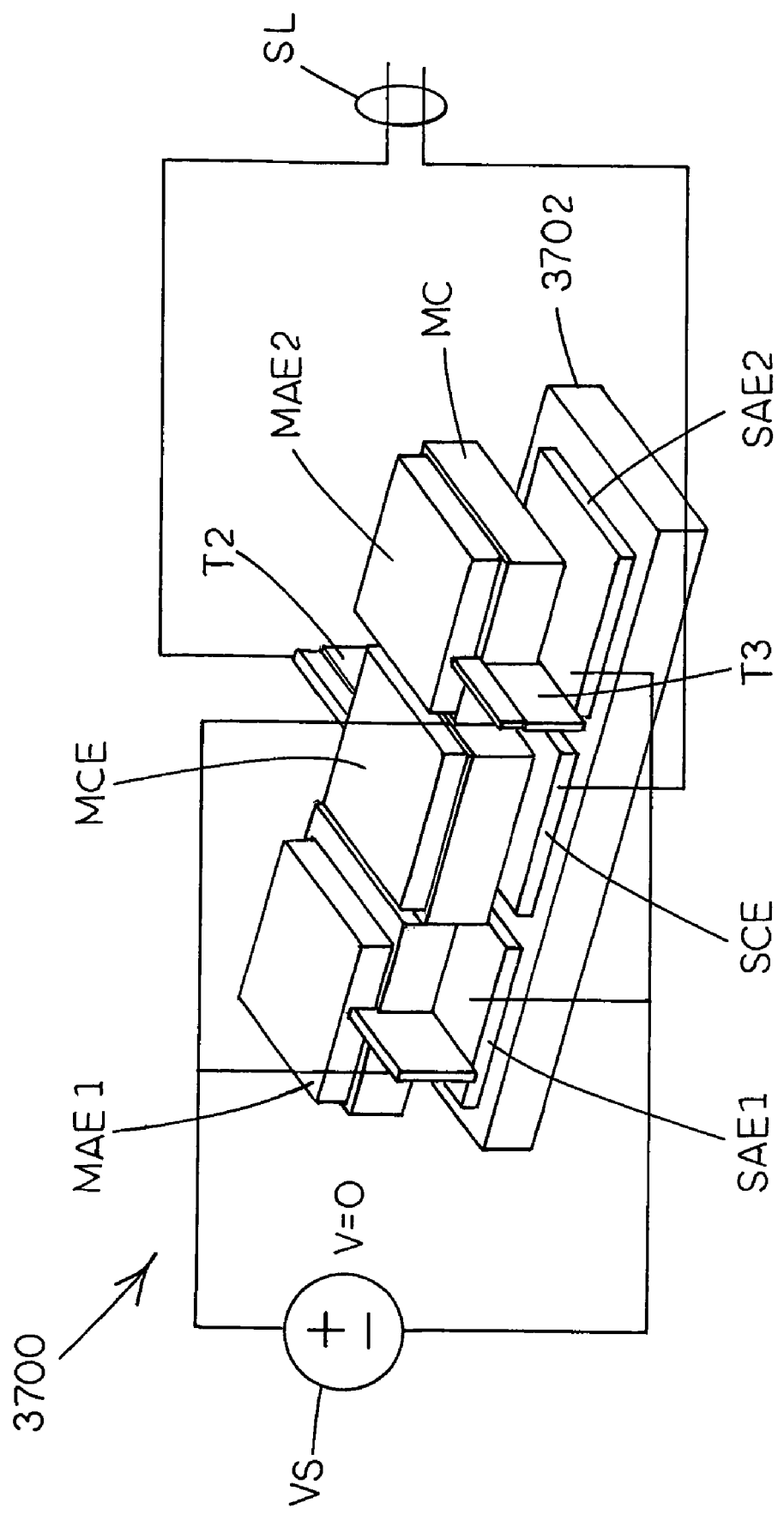
FIG. 37A is a top perspective view of another exemplary variable capacitor utilizing a rectangular geometry including a suspended, movable component.
Figure 37B:
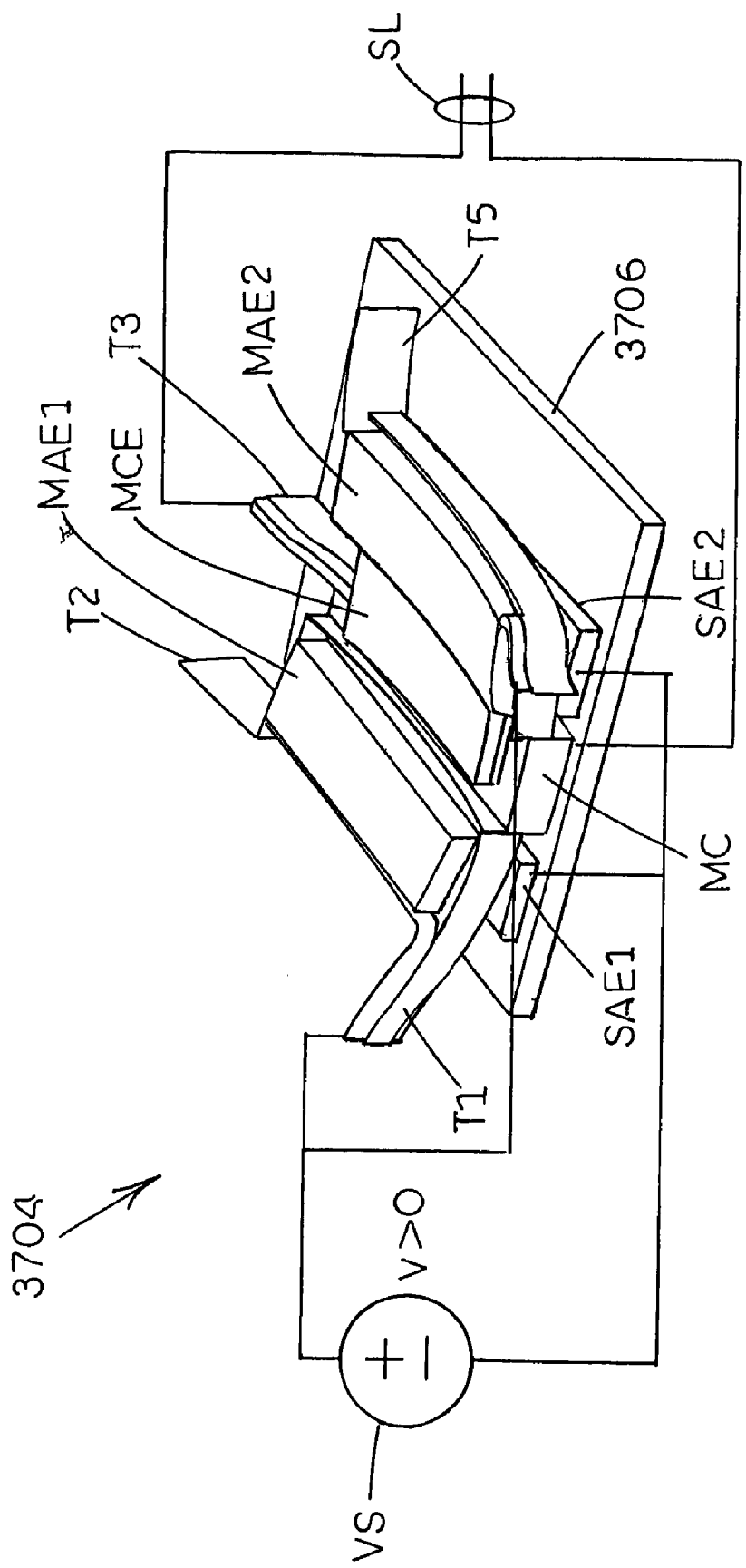
FIG. 37B is a top perspective view of another exemplary variable capacitor including a suspended, movable component.

FIGS. 37A and 37B illustrate top perspective views of other exemplary variable capacitors. Referring specifically to FIG. 37A, a top perspective view of another exemplary variable capacitor, generally designated 3700, utilizing a rectangular geometry including a suspended, movable component MC. Movable component MC can include movable actuation electrodes MAE1 and MAE2 and a movable capacitive electrode MCE. In this embodiment, electrodes MAE1, MAE2, and MCE are attached to a top surface of movable component MC. Alternatively, electrodes MAE1, MAE2, and MCE can be attached on the underside of movable component MC or on both the top and bottom surfaces. Actuation electrode MAE1 and MAE2 and capacitive electrode MCE can be electrically isolated via movable component MC.

Variable component 3700 can also include tethers T1, T2, and T3 attached to movable component MC and posts (not shown) for suspending movable component MC above a substrate 3702. Stationary actuation electrodes SAE1 and SAE2 can be disposed on the top surface of substrate 3702 and directly beneath movable actuation electrodes MAE1 and MAE2, respectively. A stationary capacitive electrode SCE can be disposed on the top surface of substrate 3702 and directly beneath movable capacitive electrode MCE. A voltage supply VS can be connected at one terminal to movable actuation electrodes MAE1 and MAE2 and at another terminal to stationary actuation electrodes SAE1 and SAE2. Voltage supply VS can apply a potential difference between the movable actuation electrodes (MAE1 and MAE2) and the stationary electrodes (SAE1 and SAE2) such that, at after a voltage threshold $V_T$ is achieved, movable component MC deflects towards substrate 3602. Electrodes SCE and MCE can be electrically connected to a signal line SL for supplying a signal, typically AC, to variable capacitor 3600 from other electrical circuitry (not shown).

FIG. 37B illustrates a top perspective view of another exemplary variable capacitor, generally designated 3704, including a suspended, movable component MC. Movable component MC can include movable actuation electrodes MAE1 and MAE2 and a movable capacitive electrode MCE. In this embodiment, electrodes MAE1, MAE2, and MCE are attached to a top surface of movable component MC. Alternatively, electrodes MAE1, MAE2, and MCE can be attached on the underside of movable component MC or on both the top and bottom surfaces. Actuation electrode MAE and capacitive electrode MCE can be electrically isolated via movable component MC.

Variable component 3704 can also include tethers T1, T2, T3, T4, and T5 attached to movable component MC and posts (not shown) for suspending movable component MC above a substrate 3706. Stationary actuation electrodes SAE1 and SAE2 can be disposed on the top surface of substrate 3706 and directly beneath movable actuation electrodes MAE1 and MAE2, respectively. A stationary capacitive electrode (not shown) can be disposed on the top surface of substrate 3706 and directly beneath movable capacitive electrode MCE. A voltage supply VS can be connected at one terminal to movable actuation electrodes MAE1 and MAE2 and at another terminal to stationary actuation electrodes SAE1 and SAE2. Voltage supply VS can apply a potential difference between the movable actuation electrodes (MAE1 and MAE2) and the stationary electrodes (SAE1 and SAE2) such that, at after a voltage threshold VT is achieved, movable component MC deflects towards substrate 3706. The stationary capacitive electrode and movable capacitive electrode MCE can be electrically connected to a signal line SL for supplying a signal, typically AC, to variable capacitor 3704 from other electrical circuitry (not shown).

According to one embodiment, isolation bumps can be included with a variable capacitor (such as variable capacitor 400 shown in FIG. 4) for preventing movable capacitive electrode (such as movable capacitive electrode MCE2 shown in FIG. 5) and/or movable actuation electrode (such as movable actuation electrodes MAE3 and MAE4 shown in FIG. 5) from contacting a stationary capacitive electrode (such as stationary capacitive electrode SCE shown in FIG. 5) and/or stationary actuation electrodes (such as stationary actuation electrodes SAE1 and SAE2 shown in FIG. 5). The use of isolation bumps can enable variable capacitors with high capacitance ratio and electromechanical stability.

Figure 38:
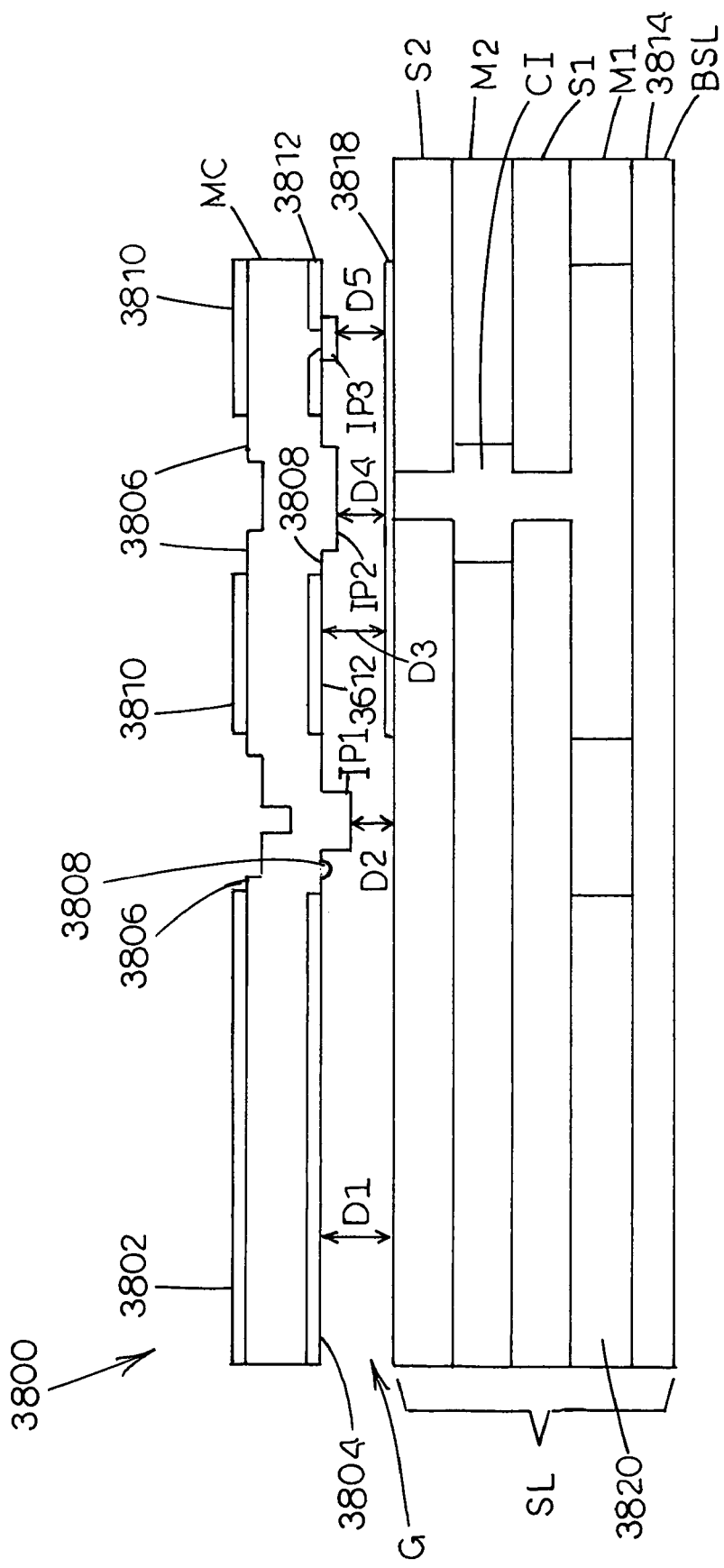
FIG. 38 is a cross-sectional side view of a variable capacitor having isolation bumps.
Figure 39:
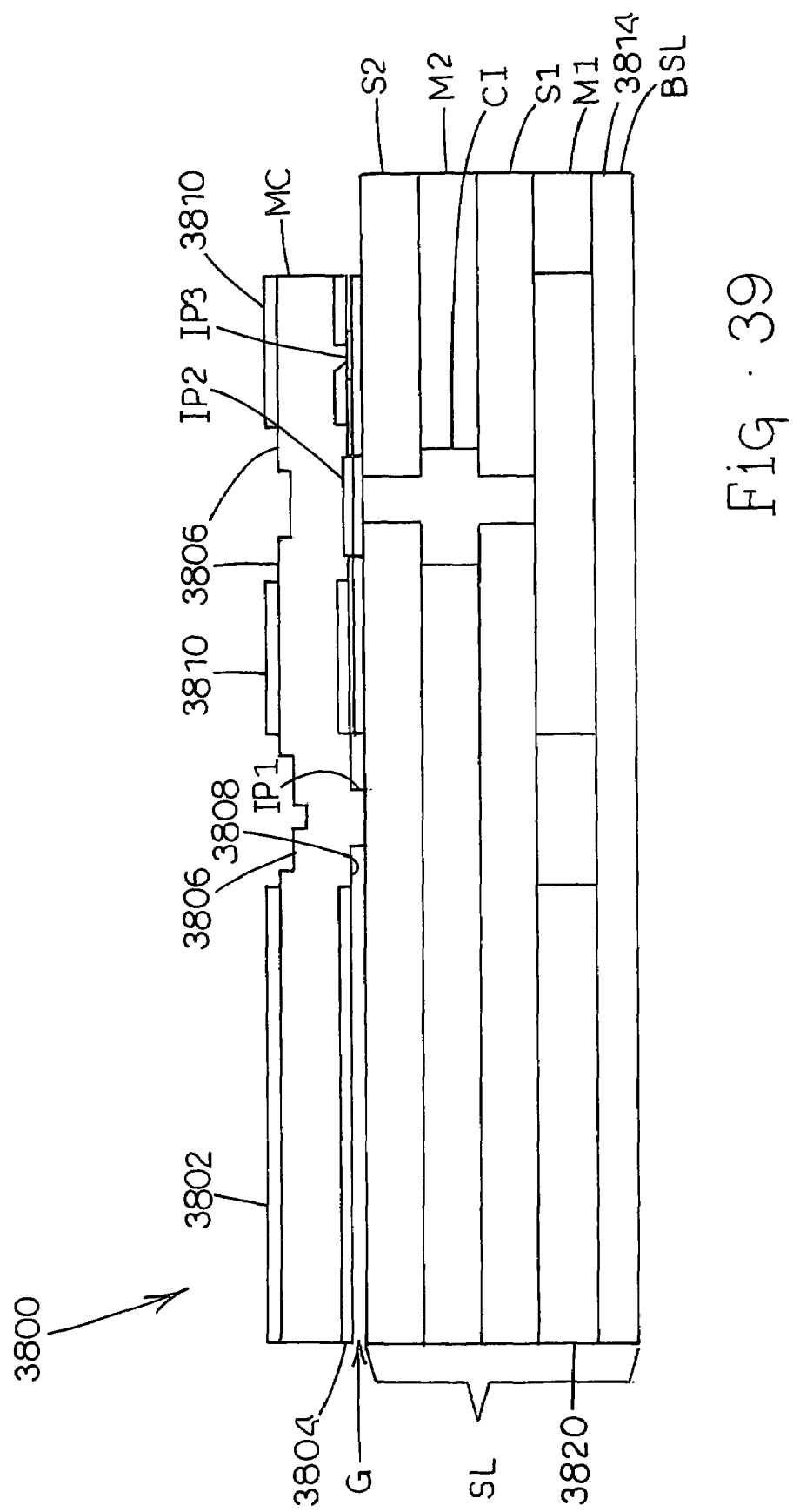
FIG. 39 is a cross-sectional side view of the variable capacitor shown in FIG. 38 when actuation voltage has been applied to the actuation electrodes.

FIGS. 38 and 39 illustrate different cross-sectional side views of a variable capacitor having isolation bumps. Referring to FIG. 38, a cross-sectional side view of a variable capacitor, generally designated 3800, having isolation bumps IP1, IP2, and IP3 is illustrated. Variable capacitor 3800 can include a movable component MC having movable actuation electrodes 3802 and 3804 positioned on a top and bottom surface 3806 and 3808, respectively. Movable component MC can include movable capacitive electrodes 3810 and 3812 positioned on a top and bottom surface 3806 and 3808, respectively. Variable capacitor 3800 can also include a substrate 3814 including a top surface 3816 having a stationary capacitive electrode 3818 deposited thereon.

Substrate 3814 can include one or more substrate layers, generally designated SL, including a stationary actuation electrode 3820 positioned therein. Substrate layers SL can also include a capacitor interconnect C1 for connecting stationary capacitive electrode 3818 to a signal line (not shown). In this embodiment, substrate layers SL include a base substrate layer BSL, a first metal layer M1, a first substrate layer S1, a second metal layer M2, and a second substrate layer S2.

In this embodiment, one or more sacrificial layers (not shown) can be used during a fabrication process for constructing movable component MC (FIG. 38). The sacrificial layers can subsequently be removed by a suitable process to form the gap, generally designated G, between movable component MC and substrate 3814. In this embodiment, gap G can extend different distances between movable component MC and substrate 3814. For example, a gap distance D1 between movable actuation electrode 3804 and surface 3816 of substrate 3814 can be about 2.5 micrometers with a range between about 0.5 and 10 micrometers. In this embodiment, gap distance D1 is the total of the following thicknesses: thickness of stationary capacitor 3818, the thickness of a first sacrificial layer for forming gap G, and the thickness of a second sacrificial layer for forming gap G. Additionally, for example, a gap distance D2 between isolation bump IP1 and surface 3816 of substrate 3814 can be about 2.0 micrometers in the embodiment and can be somewhat smaller than the overall actuation gap limited only be the fabrication precision. In this embodiment, gap distance D2 is the thickness of the first sacrificial layer. Additionally, for example, a gap distance D3 between movable capacitive electrode 3812 and surface 3816 of substrate 3814 can be between about 0.5 and 20 micrometers. In this embodiment, gap distance D3 is the thickness of the first and second sacrificial layers. Additionally, for example, a gap distance D4 between isolation bump IP2 and stationary capacitive electrode 3818 can be 2.0 micrometers and range from between about 0.5 and 20 micrometers. In this embodiment, gap distance D4 is the thickness of the first sacrificial layer. Additionally, for example, a gap distance D5 between isolation bump IP3 and stationary capacitive electrode 3818 can be 2.0 micrometers and range from between about 0.5 and 20 micrometers. In this embodiment, gap distance D5 is the thickness of the first sacrificial layer.

Referring to FIG. 39, actuation voltage has been applied to actuation electrodes 3802, 3804, and 3820 for moving movable component MC to a closed position such that isolation bumps IP1, IP2, and IP3 contact substrate 3814. Isolation bumps IP1, IP2, and IP3 can prevent movable capacitive electrode 3812 from contacting stationary capacitive electrode 3818. In this embodiment, capacitive electrodes 3812 and 3818 can be separated by a distance of about 0.5 micrometers when movable component MC is in the closed position.

The equivalent actuation gap of the embodiment shown in FIGS. 38 and 39 is provided by the following equation (wherein S1 represents the thickness of first substrate layer S1, S2 represents the thickness of second substrate layer S2, M2 represent the thickness of second metal layer M2, SAC1 represents the thickness of the first sacrificial layer, SAC2 represents the thickness of the second sacrificial layer, M3 represents the thickness of stationary capacitive electrode 3818 and ks represents the relative dielectric constant of the substrate):

$$\text{Equivalent electrical gap} = \frac{S1 + S2 + M2}{ks} + SAC1 + SAC2 + M3$$

In this embodiment, the equivalent electrical gap is about 5 micrometers. In this embodiment, the mechanical displacement is limited to the thickness of the first sacrificial layer. The actuation voltage scales as V $\alpha$ airgap^(3/2). For an air gap of 1.5 micrometers, the actuation voltage is 15 Volts. With an equivalent air gap of 5 micrometers, the actuation voltage is 91 Volts. With the variable capacitor 400 (FIG. 4) including isolation bumps such as isolation bumps IP1, IP2, and IP3 shown in FIGS. 38 and 39, a minimum capacitance of 0.5 picoFarads can be achieved. Additionally, in such a configuration, the capacitance ratio is about 4.

Figure 40:
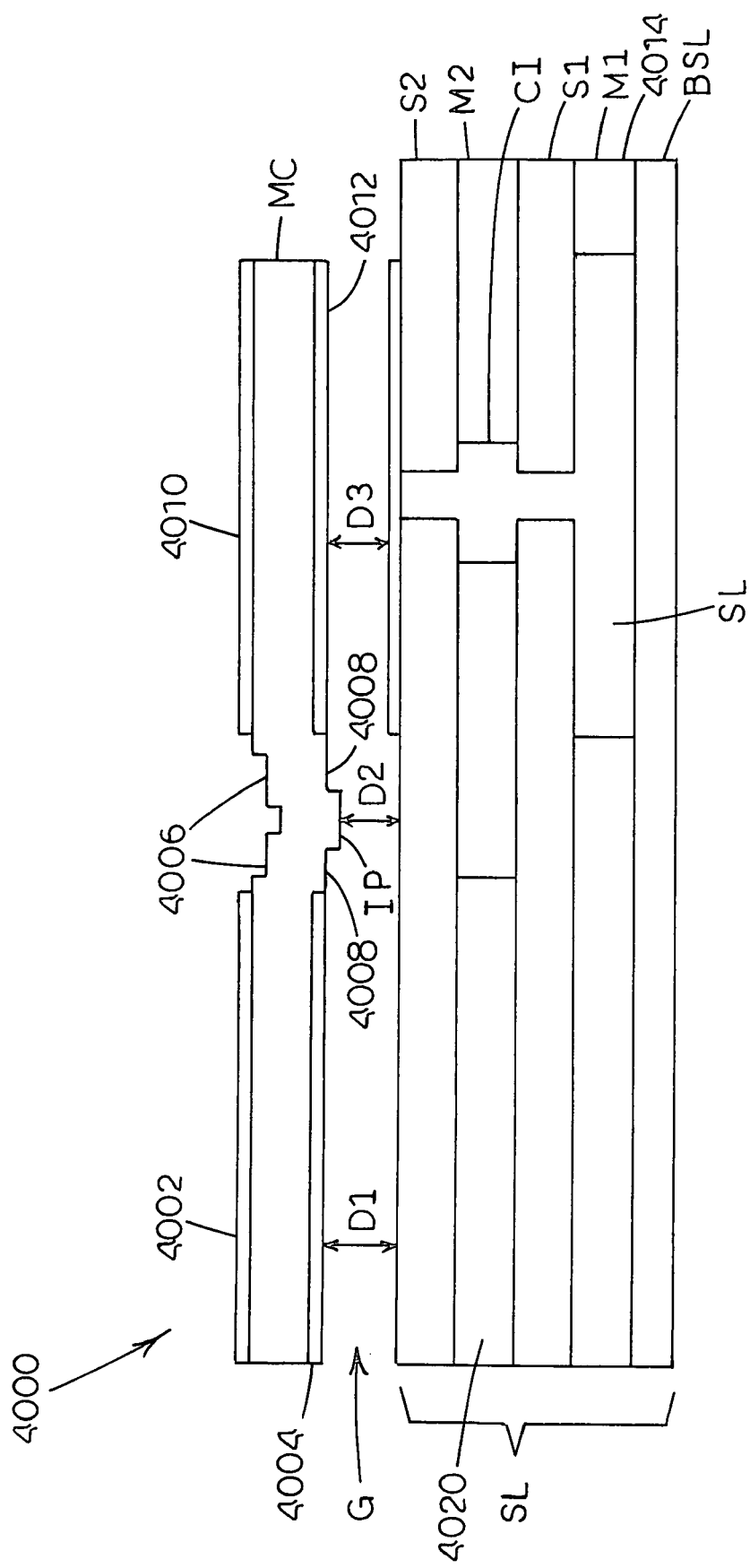
FIG. 40 is a cross-sectional side view of another variable capacitor having an isolation bump.

Referring to FIG. 40, a cross-sectional side view of another variable capacitor, generally designated 4000, having an isolation bump IP is illustrated. Variable capacitor 4000 can include a movable component MC having movable actuation electrodes 4002 and 4004 positioned on a top and bottom surface 4006 and 4008, respectively. Movable component MC can include movable capacitive electrodes 4010 and 4012 positioned on a top and bottom surface 4006 and 4008, respectively. Variable capacitor 4000 can also include a substrate 4014 including a top surface 4016 having a stationary capacitive electrode 4018 deposited thereon.

Substrate 4014 can include one or more substrate layers, generally designated SL, including a stationary actuation electrode 4020 positioned therein. Substrate layers SL can also include a capacitor interconnect C1 for connecting stationary capacitive electrode 4018 to a signal line (not shown). In this embodiment, substrate layers SL include a base substrate layer BSL, a first metal layer M1, a first substrate layer S1, a second metal layer M2, and a second substrate layer S2.

In this embodiment, one or more sacrificial layers (not shown) can be used during a fabrication process for constructing movable component MC (FIG. 40). The sacrificial layers can subsequently be removed by a suitable process to form the gap, generally designated G, between movable component MC and substrate 4014. In this embodiment, gap G can extend different distances between movable component MC and substrate 4014. For example, a gap distance D1 between movable actuation electrode 4004 and surface 4016 of substrate 4014 can be about 2.5 micrometers with a range between about 0.5 and 10 micrometers. In this embodiment, gap distance D1 is the total of the following thickness: thickness of stationary capacitor 4018, the thickness of a first sacrificial layer for forming gap G, and the thickness of a second sacrificial layer for forming gap G. Additionally, for example, a gap distance D2 between isolation bump IP and surface 4016 of substrate 4014 can be between about 0.5 and 20 micrometers. In this embodiment, gap distance D2 is the thickness of the first sacrificial layer. Additionally, for example, a gap distance D3 between movable capacitive electrode 4012 and surface 4016 of substrate 4014 can be about 2.0 and range from between about 0.5 and 20 micrometers. In this embodiment, gap distance D3 is the thickness of the first and second sacrificial layers. The gap ratio is about 0.55 in this embodiment.

The equivalent actuation gap of the embodiment shown in FIG. 40 is provided by the following equation (wherein S2 represents the thickness of second substrate layer S2, SAC1 represents the thickness of the first sacrificial layer, SAC2 represents the thickness of the second sacrificial layer, M3 represents the thickness of stationary capacitive electrode 4018 and ks represents the relative dielectric constant of the substrate):

$$\text{Equivalent electrical gap} = \frac{S2}{ks} + SAC1 + SAC2 + M3$$

In this embodiment, the equivalent electrical gap is about 3.3 micrometers. In this embodiment, the mechanical displacement is limited by the thickness of the first sacrificial layer. For an air gap of 1.5 micrometers, the actuation voltage is 15 Volts. With an equivalent air gap of 5 micrometers, the actuation voltage is 49 Volts. With the variable capacitor 400 (FIG. 4) including isolation bumps such as isolation bump IP shown in FIG. 40, a minimum capacitance of 0.5 picoFarads can be achieved. Additionally, in such a configuration, the capacitance ratio is about 4.

Figure 41:
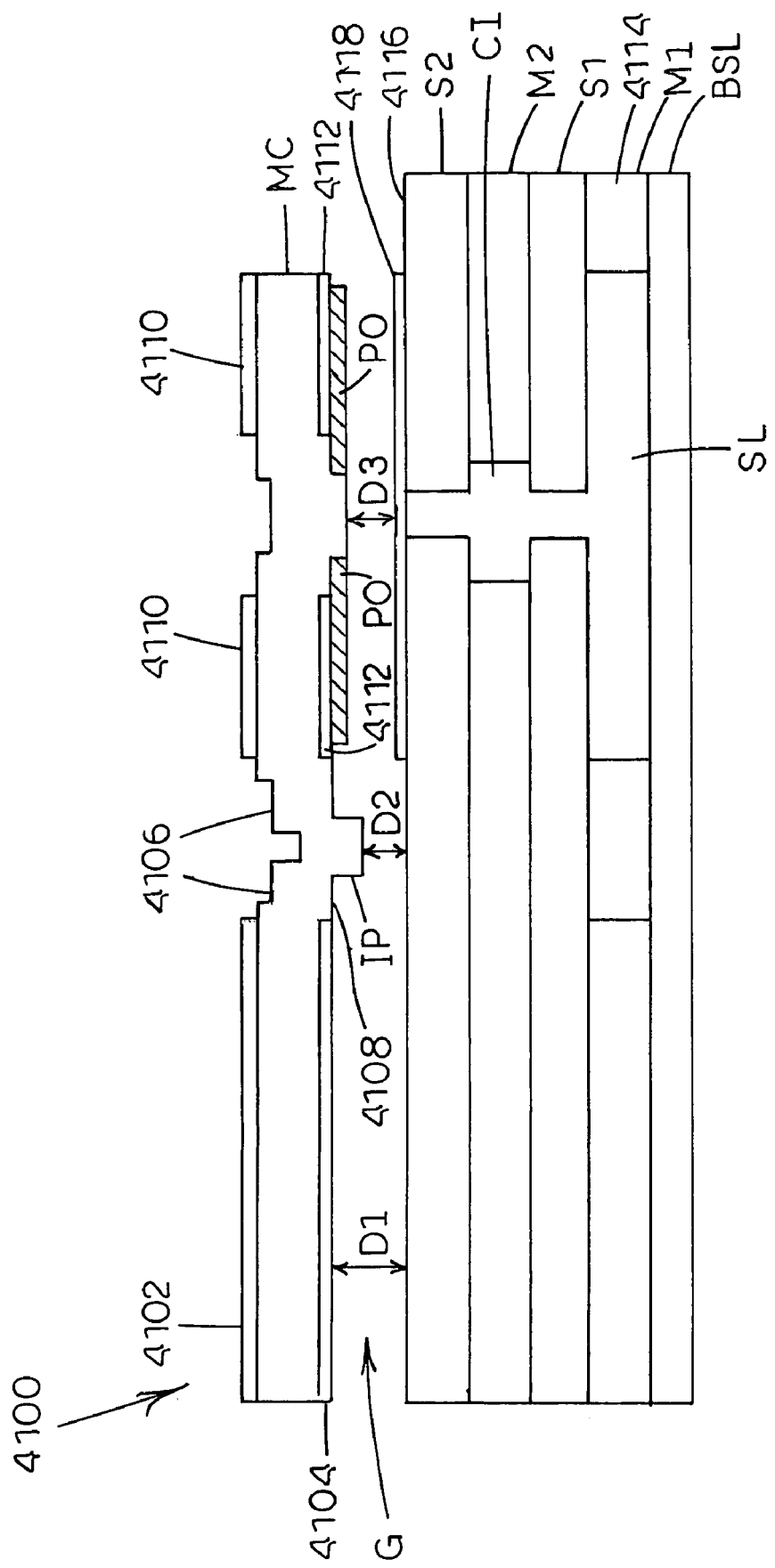
FIG. 41 is a cross-sectional side view of another variable capacitor having an isolation bump.

Referring to FIG. 41, a cross-sectional side view of another variable capacitor, generally designated 4100, having an isolation bump IP is illustrated. Variable capacitor 4100 can include a movable component MC having movable actuation electrodes 4102 and 4104 positioned on a top and bottom surface 4106 and 4108, respectively. Movable component MC can include movable capacitive electrodes 4110 and 4112 positioned on a top and bottom surface 4106 and 4108, respectively. Variable capacitor 4100 can also include a substrate 4114 including a top surface 4116 having a stationary capacitive electrode 4118 deposited thereon.

Substrate 4114 can include one or more substrate layers, generally designated SL, including a stationary actuation electrode 4120 positioned therein. Substrate layers SL can also include a capacitor interconnect C1 for connecting stationary capacitive electrode 4118 to a signal line (not shown). In this embodiment, substrate layers SL include a base substrate layer BSL, a first metal layer M1, a first substrate layer S1, a second metal layer M2, and a second substrate layer S2.

Movable component MC can also include a planarization dielectric that is compatible with the process attached to bottom surface 4108. A exemplary dielectric choice is to use silicon dioxide for the planarization dielectric. This planarization oxide PO can be non-conductive for preventing movable capacitive electrode 4112 from electrically communicating with stationary capacitive electrode 4118.

In this embodiment, one or more sacrificial layers (not shown) can be used during a fabrication process for constructing movable component MC (FIG. 41). The sacrificial layers can subsequently be removed by a suitable process to form the gap, generally designated G, between movable component MC and substrate 4114. In this embodiment, gap G can extend different distances between movable component MC and substrate 4114. For example, a gap distance D1 between movable actuation electrode 4104 and surface 4116 of substrate 4114 can be about 2.5 micrometers with a range between about 0.5 and 10 micrometers. In this embodiment, gap distance D1 is the total of the following thickness: thickness of stationary capacitor 4118, the thickness of a first sacrificial layer for forming gap G, and the thickness of a second sacrificial layer for forming gap G. Additionally, for example, a gap distance D2 between isolation bump IP and surface 4116 of substrate 4114 can be between about 0.5 and 20 micrometers. In this embodiment, gap distance D2 is the thickness of the first sacrificial layer. Additionally, for example, a gap distance D3 between planarization oxide PO and surface 4116 of substrate 4114 can be between about 0.5 and 20 micrometers. In this embodiment, gap distance D3 is the thickness of the first and second sacrificial layers.

Regarding the embodiment shown in FIG. 41, the unactuated capacitance value is about 0.6 picoFarads. The capacitance ratio in this embodiment is about 13. The higher ratio (greater than 3 times the above embodiments assuming silicon oxide as the planarization oxide) and higher maximum capacitance (greater than 4 times the above embodiments assuming silicon oxide as the planarization oxide) enabled by having a dielectric in the gap provide more control in the circuit and allow the use of smaller variable capacitors to provide the required function. Higher dielectric constant materials that are compatible with the process can also be utilized for the planarization oxide with greater gains in ratio and maximum capacitance.

Figure 42:
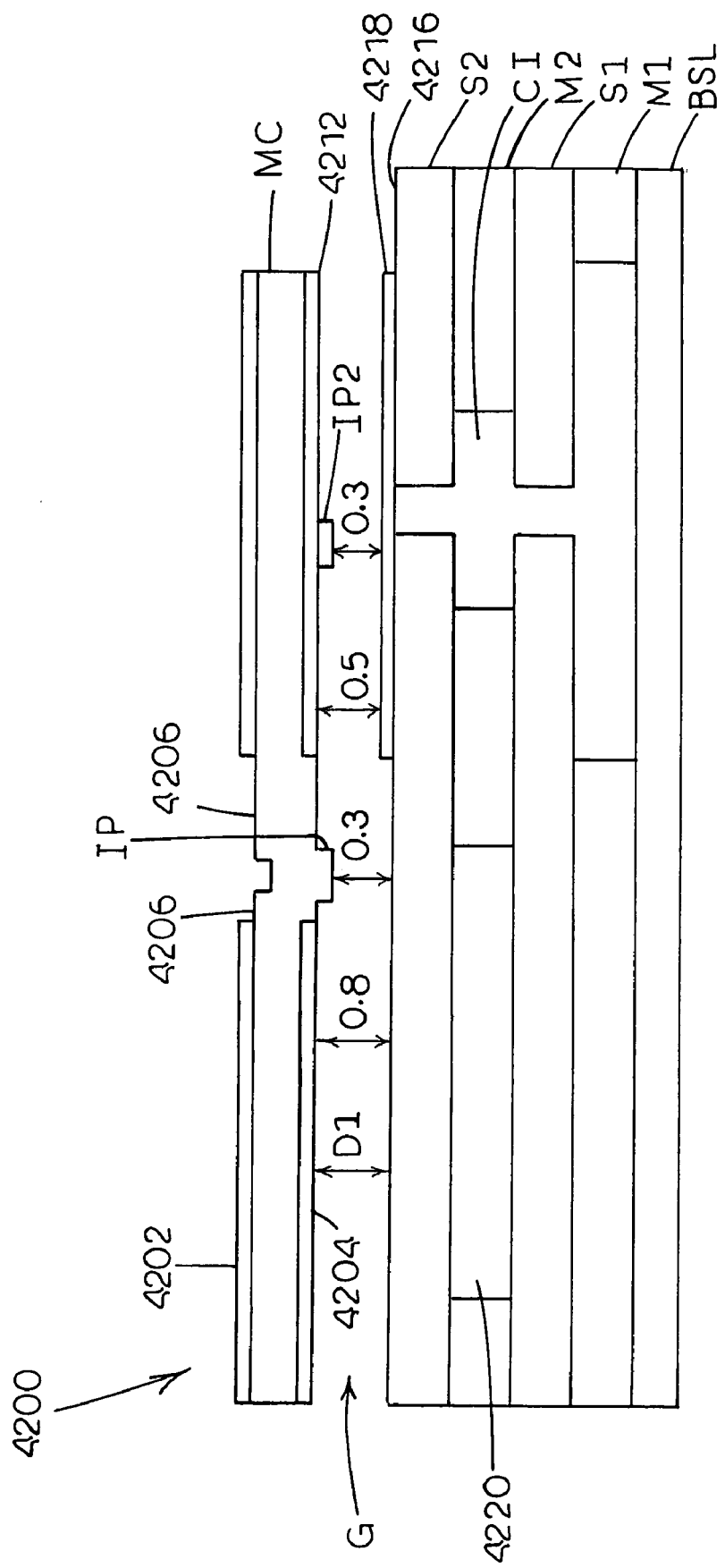
FIG. 42 is a cross-sectional side view of another variable capacitor having isolation bumps.

Referring to FIG. 42, a cross-sectional side view of another variable capacitor, generally designated 4200, having isolation bumps IP1 and IP2 is illustrated. Variable capacitor 4200 can include a movable component MC having movable actuation electrodes 4202 and 4204 positioned on a top and bottom surface 4206 and 4208, respectively. Movable component MC can include movable capacitive electrodes 4210 and 4212 positioned on a top and bottom surface 4206 and 4208, respectively. Variable capacitor 4200 can also include a substrate 4214 including a top surface 4216 having a stationary capacitive electrode 4218 deposited thereon.

Substrate 4214 can include one or more substrate layers, generally designated SL, including a stationary actuation electrode 4220 positioned therein. Substrate layers SL can also include a capacitor interconnect C1 for connecting stationary capacitive electrode 4218 to a signal line (not shown). In this embodiment, substrate layers SL include a base substrate layer BSL, a first metal layer M1, a first substrate layer S1, a second metal layer M2, and a second substrate layer S2.

In this embodiment, one or more sacrificial layers (not shown) can be used during a fabrication process for constructing movable component MC (FIG. 42). The sacrificial layers can subsequently be removed by a suitable process to form the gap, generally designated G, between movable component MC and substrate 4214. In this embodiment, gap G can extend different distances between movable component MC and substrate 4214. For example, a gap distance D1 between movable actuation electrode 4204 and surface 4216 of substrate 4214 can be about 0.8 micrometers. Alternatively, distance D1 can range between about 0.5 and 20 micrometers. In this embodiment, distance D1 is the thickness of the first and second sacrificial layers. Additionally, for example, a gap distance D2 between isolation bump IP1 and surface 4216 of substrate 4214 can be about 0.3 micrometers. Alternatively, distance D2 can range from between about 0.2 and 19 micrometers. In this embodiment, gap distance D2 is the thickness of the first sacrificial layer. For the largest ratio, the second sacrificial layer should be as thin as is feasible with suitable thickness control. Additionally, for example, a gap distance D3 between movable actuation electrode 4212 and stationary actuation electrode 4218 can be about 0.5 micrometers. Alternatively, distance D3 can range from between about 0.2 and 20 micrometers. In this embodiment, gap distance D3 is the thickness of the first and second sacrificial layers after planarization to level the top of the sacrificial material to the level of the sacrificial material in the area where there is no portion of electrode 4218. Additionally, for example, a gap distance D4 between isolation bump IP2 and stationary actuation electrode 4218 can be about 0.3 micrometers. Alternatively, distance D4 can range between about 0.2 and 19 micrometers. In this embodiment, gap distance D4 is the thickness of the first sacrificial layer.

Regarding the embodiment shown in FIG. 42, the maximum capacitance value is about 5 picoFarads, and the minimum capacitance value is about 2 picoFarads. The capacitance ratio in this embodiment is about 2.5. In this embodiment, the actuation voltage at the maximum capacitance is about 15 Volts.

A variable capacitor according to one embodiment can include a rotatable movable component attached to one or more torsional beams for providing resistance to the rotational motion. The movable component can be attached to the torsional beam such that the movable component has two "free" ends for rotating about the torsional beam. One or more movable actuation electrodes can be disposed on one end of the movable component. Additionally, one or more movable capacitive electrodes can be disposed on an opposing end of the movable component such that the attachment of the torsional beam is between the movable capacitive electrodes and the movable actuation electrodes. When the movable actuation electrodes are actuated, the movable actuation electrode can cause its corresponding end of the movable component to move downward and rotate the movable component about the torsional beams. Additionally, when the movable actuation electrodes are actuated, the opposing end of the movable component can move upward to displace the movable capacitive electrode from an associated stationary capacitive electrode for changing the capacitance of the variable capacitor.

Figure 43:
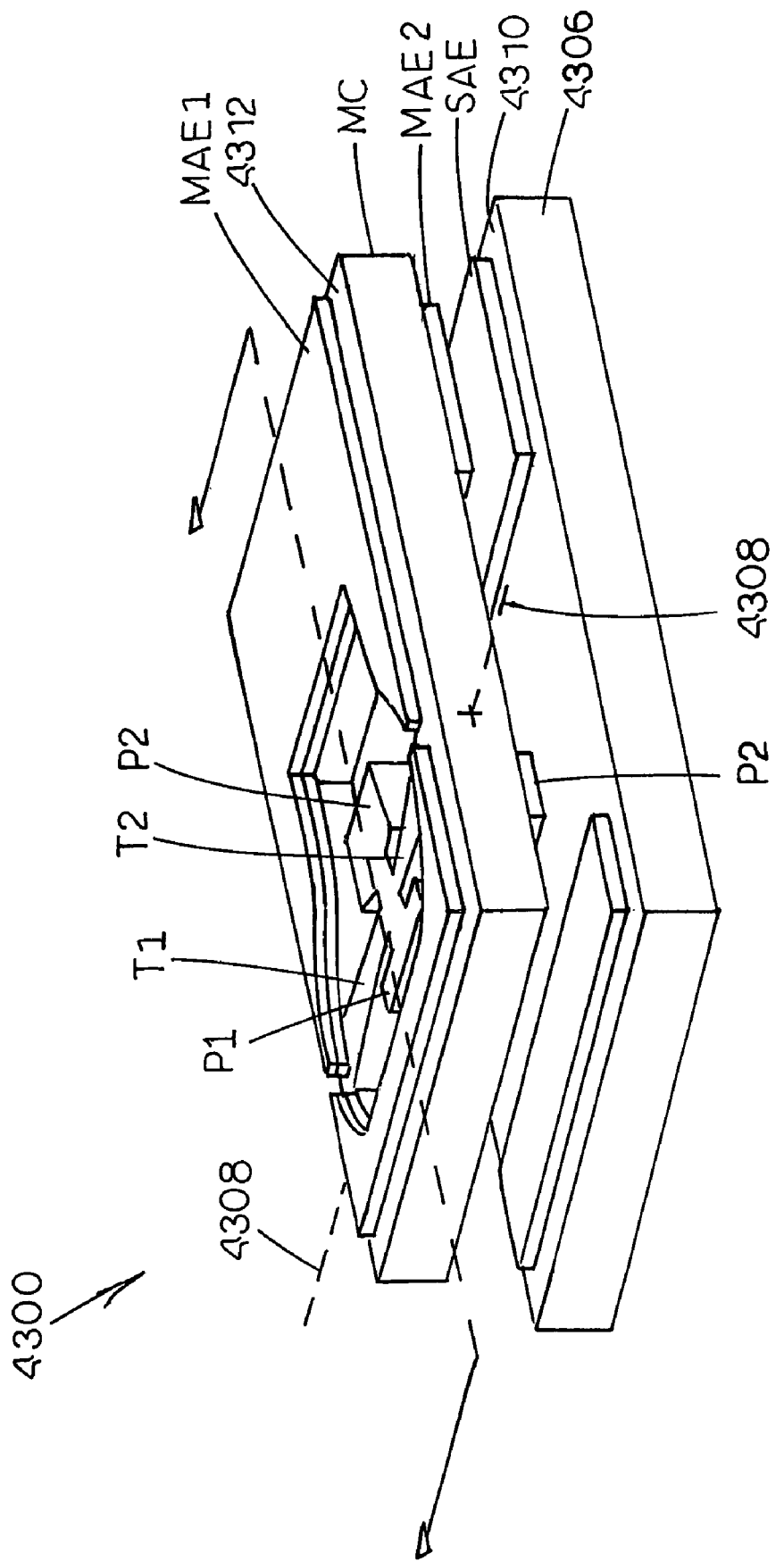
FIG. 43 is a top perspective view of variable capacitor.
Figure 44A:
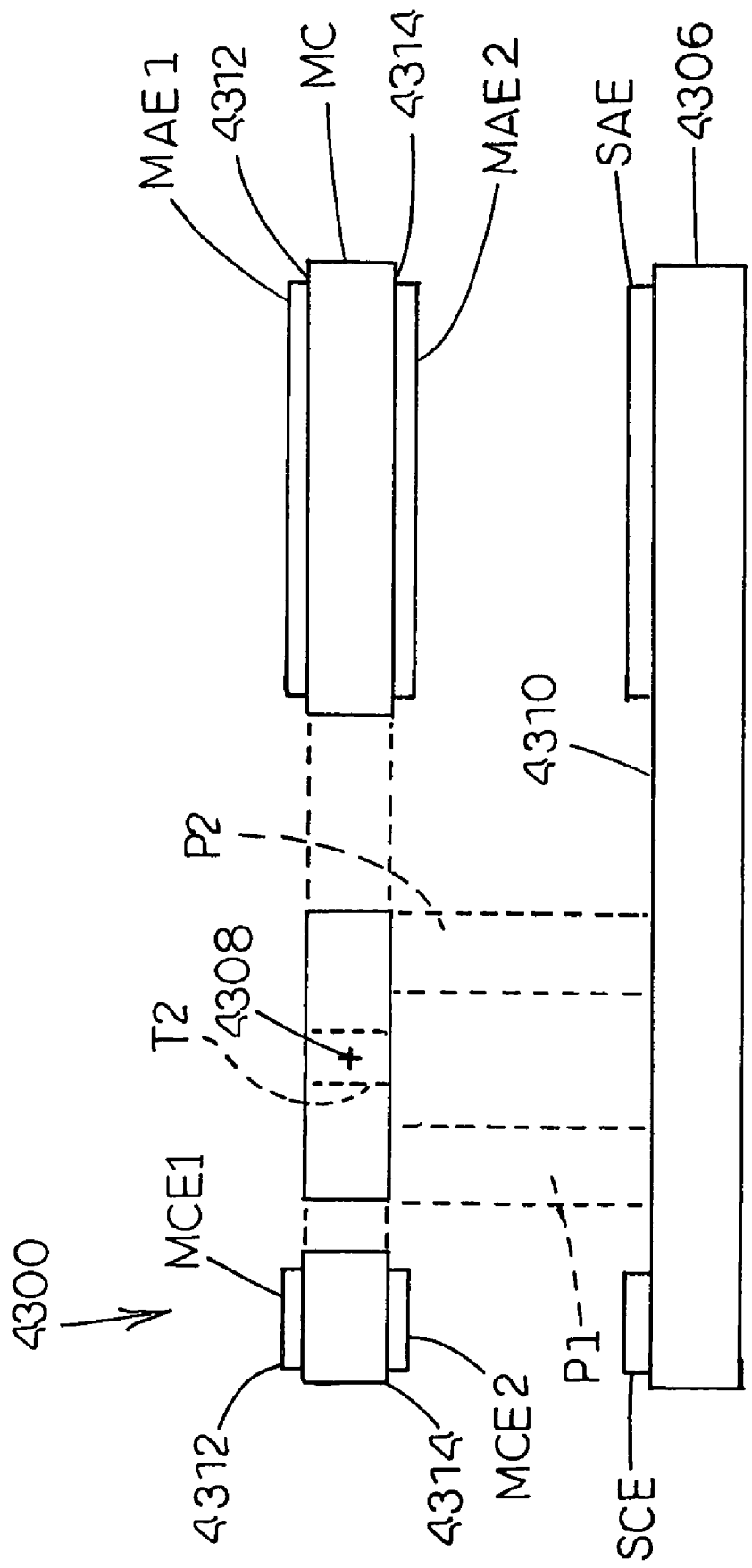
FIG. 44A is a cross-sectional side view of the variable capacitor shown in FIG. 43.
Figure 44B:
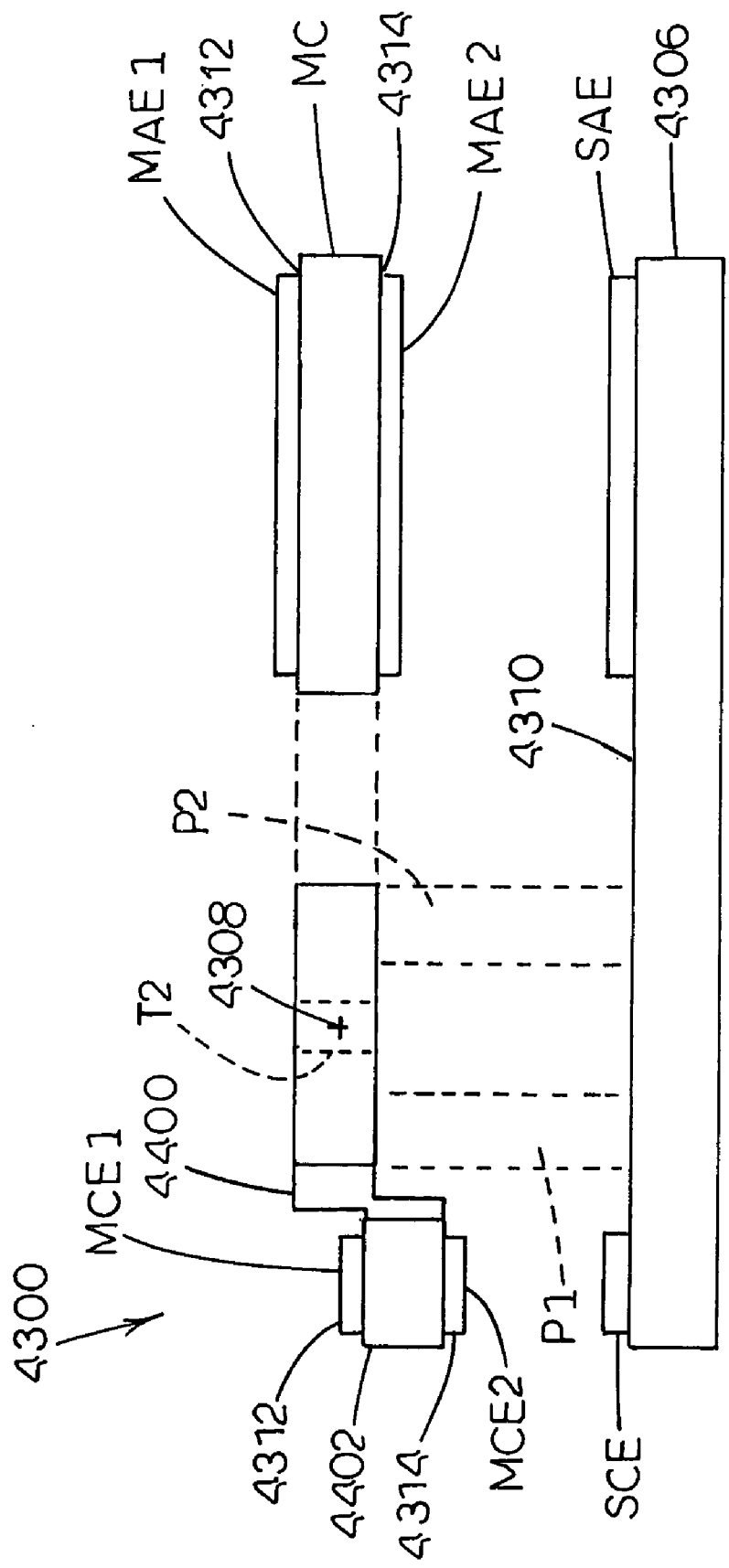
FIG. 44B is a cross-sectional side view of an alternative embodiment of the variable capacitor shown in FIG. 43.
Figure 44C:
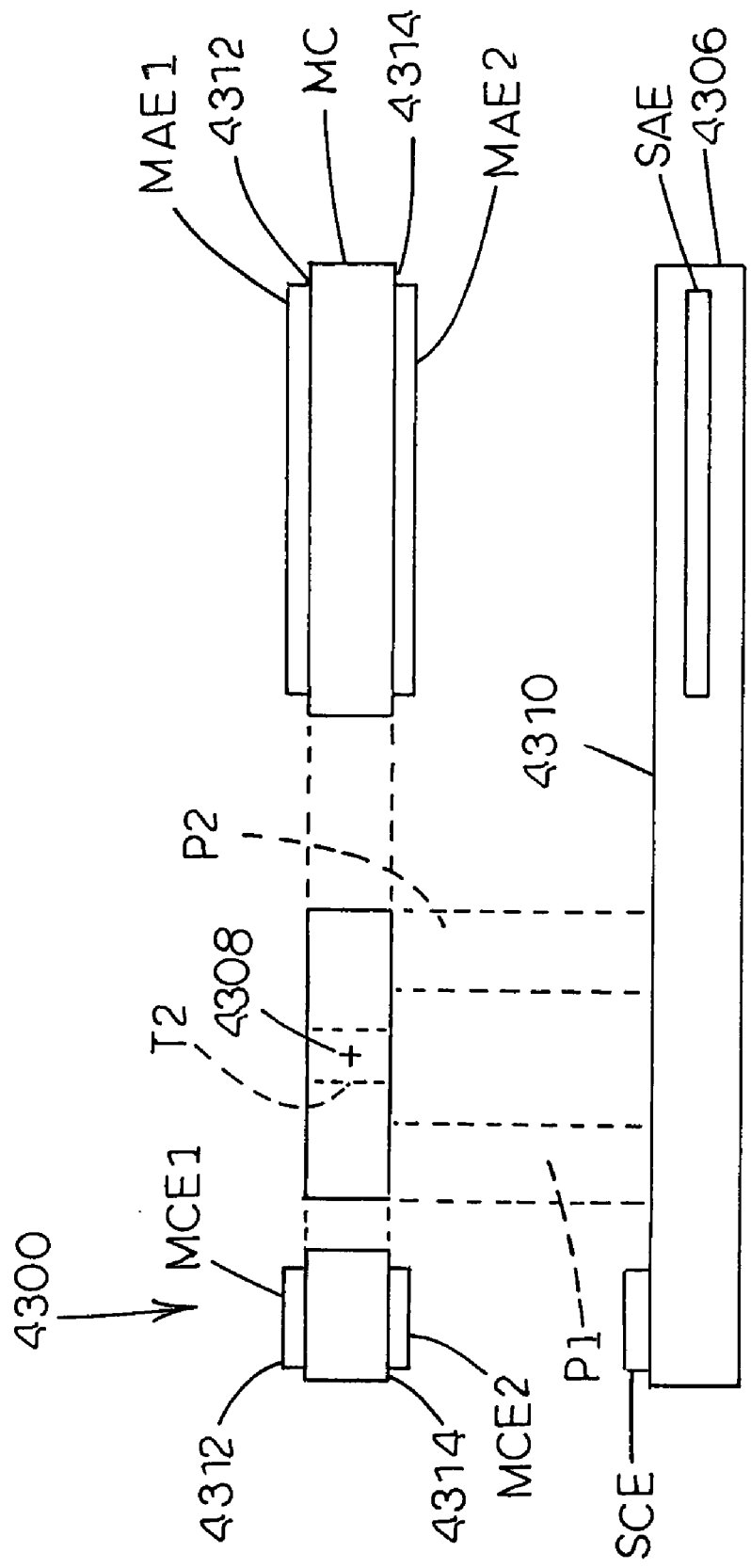
FIG. 44C is a cross-sectional side view of another alternative embodiment of the variable capacitor shown in FIG. 43.
Figure 45:
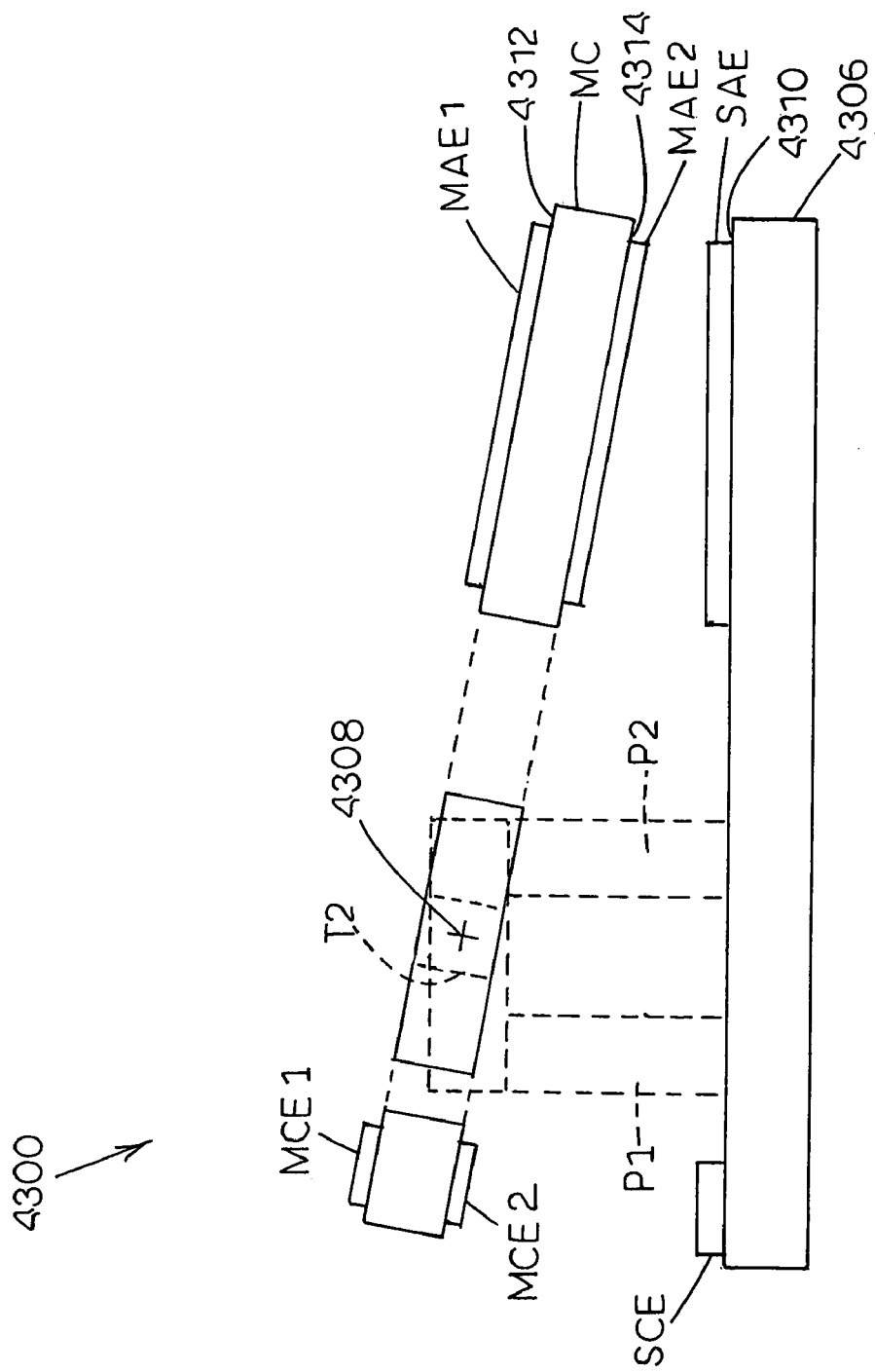
FIG. 45 is a cross-sectional side view of variable capacitor in an actuated mode.

FIGS. 43-45 illustrate different views of a variable capacitor, generally designated 4300, including torsional beams TB1 and TB2. Referring specifically to FIG. 43, a top perspective view of variable capacitor 4300 is illustrated. Variable capacitor 4300 can include a substrate 4306 having a pair of spaced-apart pivot posts P1 and P2 supporting torsional beams TB1 and TB2, respectively. Torsional beams TB1 and TB2 can support a movable component MC for rotational movement of opposing ends of movable component MC about a pivot axis (generally designated with a broken line 4308 extending from a side of movable component MC). Torsional beams TB1 and TB2 can also provide resistance to the rotational movement of movable component MC. The center support of these torsional beams enables robust fabrication and operation of torsional variable capacitors using movable component MC layers with compressive intrinsic stresses.

Torsional beams TB1 and TB2 can provide vertical stiffness to limit vertical motion of movable component MC with respect to substrate 4306. Further, torsional beams TB1 and TB2 can provide torsional softness to ease rotational motion of movable component MC. FIG. 44A illustrates a cross-sectional side view of one embodiment of variable capacitor in the direction indicated by lines L1 and L2 (shown in FIG. 43). Referring to FIG. 44A, in this embodiment, torsional beams TB1 and TB2 (shown in FIG. 43) can have a rectangular cross-section and a beam of sufficient length to provide flexibility. Alternatively, torsional beams TB1 and TB2 can have any suitable cross-section shape, dimension, or length. Additionally, torsional beams TB1 and TB2 can include folded springs. Torsional beams TB1 and TB2 can comprise one or more layers of silica, alumina, un-doped semiconductors, polymers, and other non-conductive materials known to those of ordinary skill in the art.

FIG. 44B illustrates a cross-sectional side view of an alternative embodiment of variable capacitor 4300. In this embodiment, movable component MC comprises a first portion 4400 and a second portion 4402, wherein second portion 4402 is positioned closer to substrate 4306 than first portion 4400. Therefore, movable actuation electrodes (MAE1 and MAE2) and stationary actuation electrode SAE can be positioned further apart than the distance between movable capacitance electrodes (MCE1 and MCE2) and stationary capacitance electrode SCE to its attachment to first portion 4400 because movable actuation electrode MAE is positioned on raised first portion 4400. The dual gap can be formed by two different thicknesses of sacrificial layer.

Referring to FIG. 44C illustrates a cross-sectional side view of another alternative embodiment of variable capacitor 4300. Stationary actuation electrode SAE can be buried in substrate 4306. This positioning can increase the distance between stationary actuation electrode SAE and movable actuation electrodes MAE1 and MAE2 without adding the complexity of additional sacrifical layers.

Substrate 4306 can also include a stationary actuation electrode SAE and a stationary capacitive electrode SCE formed on a surface 4310 thereof. Movable component MC can include movable actuation electrodes MAE1 and MAE2 attached to a top surface 4312 and a bottom surface 4314 (shown in FIG. 44), respectively, of movable component MC. Movable actuation electrodes MAE1 and MAE2 can be positioned above stationary actuation electrode SAE. Movable actuation electrodes MAE1 and MAE2 can be attached to one terminal of a voltage supply (such as voltage supply VS shown in FIG. 4) and stationary actuation electrode SAE can be attached to another terminal of the voltage supply for applying a potential difference to actuate variable capacitor 4300. When actuated, movable actuation electrodes MAE1 and MAE2 can move towards stationary actuation electrode SAE for operatively moving movable component MC along pivot axis 4308.

Substrate 4306 can also include a stationary capacitive electrode SCE attached to surface 4310. Movable component MC can also include movable capacitive electrodes MCE1 and MCE2 attached to surfaces 4312 and 4314, respectively. Capacitive electrodes SCE, MCE1, and MCE2 can be electrically connected to a signal line (such as signal line SL shown in FIG. 4) for supplying a signal to variable capacitor 4300 from other electrical circuitry (not shown). When variable capacitor 4300 is actuated to move movable component MC along pivot axis 4308, movable capacitive electrodes MCE1 and MCE2 can be moved away from stationary capacitive electrode SCE to change the capacitance between stationary capacitive electrode SCE and movable capacitive electrodes MCE1 and MCE2.

Referring to FIG. 45, a cross-sectional side view of variable capacitor 4300 in an actuated mode is illustrated. Movable actuation electrodes MAE1 and MAE2 are positioned closer to stationary actuation electrode SAE than in an unactuated position as shown in FIGS. 43 and 44. Movable capacitive electrodes MCE1 and MCE2 are positioned further from stationary capacitive electrode SCE than in the unactuated position shown in FIGS. 43 and 44.

Variable capacitor 4300 can achieve the specifications shown in Table 5 below.

TABLE 5

Summary of Specifications

| Parameter | Value |
| --- | --- |
| $V_{control}$ | 4.5 V |
| Resonance frequency | 2 kHz |
| $C_{min}$ | 0.9 pF |
| Capacitance ratio | 1:2 |

Figure 46:
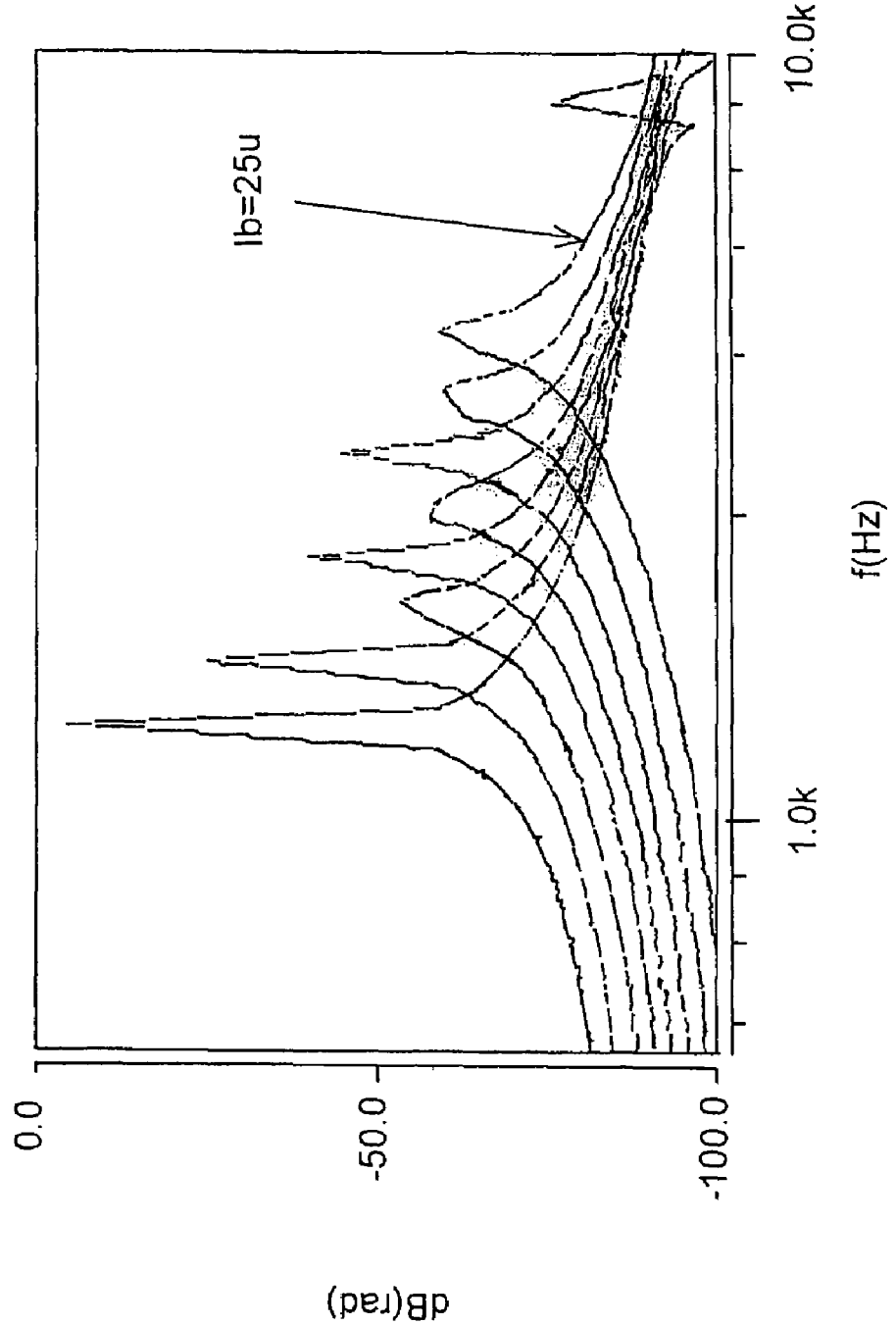
FIG. 46 is a graph showing the harmonic behavior for variable capacitor.

The specifications indicated in Table 5 can be varied by changing the length of torsional beams T1 and T2 (FIG. 43). A capacitance value of about 0.26 pF for variable capacitor 4300 can be obtained. Torsional beams T1 and T2 can have a length between about 25 and 175 micrometers. FIG. 46 illustrates a graph showing the harmonic behavior for variable capacitor 4300 (FIGS. 43-45).

Figure 47:
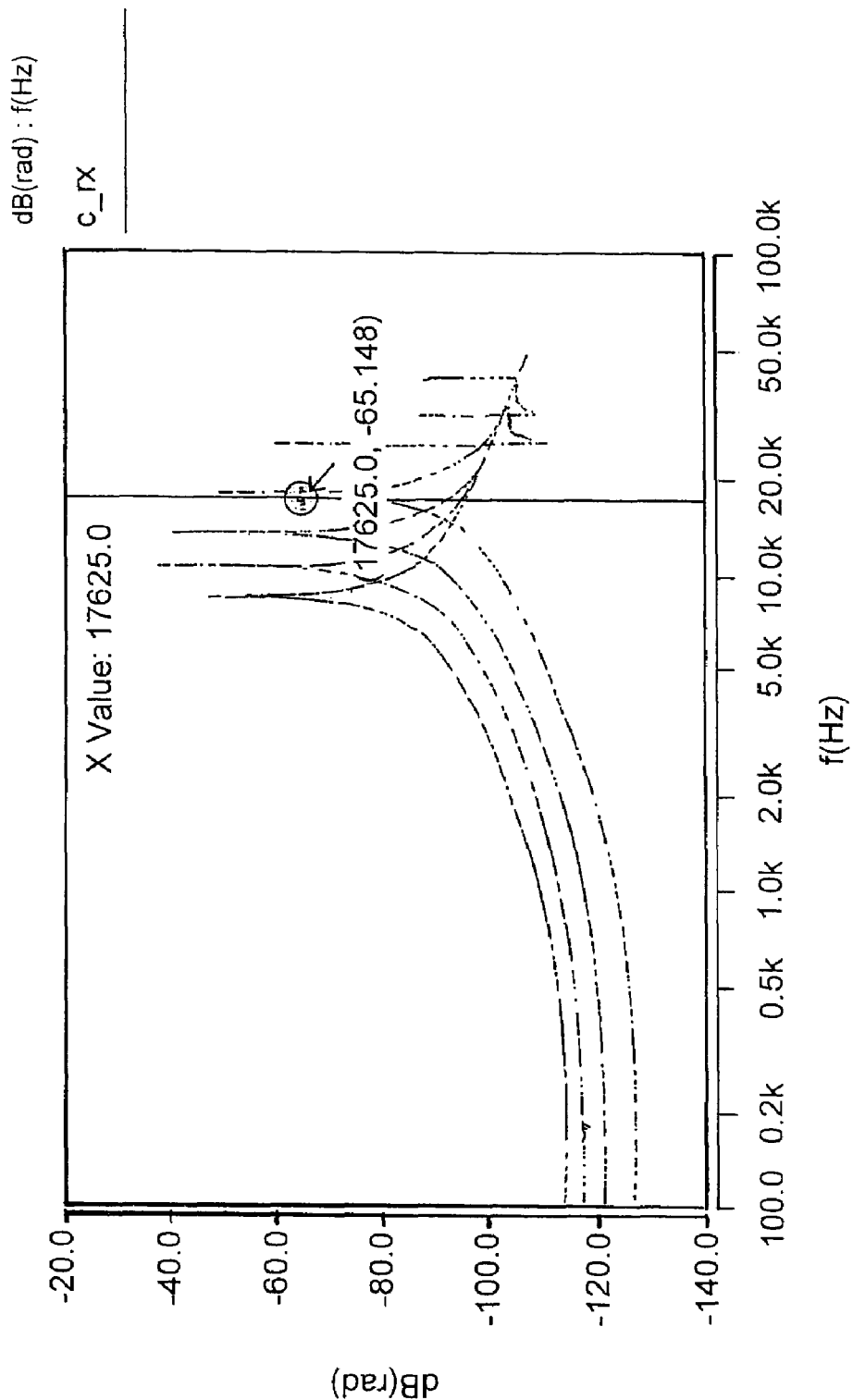
FIG. 47 is a graph showing the frequency response for different distances of the movable actuation electrodes and the movable capacitive electrodes shown in FIG. 43.

An important parameter effecting resonance frequency is rotational inertia of movable component MC. The rotational inertia of movable component MC equals the mass of movable actuation electrodes MAE1 and MAE2 and movable capacitive electrodes SCE1 and SCE2. FIG. 47 illustrates a graph showing the frequency response for different distances of movable actuation electrodes MAE1 and MAE2 (FIG. 43) and movable capacitive electrodes SCE1 and SCE2 (FIG. 43) from pivot axis 4308 (FIG. 43).

Figure 48:
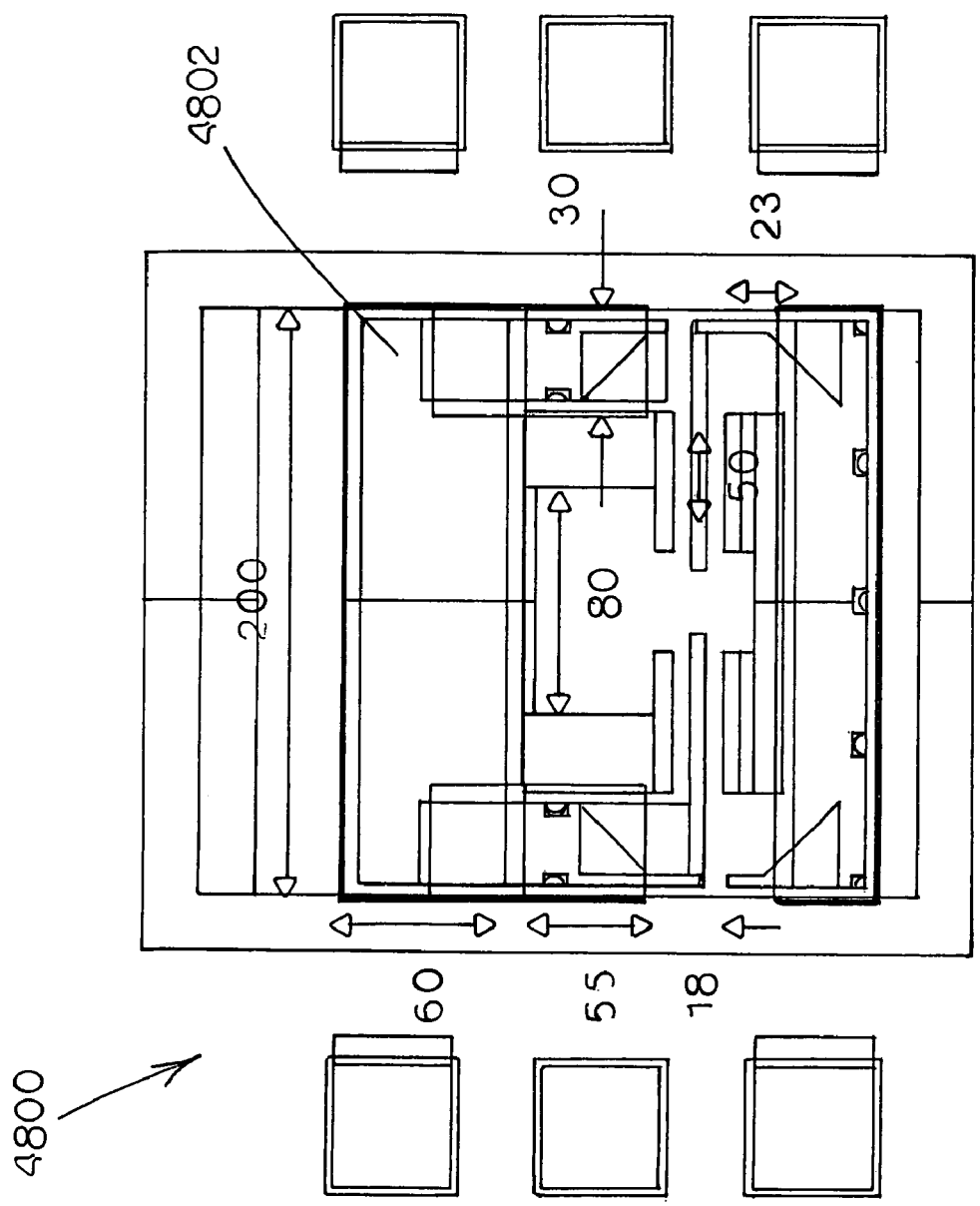
FIG. 48 is a top view of a schematic diagram of another examplary torsional variable capacitor.

FIG. 48 illustrates a top view of a schematic diagram of another examplary torsional variable capacitor, generally designated 4800. Variable capacitor 4800 can include a movable capacitor MC having a top surface 4802. A movable capacitance electrode MCE and a movable actuation electrode MAE can be attached to top surface 4802. Variable capacitor 4800 can also include pivot posts P1 and P2 and torsional beams TB1 and TB2. The dimensions of the components of variable capacitor 4800 are indicated in micrometers.

Figure 49:
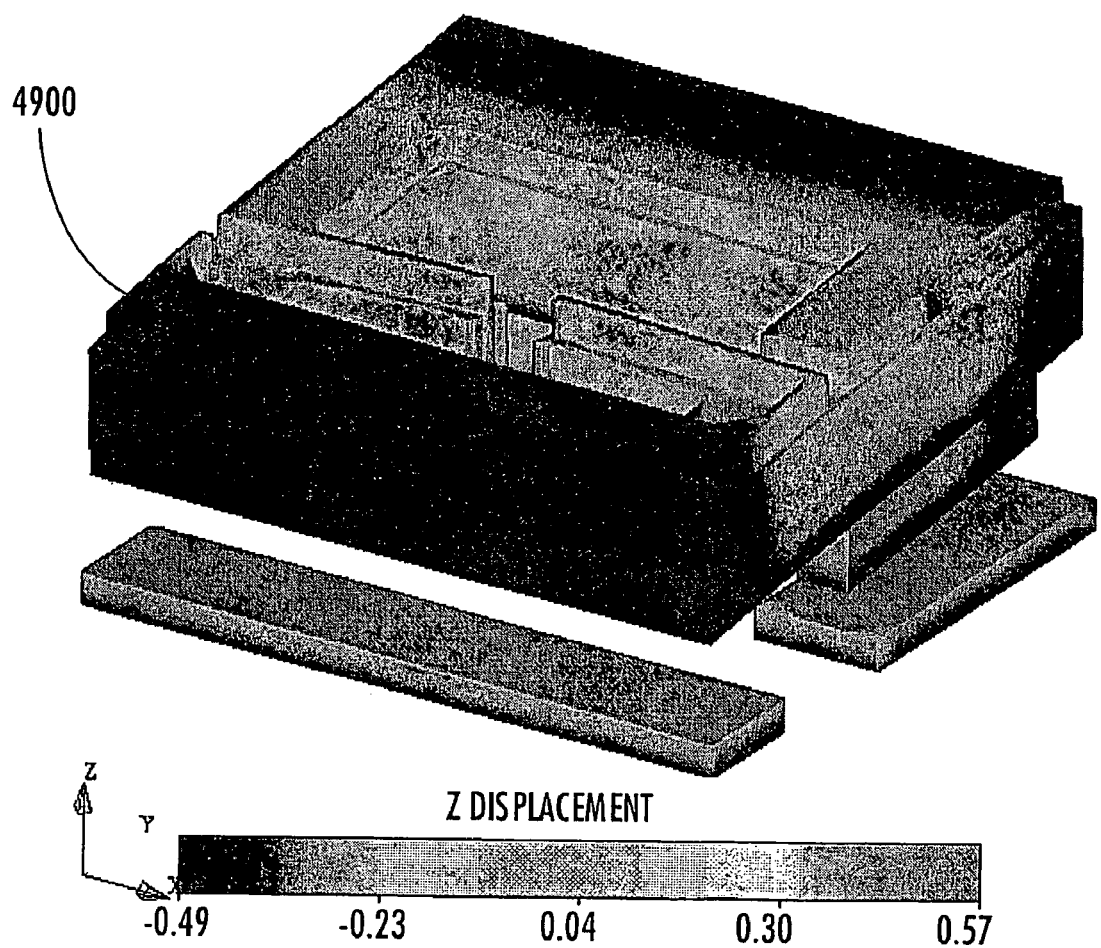
FIG. 49 is a computer simulation model of deformation of a torsional variable capacitor of an array of 16 variable capacitors.

An array of variable capacitor such as variable capacitor 4300 shown in FIGS. 43-45 can be arranged in parallel to achieve different maximum and minimum capacitances. For example, sixteen variable capacitors (such as variable capacitor 4300) can be arranged in parallel to achieve a maximum capacitance of 4 pF, a minimum capacitance of 2 pF, and a first resonance mode of 22. kHz. FIG. 49 illustrates a computer simulation model of deformation of a torsional variable capacitor 4900 of an array of 16 variable capacitors (such as variable capacitor 4800 shown in FIG. 28). The maximum displacement is located near movable capacitance electrode MCE.

Figure 50:
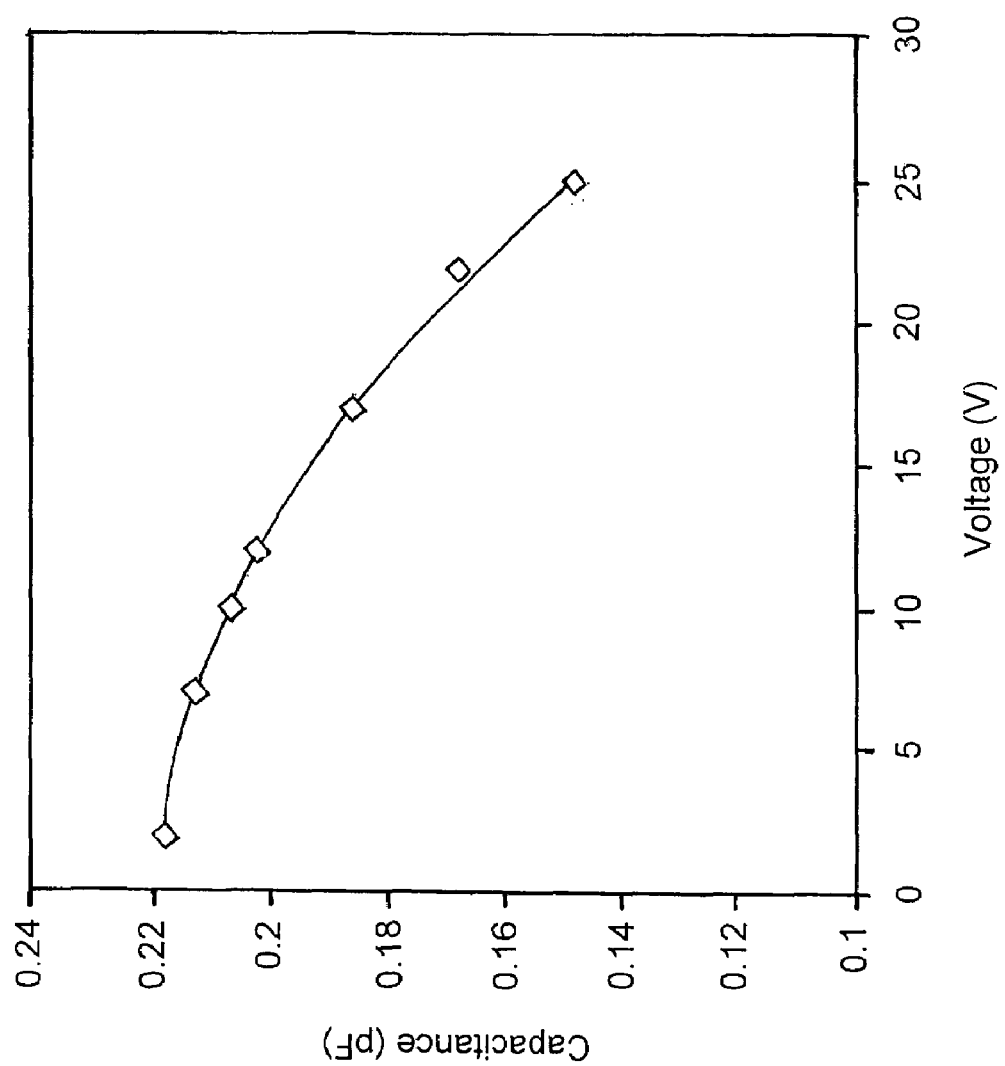
FIG. 50 is a graph showing the capacitance of a torsional variable capacitor versus an applied actuation voltage.

FIG. 50 illustrates a graph showing the capacitance of a torsional variable capacitor (such as variable capacitor 4300 shown in FIG. 43) versus an applied actuation voltage.

Figure 51:
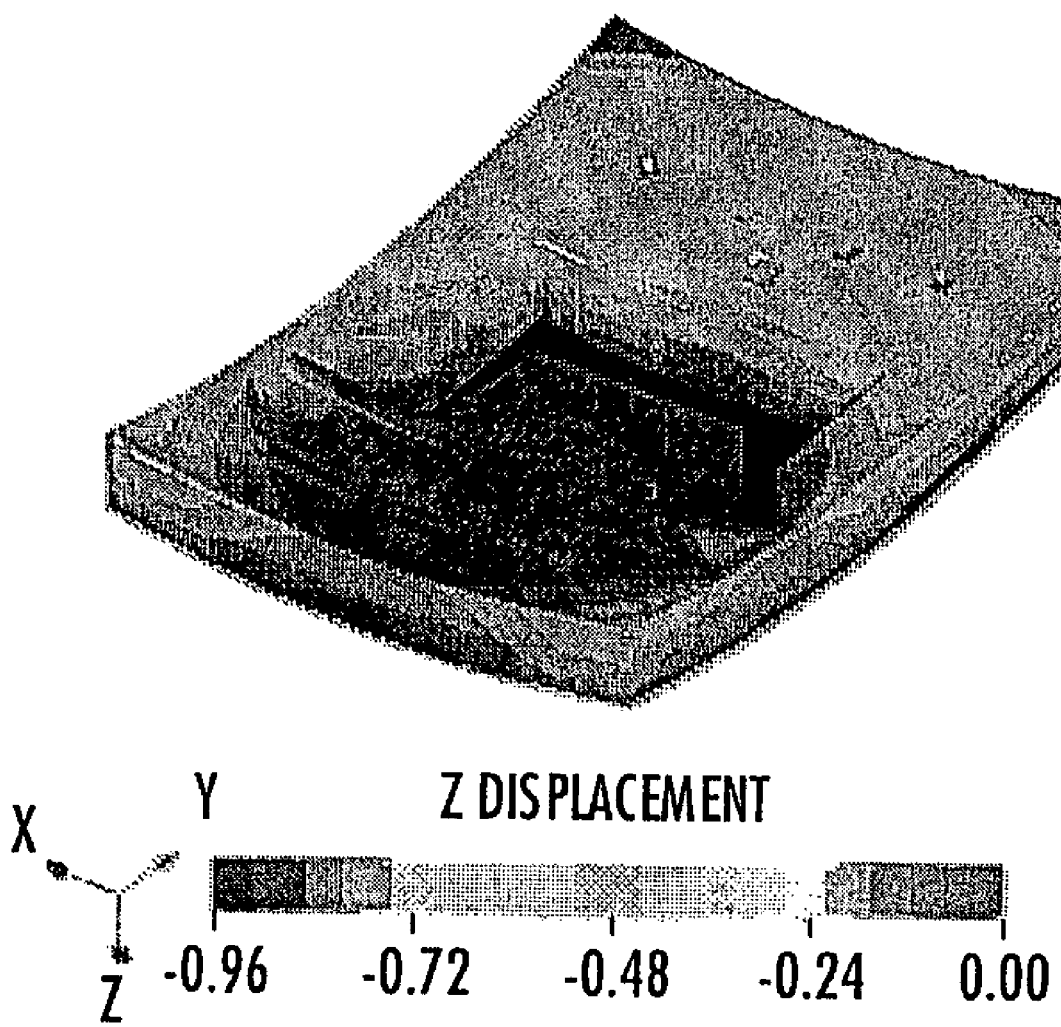
FIG. 51 is a computer simulation model of deformation of a movable component of a torsional variable capacitor under a stress gradient between +1 and −1 MPa.

FIG. 51 illustrates a computer simulation model of deformation of a movable component of a torsional variable capacitor (such as variable capacitor 4300 shown in FIG. 43) under a stress gradient between +1 and −1 MPa. The corners of movable component have a displacement of nearly 1 micrometer.

A torsional variable capacitor (such as variable capacitor 4300 shown in FIG. 43) can include apertures in the movable component for decreasing the effects of damping. According to one embodiment, the apertures in a torsional variable capacitor can be up to three times larger than 5 micrometers.

FIG. 52 illustrates a computer simulation model of the deformation of a movable component in a torsional variable capacitor (such as torsional variable capacitor 4300 shown in FIG. 43) for an acceleration of 100 g. The displacement of the outer edge of movable capacitance electrode 5200 is about −0.09 micrometers. For a 0.3 g acceleration, the displacement of the outer edge of movable capacitance electrode 5200 is about 0.27 nanometers, resulting in a capacitance change of less than about 0.05%.

When a long conductive line is used to connect two or more torsional variable capacitors (such as torsional variable capacitor 4300 shown in FIG. 43) in parallel, the overall RF performance of the configuration can be downgraded. In particular, the inductance added by the connection can lower the self-resonance frequency.

Table 6 below indicates a summary of specifications for 16 torsional variable capacitors (such as variable capacitor 4300 shown in FIG. 44) connected in parallel.

TABLE 6

Specification Summary

| Parameter | Value |
|---|---|
| $V_{control}$ | 27 V |
| Resonance frequency | 22.4 kHz |
| $C_{min}$ | 0.12 pF × 16 |
| Capacitance ratio | maximum 1:2 |
| R(dc) | ≈1.5 ohms |
| Vibration sensitivity | 0.05% for 0.3 g |
| Stress sensitivity | negligible |
| Stress gradient deformation (for +/− 1 MPa) | −1 μm |
| Cut-off frequency | Un-Damped System |

Figure 53A:
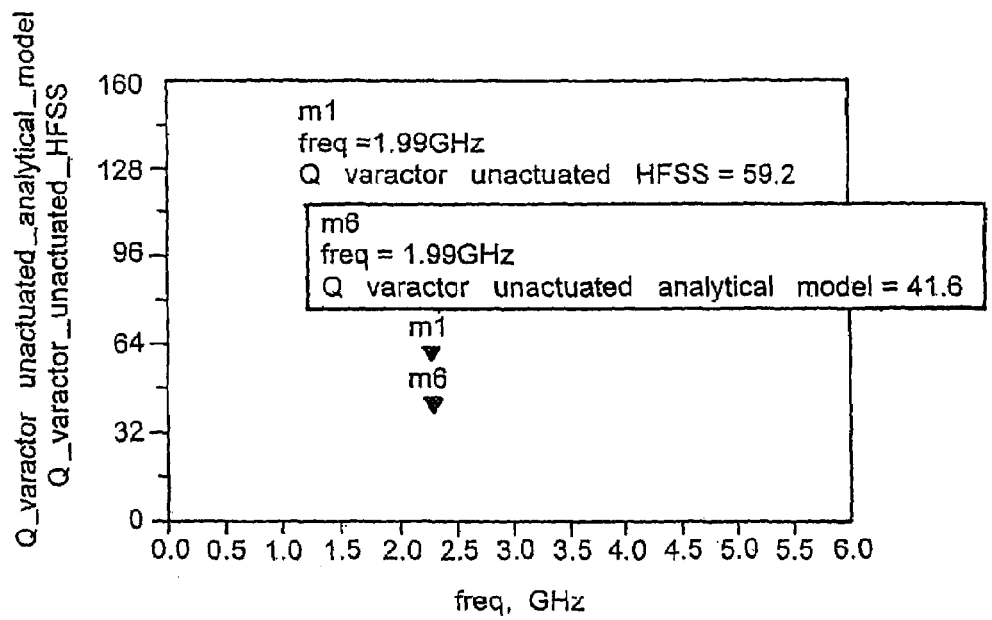
FIG. 53A is a computer simulation model for an equivalent circuit of a torsional variable capacitor.
Figure 53B:
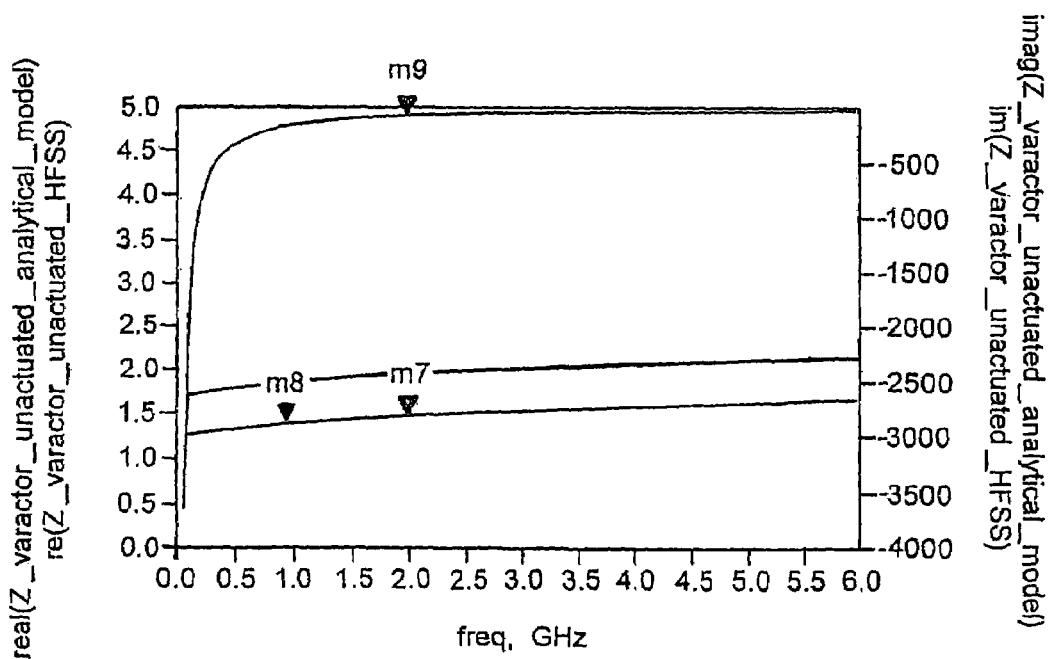
FIG. 53B is the RF results of the computer simulation model shown in FIG. 53A.

FIG. 53 illustrate a computer simulation model RF results of computer simulation model for an equivalent circuit of a torsional variable capacitor (such as variable 4300 shown in FIG. 43). Referring to FIG. 53, the HFSS electro-magnetic, full-wave simulator (available from Ansoft Corporation of Pittsburgh, Pennsylvania) can be used for modeling a torsional capacitor. Referring to FIG. 53, the resonance quality Q and Smith chart, generally designated 5300, of a torsional variable capacitor (such as variable 4300 shown in FIG. 43) is shown.

It will be understood that various details of the subject matter disclosed herein may be changed without departing from the scope of the subject matter. Furthermore, the foregoing description is for the purpose of illustration only, and not for the purpose of limitation.

What is claimed is:

1. A micro-electro-mechanical system (MEMS) variable capacitor, comprising:
   (a) first and second stationary actuation electrodes attached to a substrate;
   (b) first and second movable actuation electrodes spaced apart from the first and second stationary actuation electrodes, respectively, wherein the first and second movable actuation electrodes are movable with respect to the first and second stationary actuation electrodes when a voltage is applied across the movable actuation electrodes and the stationary actuation electrodes;
   (c) a stationary capacitive electrode attached to the substrate;
   (d) a movable capacitive electrode attached to the first and second movable actuation electrodes and spaced from the stationary capacitive electrode for movement of the movable capacitive electrode with respect to the stationary capacitive electrode upon application of voltage across the movable actuation electrodes and the stationary actuation electrodes to change the capacitance between the capacitive electrodes; and
   (e) first, second, and third tethers attached to the first movable actuation electrode, the second movable actuation electrode, and the movable capacitive electrode, respectively, wherein the tethers are flexible for allowing movement of the first movable actuation electrode, the second movable actuation electrode, and the movable capacitive electrode, respectively, with respect to the first stationary actuation electrode, the second stationary actuation electrode, and the stationary capacitive electrode, respectively, wherein the first, second, and third tethers extend substantially in a direction to about a center of the first movable actuation electrode, the second movable actuation electrode, and the movable capacitive electrode, respectively.

2. The MEMS variable capacitor according to claim 1, wherein the first and second tethers are operable to produce a biasing force to oppose movement of the first and second movable actuation electrodes with respect to the first and second stationary actuation electrodes, respectively.

3. The MEMS variable capacitor according to claim 1, wherein the third tether is operable to produce a biasing force to oppose movement of the capacitive electrodes with respect to one another.

4. The MEMS variable capacitor according to claim 1, wherein the tethers comprise material selected from the group consisting of silicon, alumina, silica, polymers, and combinations thereof.

5. The MEMS variable capacitor according to claim 1, wherein the capacitive electrodes are spaced closer together than the movable actuation electrodes are to the stationary actuation electrodes.

6. The MEMS variable capacitor according to claim 1, wherein the movable capacitive electrode is electrically isolated from the first and second movable actuation electrodes.

7. The MEMS variable capacitor according to claim 1, wherein the stationary capacitive electrode is electrically isolated from the first and second stationary actuation electrodes.

8. A micro-electro-mechanical system (MEMS) variable capacitor, comprising:
   (a) a movable component being movable with respect to a substrate and comprising first, second, and third portions;
   (b) first and second stationary actuation electrodes attached to the substrate;
   (c) first and second movable actuation electrodes spaced apart from the first and second stationary actuation electrodes, respectively, wherein the first movable actuation electrode is attached to the first portion of the movable component, wherein the second movable actuation electrode is attached to the second portion of the movable component, and wherein the first and second movable actuation electrodes are movable with respect to the first and second stationary actuation electrodes when a voltage is applied across the movable actuation electrodes and the stationary actuation electrodes;
   (d) a stationary capacitive electrode attached to the substrate;
   (e) a movable capacitive electrode attached to the third portion of the movable component and spaced from the stationary capacitive electrode for movement of the movable capacitive electrode with respect to the stationary capacitive electrode upon application of voltage across the movable actuation electrodes and the stationary actuation electrodes to change the capacitance between the capacitive electrodes; and
   (f) first, second, and third tethers comprising an end, the ends of the first, second, and third tethers being directly fixed to the first, second, and third portions, respectively, of the movable component to the substrate, wherein the tethers are flexible for allowing movement of the first movable actuation electrode, the second movable actuation electrode, and the movable capacitive electrode, respectively, with respect to the first stationary actuation electrode, the second stationary actuation electrode, and the stationary capacitive electrode, respectively.

9. The MEMS variable capacitor according to claim 8, wherein the first and second tethers are operable to produce a biasing force to oppose movement of the actuation electrodes with respect to one another.

10. The MEMS variable capacitor according to claim 8, wherein the third tether is operable to produce a biasing force to oppose movement of the capacitive electrodes with respect to one another.

11. The MEMS variable capacitor according to claim 8, wherein the movable component comprises material selected from the group consisting of silicon, alumina, silica, polymers, and combinations thereof.

12. The MEMS variable capacitor according to claim 8, wherein the tethers comprise material selected from the group consisting of silicon, alumina, silica, polymers, and combinations thereof.

13. The MEMS variable capacitor according to claim 8, wherein at least one of the first and second tethers extends in a direction to about the center of the first and second movable actuation electrodes, respectively.

14. The MEMS variable capacitor according to claim 8, wherein the third tether extends in a direction to about the center of the movable capacitive electrode.

15. The MEMS variable capacitor according to claim 8, wherein at least one of the first and second tethers extends in a direction substantially perpendicular to a radial direction from about the center of the first and second movable actuation electrodes, respectively.

16. The MEMS variable capacitor according to claim 8, wherein the third tether extends in a direction substantially perpendicular to a radial direction from about the center of the movable capacitive electrode.

17. The MEMS variable capacitor according to claim 8, wherein the capacitive electrodes are spaced closer together than the movable actuation electrodes are to the stationary actuation electrodes.

18. The MEMS variable capacitor according to claim 8, wherein the movable capacitive electrode is electrically isolated from the first and second movable actuation electrodes.

19. The MEMS variable capacitor according to claim 8, wherein the stationary capacitive electrode is electrically isolated from the first and second stationary actuation electrodes.

20. A micro-electro-mechanical system (MEMS) variable capacitor, comprising:
(a) first and second stationary actuation electrodes attached to a substrate;
(b) first and second movable actuation electrodes spaced apart from the first and second stationary actuation electrodes, respectively, wherein the first and second movable actuation electrodes are movable with respect to the first and second stationary actuation electrodes when a voltage is applied across the movable actuation electrodes and the stationary actuation electrodes;
(c) a stationary capacitive electrode attached to the substrate;
(d) a movable capacitive electrode attached to the first and second movable actuation electrodes and spaced from the stationary capacitive electrode for movement of the movable capacitive electrode with respect to the stationary capacitive electrode upon application of the voltage across the movable actuation electrodes and the stationary actuation electrodes to change the capacitance between the capacitive electrodes, wherein the movable capacitive electrode includes first and second conductive components;
(e) first and second tethers attached to the first and second movable actuation electrodes, respectively, wherein the first and second tethers are flexible for allowing movement of the first and second movable actuation electrodes, respectively, with respect to the first and second stationary actuation electrodes, respectively, and wherein the first and second tethers extend outward from attachment to the first and second movable actuation electrodes, respectively, at an acute angle with respect to the movable actuation electrodes and in a substantially same rotational direction about the movable capacitive electrode; and
(f) third and fourth tethers attached to the movable capacitive electrode, wherein the third and fourth tethers are flexible for allowing movement of the movable capacitive electrode with respect to the stationary capacitive electrode, wherein the first and second conductive components of the movable capacitive electrode extend along the third and fourth tethers, respectively.

21. The MEMS variable capacitor according to claim 20, wherein the first and second tethers are operable to produce a biasing force to oppose movement of the first and second movable actuation electrodes with respect to the first and second stationary actuation electrodes, respectively.

22. The MEMS variable capacitor according to claim 20, wherein the tethers comprise material selected from the group consisting of silicon, alumina, silica, polymers, and combinations thereof.

23. The MEMS variable capacitor according to claim 20, wherein the capacitive electrodes are spaced closer together than the movable actuation electrodes are to the stationary actuation electrodes.

24. The MEMS variable capacitor according to claim 20, wherein the movable capacitive electrode is electrically isolated from the first and second movable actuation electrodes.

25. The MEMS variable capacitor according to claim 20, wherein the stationary capacitive electrode is electrically isolated from the first and second stationary actuation electrodes.

26. The MEMS variable capacitor according to claim 20, wherein at least portions of the first and second tethers extend in directions that are substantially perpendicular to radial directions with respect to the movable capacitive electrode.

27. The MEMS variable capacitor according to claim 20, wherein the third and fourth tethers extend outward from the movable capacitive electrode at an angle of about 90° C. with respect to a center of the movable capacitive electrode and in the same rotational direction about the movable capacitive electrode as the first and second tethers.

* * * * *